(12) United States Patent
Ohashi

(10) Patent No.: US 7,164,542 B2
(45) Date of Patent: Jan. 16, 2007

(54) ZOOM LENS, VARIABLE MAGNIFICATION GROUP, CAMERA UNIT AND PORTABLE INFORMATION TERMINAL UNIT

(75) Inventor: Kazuyasu Ohashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 30 days.

(21) Appl. No.: 10/866,830

(22) Filed: Jun. 15, 2004

(65) Prior Publication Data

US 2005/0036208 A1    Feb. 17, 2005

Related U.S. Application Data

(63) Continuation of application No. 10/201,262, filed on Jul. 24, 2002, now Pat. No. 6,771,433.

(30) Foreign Application Priority Data

| Jul. 24, 2001 | (JP) | ............................. 2001-222811 |
| Sep. 28, 2001 | (JP) | ............................. 2001-303218 |
| Oct. 24, 2001 | (JP) | ............................. 2001-326710 |

(51) Int. Cl.
G02B 15/14    (2006.01)

(52) U.S. Cl. ..................... 359/689; 359/691
(58) Field of Classification Search ................ 359/689, 359/691

See application file for complete search history.

(56) References Cited

U.S. PATENT DOCUMENTS

| 5,153,779 A | 10/1992 | Ohashi | ........................ 359/770 |
| 5,398,135 A | 3/1995 | Ohashi | ........................ 359/692 |
| 5,576,891 A | 11/1996 | Ohashi | ........................ 359/692 |
| 5,581,319 A | 12/1996 | Ohashi | ........................ 396/374 |
| 5,617,254 A | 4/1997 | Ohashi | ........................ 309/692 |
| 5,630,188 A | 5/1997 | Ohashi | ........................ 396/385 |
| 5,687,401 A | 11/1997 | Kawamura et al. | ........... 396/79 |
| 5,930,056 A | 7/1999 | Ohashi | ........................ 359/776 |
| 6,308,011 B1 | 10/2001 | Wachi et al. | ................. 396/72 |
| 6,353,506 B1 | 3/2002 | Ohashi | ........................ 359/687 |
| 6,545,819 B1 | 4/2003 | Nanba et al. | ............... 359/685 |
| 6,704,149 B1 * | 3/2004 | Ohmori et al. | ............. 359/743 |
| 2002/0008920 A1 * | 1/2002 | Mihara et al. | .............. 359/684 |

(Continued)

FOREIGN PATENT DOCUMENTS

JP    10-39214    2/1998

(Continued)

*Primary Examiner*—Ricky Mack
*Assistant Examiner*—William Choi
(74) *Attorney, Agent, or Firm*—Dickstein Shapiro LLP

(57) ABSTRACT

Disclosed is a zoom lens herein. The zoom lens has a first group G1 having a negative focal length, a second group G2 having a positive focal length and a third group G3 having a positive focal length in turn from an object side, and has an opening iris S for moving integrally with the second group G2 on the object side of the second group G2, wherein in variation of magnification from a short focus end to a long focus end, the second group G2 moves monotonously from image side to object side and the first group G1 moves to correct the variation in position of image surface accompanying the variation of magnification. The second group G2 consists of four elements of a positive lens L4, a negative lens L5, a positive lens L6 and a positive lens L7 in turn from the object side.

7 Claims, 75 Drawing Sheets

EMBODIMENT 1

U.S. PATENT DOCUMENTS

| | | |
|---|---|---|
| 2002/0024745 A1 | 2/2002 | Ohashi ........................ 359/690 |
| 2002/0060855 A1 | 5/2002 | Ohashi ........................ 359/684 |
| 2002/0101665 A1 | 8/2002 | Ohashi et al. ............... 359/691 |

FOREIGN PATENT DOCUMENTS

| | | |
|---|---|---|
| JP | 11-52246 | 2/1999 |
| JP | 11-287953 | 10/1999 |
| JP | 2000-89110 | 3/2000 |
| JP | 2001-42218 | 2/2001 |

* cited by examiner

EMBODIMENT 1

EMBODIMENT 3

EMBODIMENT 4

EMBODIMENT 1

EMBODIMENT 1

EMBODIMENT 2

EMBODIMENT 2

EMBODIMENT 2

EMBODIMENT 2

EMBODIMENT 3

EMBODIMENT 3

EMBODIMENT 4

EMBODIMENT 5

EMBODIMENT 5

EMBODIMENT 5

EMBODIMENT 6

EMBODIMENT 7

EMBODIMENT 8

EMBODIMENT 9

EMBODIMENT 10

EMBODIMENT 11

EMBODIMENT 12

EMBODIMENT 13

(EMBODIMENT 6: SHORT FOCUS END)

FIG. 32 (EMBODIMENT 6: INTERMEDIATE FOCAL LENGTH)

(EMBODIMENT 6: LONG FOCUS END)

(EMBODIMENT 7: SHORT FOCUS END)

(EMBODIMENT 7: INTERMEDIATE FOCAL LENGTH)

(EMBODIMENT 7: LONG FOCUS END)

(EMBODIMENT 8: SHORT FOCUS END)

FIG. 38 (EMBODIMENT 8: INTERMEDIATE FOCAL LENGTH)

FIG. 39 (EMBODIMENT 8: LONG FOCUS END)

FIG. 40 (EMBODIMENT 9: SHORT FOCUS END)

(EMBODIMENT 9: INTERMEDIATE FOCAL LENGTH)

(EMBODIMENT 9: LONG FOCUS END)

FIG. 43 (EMBODIMENT 10: SHORT FOCUS END)

(EMBODIMENT 10: LONG FOCUS END)

(EMBODIMENT 11: SHORT FOCUS END)

(EMBODIMENT 11: INTERMEDIATE FOCAL LENGTH)

(EMBODIMENT 11: LONG FOCUS END)

(EMBODIMENT 12: SHORT FOCUS END)

FIG. 50 (EMBODIMENT 12: INTERMEDIATE FOCAL LENGTH)

(EMBODIMENT 12: LONG FOCUS END)

FIG. 52 (EMBODIMENT 13: SHORT FOCUS END)

(EMBODIMENT 13: INTERMEDIATE FOCAL LENGTH)

(EMBODIMENT 13: LONG FOCUS END)

EMBODIMENT 14

EMBODIMENT 15

EMBODIMENT 16

EMBODIMENT 17

EMBODIMENT 18

EMBODIMENT 19

FIG. 61 (EMBODIMENT 14)

FIG. 62 (EMBODIMENT 14)

FIG. 63 (EMBODIMENT 14)

FIG. 64 (EMBODIMENT 15)

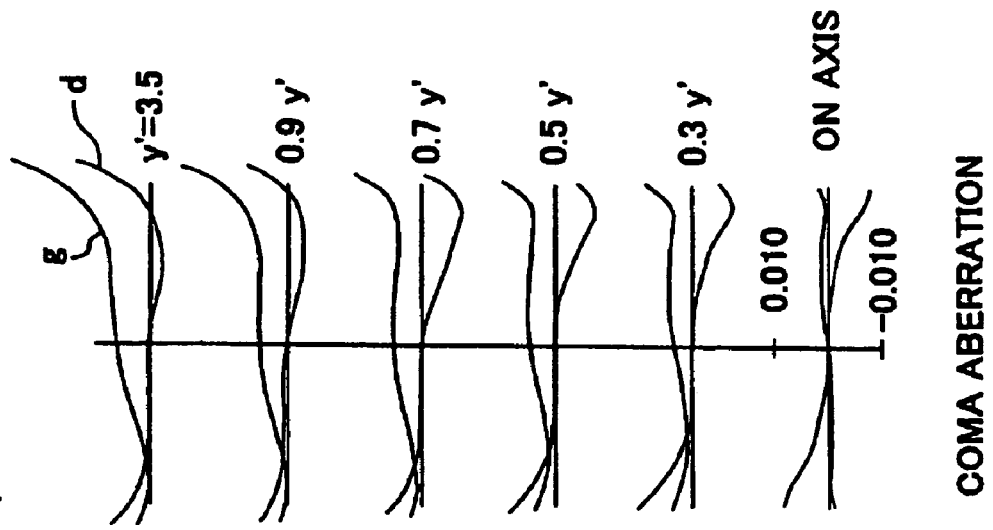
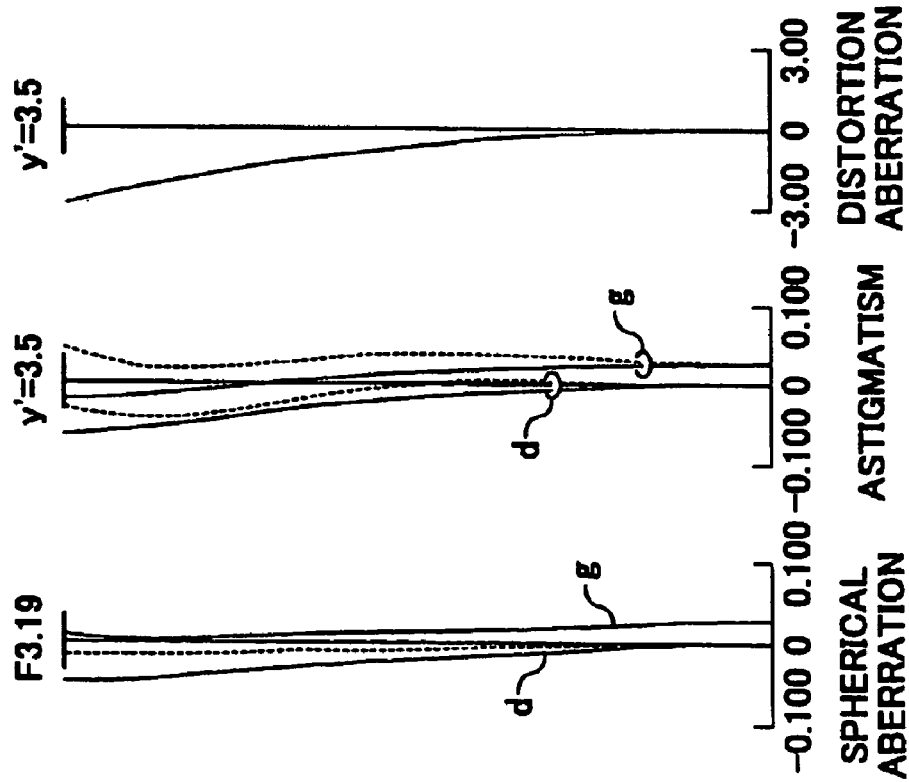
FIG. 65
(EMBODIMENT 15)

FIG. 66 (EMBODIMENT 15)

FIG. 67 (EMBODIMENT 16)

FIG. 68 (EMBODIMENT 16)

FIG. 69 (EMBODIMENT 16)

FIG. 70 (EMBODIMENT 17)

FIG. 71 (EMBODIMENT 17)

FIG. 72 (EMBODIMENT 17)

FIG. 73 (EMBODIMENT 18)

FIG. 74 (EMBODIMENT 18)

FIG. 75 (EMBODIMENT 18)

FIG. 76 (EMBODIMENT 19)

FIG. 77 (EMBODIMENT 19)

FIG. 78 (EMBODIMENT 19)

ZOOM LENS, VARIABLE MAGNIFICATION GROUP, CAMERA UNIT AND PORTABLE INFORMATION TERMINAL UNIT

This application is a continuation of U.S. application Ser. No. 10/201,262 filed Jul. 24, 2002, now U.S. Pat. No. 6,771,433 the disclosure of which is incorporated by reference herein.

BACKGROUND OF THE INVENTION

1. Field of the Invention

The present invention relates to a zoom lens, a variable magnification group, a camera unit having a photographic lens using such a zoom lens, a digital camera, a video camera, and a portable information terminal unit as an information equipment having a digital image photographing function.

2. Prior Art

The digital camera market is being extraordinarily expanded. Photographing of digital image is extended not only to a digital camera but also to a portable information terminal unit of portable telephone, and demands of users for digital camera are multi-laterally branched. Among them, high image quality and miniaturization are always desired by the users and are given much weight among the various desired items. For this reason, high performance and miniaturization are also required to be compatible in a zoom lens used as a photographic lens.

In view of miniaturization, first of all, it is require to reduce the total length of lens (the distance from the most object side lens surface to an image surface). Furthermore, in a camera unit of so called "collapsible mount style" that is contemplated for compactness at the time of receiving a lens, it is important to reducing the thickness of each group, which moves at the time of zooming, in the direction of optical axis in order to reduce the dimension at the time of reception.

Although various types are considered for the zoom lens for digital camera, there is a type which is appropriate for miniaturization, which comprises a first group with a negative focal length, a second group with a positive focal length, a third group with a positive focal length in turn from the object side, and an iris provided in the object side of the second group to move integral with the second group, wherein the second group monotonously moves from the object side to the image side at the time of variation of magnification from the short focus end to the long focus end, and the first group moves to correct the variation in position of an image surface accompanying the variation of magnification.

For example, although Japanese Patent Publication No. Hei. 10(1998)-039214 discloses all of the basic construction before everything else among those of which proposed the zoom lenses of the above type, it is not always sufficient in the aspect of miniaturization. Although a zoom lens improved over the above type and advanced in miniaturization is disclosed in Japanese Patent Publication No. Hei, 11(1999)-287953, the miniaturization is not sufficient and also aberration correction cannot to be said as sufficient because only one aspherical surface is provided in the second group. Although Japanese Patent Publication No. 2000-089110 discloses a zoom lens which is contemplated for good correction of aberration using the two aspherical surfaces in the second group as its embodiment 3, it is not always advantageous in miniaturization because the thickness of second group is large.

Also, because the examples of prior art which are disclosed in these publications are not appropriate in the construction of each group, in particular the second group, sufficient aberration correction do not take place and do not have a performance which is able to cope with an image sensing device of 2,000,000 to 4,000,000 pixels.

SUMMARY OF THE INVENTION

Considering the above problems, it is an object of the present invention to contemplate the miniaturization of zoom lens used for photographing a digital image while maintaining high performance thereof. In addition, it is an object of the present invention to provide a zoom lens and camera having a definition corresponding to an image sensing device of 2,000,000 to 4,000,000 pixels.

Furthermore, because it is important to minimize a lens diameter (maximum light effective diameter) in order to avoid the large-sizing of lens barrel formed from a plurality of stages in the case of zoom lens used in the camera of so called collapsible mount style, it is an object of the present invention to provide a zoom lens, a camera and a portable information terminal unit which are sufficiently compact while having high performance and of which the lens diameter (maximum light effective diameter) of the first group amongst others is small.

In the zoom lens consisting of three groups of negative, positive and positive as in the present invention, in general, when magnification is varied from short focus end to long focus end, the second group monotonously moves from the image side to the object side and the first group moves to correct the variation in position of an image surface accompanying the variation of magnification. The second group takes charge of most of variation of magnification function and the third group is provided mainly to keep exit pupil away from the image surface.

In order to realize a zoom lens of high definition, of which various aberrations are small, the variation of aberration due to variation of magnification should be restrained to be small, and in particular a variable magnification group which performs substantial variation of magnification, i.e., the second variable magnification group which is the main variable magnification group is needed to be excellently aberration-corrected in the total range of variation of magnification. For the excellent correction of aberration of the second group, basically it is considered to increase the constituent number of second group but the increase of constituent number will increase the thickness of second group in the direction of optical axis, whereby it will be impossible to attain sufficient miniaturization and furthermore the increase of cost will be caused.

Although second groups consisting of not more than four lenses are known: that consisting of three lenses: a positive lens, a negative lens, and a positive lens in turn from the object side; that consisting four lenses: a positive lens, a positive lens, a negative lens, and a positive lens in turn from the object side; and that consisting of four lenses: a positive lens, a negative lens, a negative lens, and a positive lens in turn from the object side, the present invention realizes a second group having a aberration correcting capability over them.

That is, in the present invention, a zoom lens comprising the first group with a negative focal length, a second group with a positive focal length, and a third group with a positive focal length in turn from the object side, and including an iris provided in the object side of said second group to be moved integrally with the second group, in which at the time of variation of magnification from short focus end to long focus end, the second group monotonously moves from the image side to the object side and the first group moves to correct the variation in position of image surface accompanying the variation of magnification, wherein the second group consists of four lenses: a positive lens, a negative lens, a positive lens and a positive lens in turn from the object side.

Due to the relationship that an aperture iris is located in the object side of second group, in the second group, as a lens of image side is more remote from the aperture iris, its abaxial light passes a place which is more deviated from the optical axis, thereby deeply taking part in correction of abaxial aberration. Although the second group has a symmetrical arrangement having two positive magnifications each being provided on each side of a negative magnification, the positive magnification of image side which deeply takes part in correction of abaxial aberration is divided in two lenses, whereby degree of freedom is increased and it becomes possible to excellently correct the abaxial aberration.

In order to execute more sufficient correction of aberration, it is preferable to satisfy the following conditional relationship.

$$0.9 < (L_{PN}/Y') < 1.4$$

Wherein, $L_{PN}$ is the distance from the apex of object side surface of the most object side positive lens of the second group to the apex of image side surface of negative lens, which is the second from the object side of the second group, and Y' is the maximum image height.

In the second group, both of the object side surface of the most object side positive lens and the image side surface of negative lens which is the second from the object side have small curvatures and largely reciprocate aberrations each other, thereby most largely contributing to correction of aberration. In order to perform excellent correction of aberration, the height of light passing these two surfaces. When $(L_{PN}/Y')$ is 1.4 or more, the marginal height of on-axial light in the image surface of the negative lens, which is the second from the object side, becomes too small, whereby the correction of spherical aberration becomes difficult. In addition, this is unfavorable for miniaturizing the second group. Meanwhile, when $(L_{PN}/Y')$ is 0.9 or less, the height of abaxial main light in the negative lens, which is the second from the object side, becomes too small, whereby the correction of astigmatism and coma aberration becomes difficult.

Furthermore, in order to perform excellent correction of aberration, it is preferable to have two or more aspherical surfaces in the second group.

By using two aspherical surfaces in the places which individually have different light passing modes, it becomes possible to enhance the degree of freedom of aberration correction. Also, in order to perform the most efficient aberration correction, it is preferable to form the most object side surface and the most image side surface in the second group as aspherical surfaces.

Because the most object side surface of second group is adjacent to the iris, on-axial and abaxial light beams pass through the surface substantially without being separated, and the spherical surface provided thereon mainly takes part in correction of spherical aberration or coma aberration. Meanwhile, because the most image side surface of the second group is remote from the iris, the on-axial and abaxial light beams somewhat separately pass therethrough, and the aspherical surface provided herein contributes to correction of astigmatism and the like. Like this, by using two aspherical surfaces as the most object side surface and the most image side surface, each aspherical surface induces sufficiently different effects, whereby the degree of freedom in aberration correction is greatly increased.

In the zoom lens of the present invention, in order to excellently correct each aberration, it is preferable that the first group comprises at least one negative lens the larger curvature surface being faced to the image side, and at least one positive lens with the larger curvature surface being faced to the object side, in turn from the object side and the image side surface of said negative lens is an aspherical surface.

By making the first group in this construction, it is possible to reduce the curvature of an image surface, and by forming the surface of large refractive angle for abaxial light as an aspherical surface, it becomes to suppress the distortion aberration especially in the short focus end.

In particular, the first group may consist of three lenses: a negative meniscus lens with a prominence surface faced to the object side, a negative lens with the larger curvature surface being faced to the image side, and a positive lens with the larger curvature surface being faced to the object side in turn from the object side, wherein said the image side surface of said negative lens is an aspherical surface.

According to this construction, the capability of aberration correction is enhanced, and thus it is advantageous for widening angle of view.

The zoom lens of the present invention may comprise three groups, four lenses: a positive lens, a negative lens conjugated to the positive lens, a positive lens and a positive lens in turn from the object side.

In the second group the object side surface of the most object side positive lens and the image side lens of the negative lens second from the object side reciprocate aberrations with each other as explained in the above, whereby the cement error (eccentricity and the like) sometimes greatly influences on the imaging performance. By conjugating these two lenses, it becomes possible to suppress the cement error itself to be small.

The zoom lens according to the present invention may comprise three groups of four lenses in the second group: a positive lens, a negative lens, a positive lens conjugated to the negative lens, and a positive lens in turn from the object side.

In the second group, the image side surface of negative lens second from the object side and the object side surface of third positive lens from the object side largely reciprocate aberrations if they are designed so that there is a small difference of curvatures between them. In such a case, the influence that these affect on the imaging performance of these two lenses may be increased but it becomes possible to suppress the cement error itself to be small by conjugating these two lenses.

In addition, it is possible to obtain a small sized camera of high image quality by mounting said zoom lens in the camera as a photographic optical system.

Furthermore, the "variable magnification group in a zoom lens" of the present invention is "that constructed as the second group to perform substantial variation of magnification in a zoom lens comprising the first group with a negative focal length, the second group with a positive focal length, the third group with a positive focal length in turn from the object side, and an iris provided in the object side of the second group to move integral with the second group, wherein at the time of variation of magnification from the short focus end to the long focus end, the second group monotonously moves from the image side and the object side, and said first group moves to correct the variation in position of an image surface accompanying the variation of magnification."

The variable magnification group has a characteristic as follows.

Namely, the variable magnification group constructed as the second group comprises three lenses: a positive lens with the larger curvature surface being faced to the object side, a negative lens with the larger curvature surface being faced to the image side, and a positive lens arranged in turn from the object side and the most object side surface and the most image side surface are aspherical surfaces.

The variable magnification group defined in claim 11 is preferable if the thickness in the optical axis direction, $L_{G2}$ and the maximum image height, Y', to satisfy the following relationship:

$$1.0 < (L_{G2}/Y') < 2.5. \quad (1)$$

The variable magnification group is preferable if the curvature radii of the most object side surface and the most image side surface, respectively defined as $R_{31}$ and $R_{32}$ to satisfy the following:

$$-0.4 < (R_{31}+R_{32})/(R_{31}-R_{32}) < 0.0. \quad (2)$$

In addition, because the image side surface is an aspherical surface in this case, said curvature radius, $R_{32}$ is a paraxial curvature radius.

In the variable magnification group, the most object side positive lens and a negative lens following this may be conjugated with each other to form a conjugate lens, or three lenses may be formed to be independent from each other.

The variable magnification group, also, has a following characteristic.

That is, in the variable magnification group constructed as the second group to perform substantial variation of magnification, the most object side surface and the most image side surface are aspherical, and the thickness in the direction of optical axis $L_{G2}$ and the maximum image height Y', to satisfy the following condition:

$$1.0 < (L_{G2}/Y') < 2.5. \quad (1)$$

The variable magnification group may take a four lens construction comprising four lenses: a positive lens with the larger curvature surface being faced to the object side, a negative lens with the larger curvature surface being faced to the image side, a positive lens and a positive lens arranged in turn from the object side.

In this case, the four lenses of the variable magnification group may be independent from each other but may be integrated by joining a positive lens on most object side and a negative lens following it as a conjugate lens.

The zoom lens of the present invention comprises a first group with a negative focal length, a second group with a negative focal length, a third focal length with a positive focal length arranged in turn from the object side, and including an iris provided in the object side of the second group integral thereto, wherein at the time of variation of magnification from the short focus end to the long focus end, the second group monotonously moves from the image side to the object side to perform substantial variation of magnification and the first group corrects the variation in position of an image surface accompanying the variation of magnification, characterized that it uses the variable magnification group according to any of claims 10 to 17.

The first group in the zoom lens may comprise at least one positive lens with the larger curvature surface being faced to the image side and at least one negative lens with the larger curvature surface being faced to the object side arranged in turn from the object side and the most object side surface, wherein the image side surface of the most image side negative lens among the at least one negative lens located in the object side, is formed as an aspherical surface.

The first group in the zoom lens may comprise a negative meniscus lens with the convex surface being faced to the object side, a negative lens with the larger curvature surface being faced to the image side, and a positive lens with the larger curvature surface being faced to the object side arranged in turn from the object side, wherein the image side surface of the negative lens located second from the object side is formed as an aspherical surface.

In this case, it is preferable if the focal length of meniscus lens located in the most object side in the first group $f_{L1}$ and the focal length of the negative located second from the object side of the first group $f_{L2}$, to satisfy the condition as follows:

$$0.7 < (f_{L1}/f_{L2}) < 2.0. \quad (3)$$

In addition, the first group in the zoom lens may take a two lens construction comprising a negative meniscus lens with the convex surface being faced to the object side and a positive lens with the larger curvature surface being faced to the object side arranged in turn from the object side, wherein the image side surface of said negative meniscus lens is formed in an aspherical surface.

In the zoom lens in the other embodiment, the third group may consist of a positive lens with the larger curvature surface being faced to the object side, wherein the lens is adapted to have at least one aspherical surface.

The zoom lens preferably comprises eight or less constituent lenses in all of the system.

The camera unit of the present invention is provided with a zoom lens according to any of claims 18 to 24 as a photographic zoom lens.

The camera unit may take a construction that the photographic zoom lens is received in a collapsible mount style.

The camera unit may have a function for taking a photographic image as digital information and in this case, a light receiving device for receiving an image formed by the zoom lens may have 2,000,000 or more pixels.

The camera unit may be a portable information terminal unit.

In the present invention, the second group which is the main variable magnification group comprises a positive lens with the larger curvature surface being faced to the object side, a positive lens with a larger curvature surface faced to the image side, and a positive lens, wherein the most object side surface and the most image side surface are formed as asymmetric surfaces.

That is, the second group is made as a triplet type in which the correction of chromatic aberration and correction of the minimum number of compatible constituents are compatibly performed by the minimum number of constituents, whereby miniaturization is realized, and then the aberration correction with high degree of freedom is performed using two asymmetric surfaces, whereby high performance is attained.

Because the most object side surface is positioned "adjacent to the iris," on-axial and abaxial light beams pass through substantially without being separated and the aspherical surface provided in this surface mainly contributes to the correction of spherical aberration or coma aberration. Because the most image side surface of the second group is separated from the iris, the on-axial and off-axial lights are somewhat separated and pass through it. Therefore, the aspherical surface provided in this surface contributes to the correction of astigmatism.

By using two aspherical surfaces as the most object side surface and the most image side surface to make the effects induced by each of aspherical surfaces, it is possible to greatly increase the degree of freedom in correction of monochromatic aberration, whereby it is possible to perform sufficient correction of various aberrations including chromatic aberration even with small number of triplet constructions.

Although the present invention is preferable and appropriate for miniaturization because it takes a three lens construction, it is preferable to satisfy the condition (1) in order to attain additional miniaturization. When the parameter, $L_{G2}/Y'$ is the upper limit value, 2.5 or more, the thickness of the second group in the optical axis is increased, whereby sufficient miniaturization cannot be attained. To the contrary, when the parameter, $L_{G2}/Y'$ is the lower limit value, 1.0 or less, "the most image side surface" of the second group approaches to the iris, the effect of aspherical surface for performing "the correction of astigmatism and the like" cannot be sufficiently exhibited, whereby it becomes difficult to correct astigmatism and the like.

When the second group takes the three lens construction as explained in the above, additional miniaturization can be realized if it satisfies the following condition, which is narrower than the condition (2):

$$1.0 < (L_{G2}/Y') < 2.0. \quad (1')$$

If the second group is constructed as triplet type, the object side surface (aspherical surface) of the most object side positive lens in the second group and the image side surface of the negative lens following it "will largely reciprocate aberrations with each other." Due to this, the influence that the cement error (eccentricity and the like) of these two lenses gives to the imaging function is frequently enlarged.

In this respect, it is possible to suppress the cement error itself to be small by conjugating these two lenses.

However, in the present invention, an aspherical surface is also employed in the positive lens of the most image side in the second group, the influence given on the imaging performance by the cement error of this positive lens is great. In order to suppress the influence on the imaging performance by the cement error of "the positive lens of the most image side" in the second group to be small, it is preferable to satisfy the condition (2).

The condition (2) is to complete the reciprocation of aberrations in the object side surface and image side surface (aspherical surface) of the positive lens of the most image side in the second group if possible, so that the positional relationship with another lens will not become so strict.

Because when the parameter, $(R_{31}+R_{32})/(R_{31}-R_{32})$ is the upper limit value, 0.0, or more, the aberration generated in the image side surface of the positive lens of the most image side becomes larger than the aberration generated in the object side surface, and when it is the lower limit, −0.4 or less, the aberration generated in the object side surface becomes larger than the aberration generated in the image side surface, whereby the reciprocation of aberrations between different lens surfaces will be increased in both cases, the influence on the imaging performance by the cement error of the positive lens (of the most image side in the second group) will be increased.

As explained in the above, if the present invention satisfies said condition (1) although it is of three-lens construction, the desires for high performance and miniaturization can be satisfied even if the second group takes other construction rather than the three-lens construction because the condition (1) limits the size of the second group.

That is, in this case, it is possible to employ four-lens construction comprising four lenses: a positive lens with the larger curvature surface being faced to the object side, a negative lens with the larger curvature surface being faced to the image side, a positive lens, and a positive lens arranged in turn from the object side like the variable magnification group, and also possible to integrate the positive lens of the most object side and the negative lens following this as a conjugate lens.

Although the zoom lens uses the variable magnification group as a variable magnification group of three-group construction as explained in the above, for more excellent correction of each aberration in the zoom lens, it is preferable that the first group comprises at least one positive lens with the larger curvature surface being faced to the image side and at least one negative lens with the larger curvature surface being faced to the object side arranged in turn from the object side and the most object side surface, wherein the image side surface of the negative lens located in the most image side in the at least one negative lens is formed as an aspherical surface.

By forming the first group in this construction, it is possible to reduce the curvature of an image surface, and by forming the surface having a large refractive angle of abaxial light in an aspherical surface, it becomes possible to suppress distortion aberration, especially in the short focus end.

In this case, if the first group in the zoom lens takes three-group construction comprising a negative meniscus lens with the convex surface being faced to the object side, a negative lens with the larger curvature surface being faced to the image side, and a positive lens with the larger curvature surface being faced to the object side arranged in turn from the object side, wherein the image side surface of the negative lens located second from the object side is formed as an aspherical surface like the zoom, and it satisfies the condition (3), it is possible to reduce the influence on the imaging function by formation error of said aspherical surface, whereby the effect of aspherical surface can be efficiently exhibited.

That is, in the condition (3), the parameter $(f_{L1}/f_{L2})$ indicates the magnification ratio of two negative lenses in the first group, wherein if this parameter is the upper limit value, 2.0 or more, the magnification of second negative lens provided with an aspherical surface is strengthened, whereby the degree of difficulty in the case of manufacturing the lens by forming (mold) is raised because the difference of thickness between the center and periphery of lens is increased, beyond that the influence on the imaging function by the producing error of aspherical surface. Meanwhile, if the parameter $(f_{L1}/f_{L2})$ is the lower limit value, 0.7 or less, the magnification of second negative lens provided with an aspherical surface is weakened and the refractive angle of abaxial light in the image side surface is reduced, the effect of aspherical surface is diluted.

In addition, more preferably, it is advantageous to satisfy the following condition which is narrower than the condition (3);

$$0.7 < (f_{L1}/f_{L2}) < 1.5. \quad (3')$$

Furthermore, by constructing the first group in two lens construction comprising a negative meniscus lens with the convex surface being faced to the object side and a positive lens with the larger curvature surface being faced to the object side arranged in turn from the object side, like the zoom lens in one form, the image side surface of said negative meniscus lens may be formed as an aspherical surface, and by making the first group in such a two-lens construction, it is advantageous for miniaturization with more simplified construction. In addition, if the first group is made in the three-lens construction, it is advantageous to widen the angle of view because the capability for correction of aberration is enhanced.

It is preferable that the third group is formed from a positive lens with the larger curvature surface being faced to the object side, wherein at least one surface is formed in an aspherical surface. According to this construction, it is possible to more excellently correct abaxial aberration such as astigmatism while suppressing the thickness of the third group to the minimum.

Additionally, although the third group may be fixed at the time of variation of magnification, it is possible to increase the degree of freedom for correction of aberration by moving it a little.

Furthermore, in the zoom lens of this type with three-group construction, the abaxial light at the short focus end is most remotely deviated from the optical axis the most object side surface. Therefore, the maximum outer diameter of entire zoom lens is determined by the light effective diameter at the short focus end of the most object side surface in the first group. That is, it is evident that reducing the lens diameter of zoom lens of this type will reduce the height of abaxial light in the most object side surface of the first group.

In order to make the height of abaxial light in the most object side surface in the first group, it is preferred to locate a negative refractive force in the object side and a positive force in the image side in the first group and to strengthen each refractive magnification. However, uselessly strengthening the refractive force makes it difficult to correct an aberration, thereby causing the deterioration of imaging performance.

Therefore, in the other embodiment, the present invention is constructed in such a manner that the first group comprises three lenses: a negative meniscus lens with the convex surface being faced to the object side, a negative lens with the larger curvature surface being faced to the image side, and a positive lens with the larger curvature surface being faced to the object side arranged in turn from the object side, wherein at least one of image side surfaces of negative meniscus lenses of first group is an aspherical surface and satisfies the following condition.

$$-0.05<(Y'/R_6)<0.05$$

Wherein, $R_6$ indicates the radius of curvature of image side surface of positive lens in the first group and<indicates the maximum image height.

When $(Y'/R_6)$ is 0.05 or more, a relatively strong negative refractive force is present in the most image side of the first group, whereby it becomes difficult to reduce the height of light of abaxial light beams in the most object side of the first group. In all of the prior arts, $(Y'/R_6)$ was 0.05 or more and thus sufficient miniaturization of the first group has not been made. Meanwhile, if $(Y'/R_6)$ is −0.05 or less, curvature of an image surface is readily produced and thus it is difficult to secure the abaxial performance.

By forming a surface having a large refractive angle of usual light as an aspherical surface, it becomes possible to suppress the distortional aberration especially at the short focus end, and the light beams become thicker, whereby it is effective in correction of spherical aberration and coma aberration. If an aspherical surface is provided in the second negative meniscus lens, the outer diameter of aspherical lens is reduced and it is advantages in the aspect of machining and cost, as compared to the case where the aspherical surface is provided in the meniscus lens of the most object side.

That is, if at least one of image side surfaces of negative meniscus lenses in the first group is formed as an aspherical surface and at the same time the most image side surface of the first group is made to be of weak refractive force regardless of positive or negative, it is compatible to sufficiently reduce the diameter of the first group and excellently correct an aberration.

In addition, in view of the practical machining and measuring of lens, it is preferable if the image side surface of positive lens in the first group is flat, i.e., $(Y'/R_6)=0$.

Using a so-called flat-convex lens having a flat side, there will be a merit in that a primary standard of flat side is not required or it is not required to provide a curvature on a polishing dish for machining a recess. Furthermore, although it is difficult to measure a surface accuracy in a surface having an excessively large radius of curvature because it is poorly matched with a reference light of conventional interferometer, if the surface is flatly formed, it becomes also easy to measure the surface accuracy because the reference light is to be a plane wave.

In order to further decrease the diameter of the first group, it is preferable to satisfy the following relationship.

$$-1.5<(f_{L3}/f_{G1})<-1.0$$

Wherein, $f_{L3}$ indicates the focal length of positive lens of the first group and $f_{G1}$ indicates the focal length of the first group.

If $(f_{L3}/f_{G1})$ is set to be greater than −1.5, a sufficiently strong positive refractive force is positioned in the image side of the first group, whereby it will be advantageous to decrease the light height of abaxial light beams in the most object side surface of the first group. However, if $(f_{L3}/f_{G1})$ is −1.0 or more, the refractive force will be too strong, and thus the correction of aberration will be difficult.

In addition, if the image side surface of second negative mess lens in the first group is formed as an aspherical surface, it is preferable to satisfy the following conditional relationship.

$$0.7<(f_{L1}/f_{L2})<2.0$$

Herein, $f_{L1}$ indicates the focal length of the negative meniscus lens of the most object side in the first group and $f_{L2}$ indicates the focal length of second negative lens in the first group. This conditional relationship indicates a magnification ratio of two negative lenses, wherein if $(f_{L1}/f_{L2})$ is 2.0 or more, the magnification of second negative lens provided with an aspherical surface becomes strong, whereby the degree of difficulty in the case of manufacturing the lens by forming (mold) is raised because the difference of thickness between the center and periphery of lens is increased, beyond that the influence on the imaging function by the manufacturing error of aspherical surface. Meanwhile, if the parameter $(f_{L1}/f_{L2})$ is 0.7 or less, the magnification of second negative lens provided with an aspherical surface is weakened and the refractive angle of abaxial light in the image side surface is reduced, the effect of aspherical surface is diluted. In addition, more preferably, it is advantageous to satisfy the following condition:

$$0.7<(f_{L1}/f_{L2})<1.5.$$

If refractive force of each lens is strengthen to a certain degree by firstly making the first group have a small size, deterioration of imaging performance by the offset of optical axis among lenses between caused at the time of assembling them in the lens frame tends to be serious. Like this, if the sensitivity of eccentric error is high, it is preferable that the relative eccentricity of negative and positive lenses in the first group is adjustable.

The present invention strengthens the refractive force of positive lens and further provides a negative lens with an aspherical surface, whereby the reciprocation of aberrations between the negative lens and positive lens is increased, wherein it is most efficient to adjust this position because the influence of relative eccentricity of negative lens and positive lens is especially increased. In particular, because an air lens which may be present between the object side surface of positive lens and the image side surface of second meniscus lens plays an important part in correction of aberration if the image side surface of second negative meniscus lens is an aspherical surface, it is preferable to perform the adjustment so that the spherical center of the object side surface of positive lens is positioned on the axis of aspherical surface.

In addition, in order to simplify the adjustment of relative eccentricity of negative lens and positive lens in the first group, it is preferable to make the positive stationary and two negative lenses movable in the direction perpendicular to the optical axis. Furthermore, it is preferable to make two negative lenses integrally adjustable. For example, it can be considered to construct in such a manner that the third lens L3, which is positive, is engaged with a stationary frame 21, and a movable frame 22 is movable to the stationary frame 21, wherein the first lens L1 and second lens L2, both of which are negative, are integrally engaged with the movable frame, as shown in FIG. 79. With this construction, because the movable part is positioned in the most object side of zoom lens, it is easy to externally adjust it or to fix it by adhesion and the like after the adjustment. In FIG. 79, the reference numeral 23 is the adhesion part between the stationary frame 21 and the third lens L3, the reference numeral 22a is a caulking, and the reference numeral 24 is the adhesion part after adjustment.

If said zoom lens is built in a camera or portable information terminal unit as a photographic optical system, it is possible to obtain a compact camera or portable information terminal unit of high image quality.

BRIEF DESCRIPTION OF THE DRAWINGS

FIG. 65 shows an aberration curve in an intermediate focal length of zoom lens of the numerical embodiment 15 of the present invention.

Figure 1:
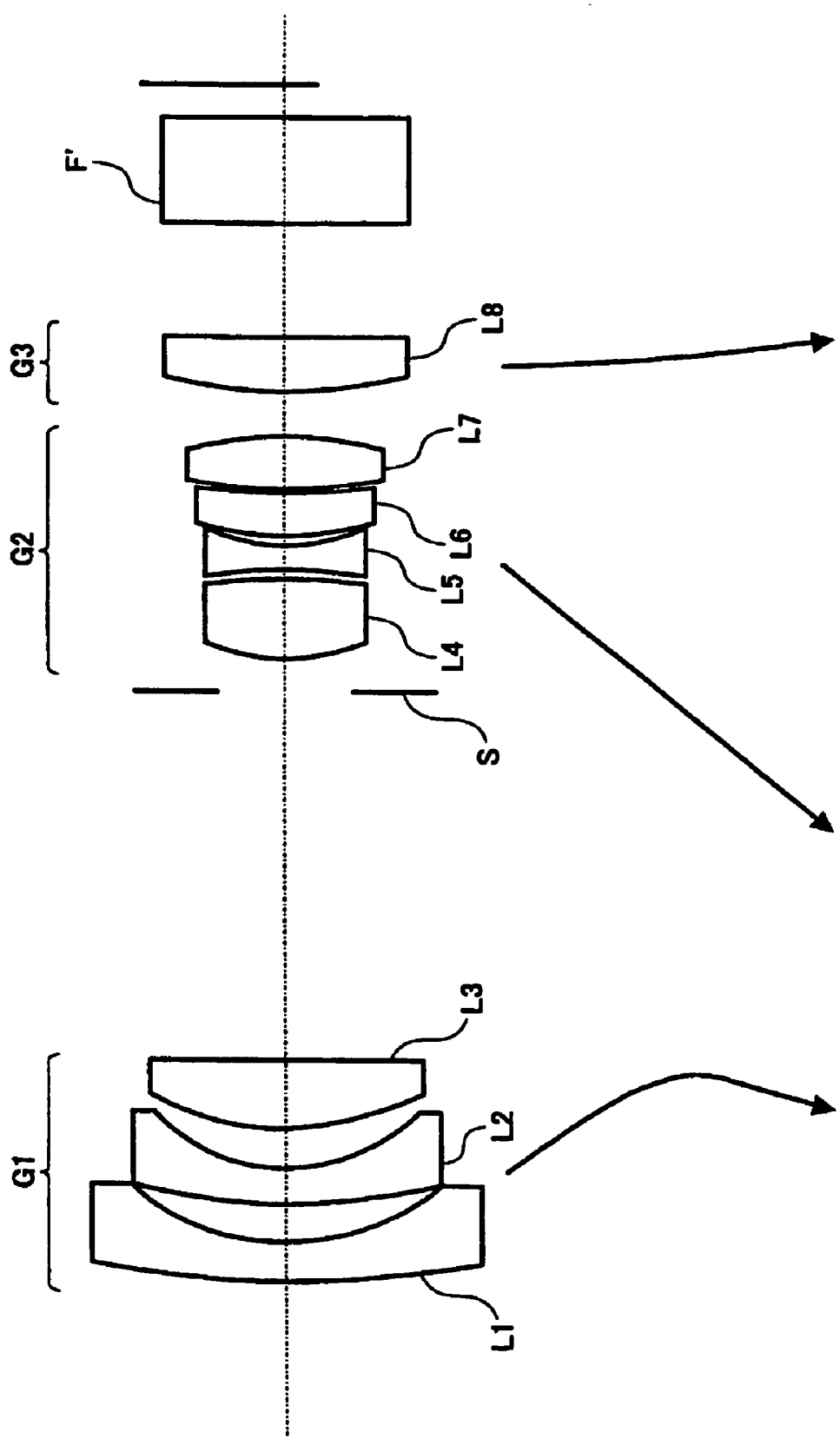
FIG. 1 is a cross-sectional view showing a construction of zoom lens of a numerical embodiment 1.

The dotted lines in the drawings of spherical aberrations indicate sine conditions.

In the drawings of astigmatisms, solid lines indicate sagittal and dotted lines indicate meridional.

Figure 79:
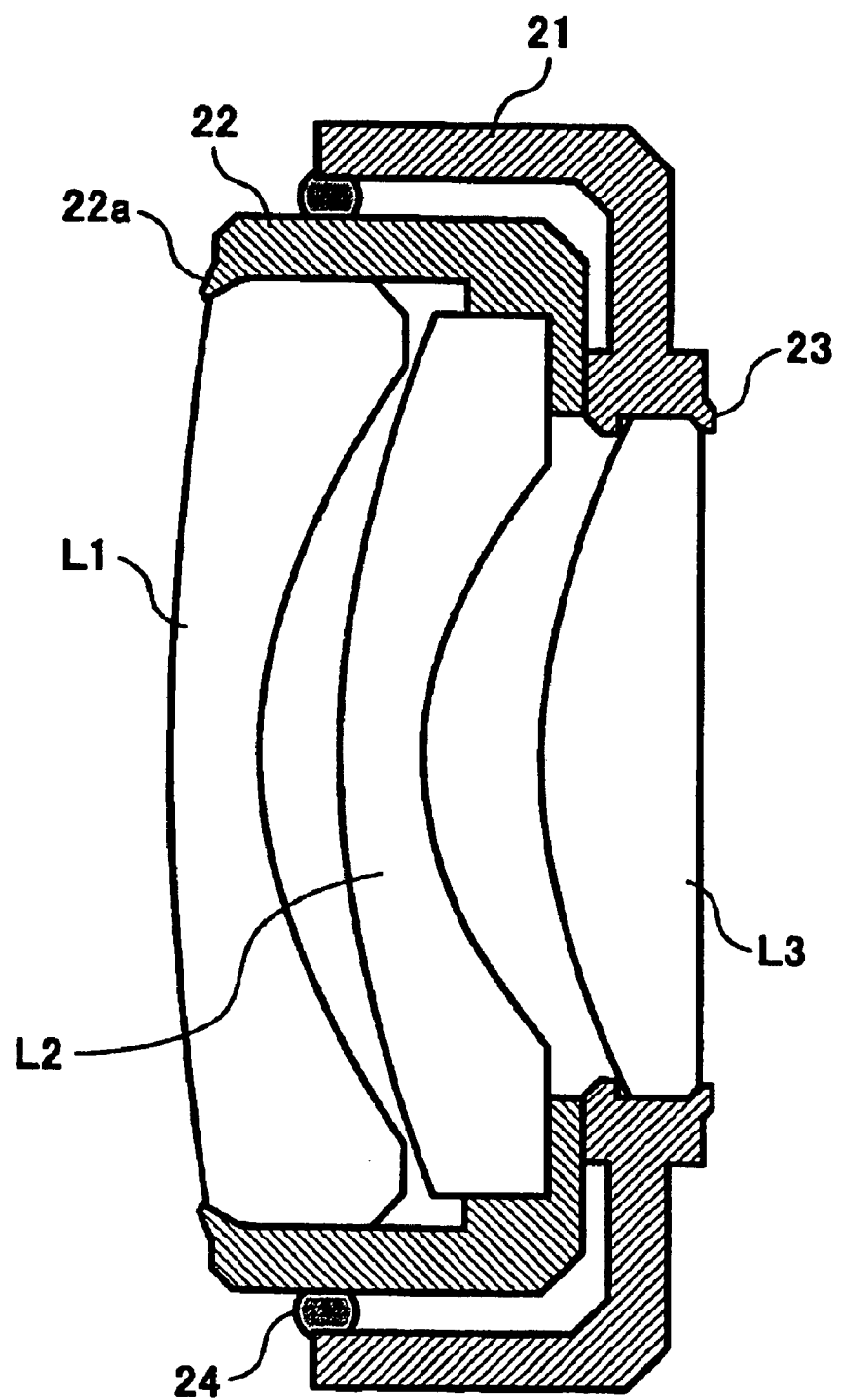

FIG. 79 is a cross-sectional view showing an embodiment of an eccentric adjustment mechanism of the first group according to the present invention.

DETAILED DESCRIPTION OF THE PREFERRED EMBODIMENTS

Hereinafter, embodiments 1 to 5 which correspond to claims 1 to 10, embodiments 6 to 13 which correspond to claims 11 to 30, and embodiments 14 to 19 which correspond to claims 31 to 39 will be explained.

(Embodiments 1 to 5)

Figure 2:
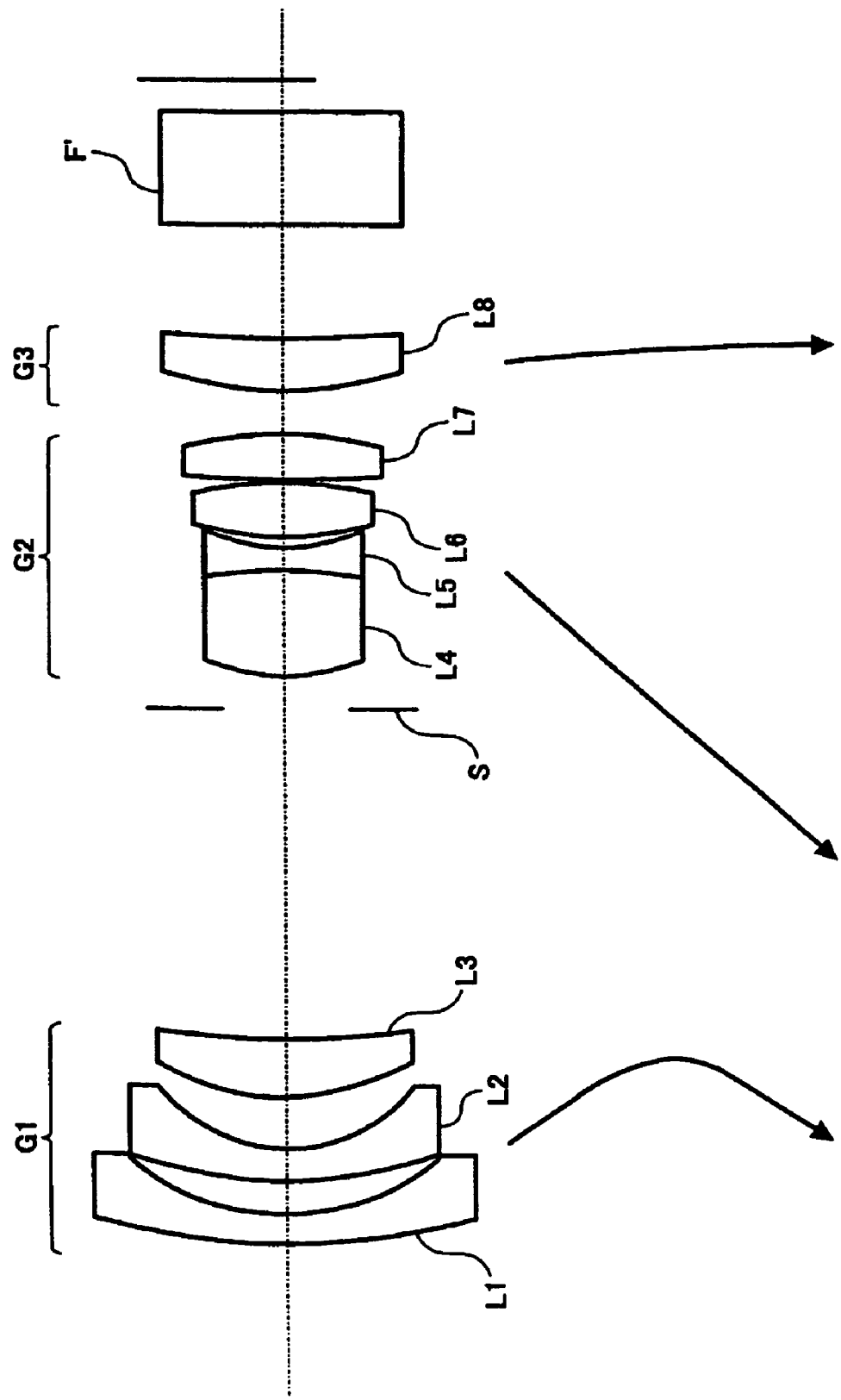
FIG. 2 is a cross-sectional view showing a construction of zoom lens of a numerical embodiment 2.
Figure 3:
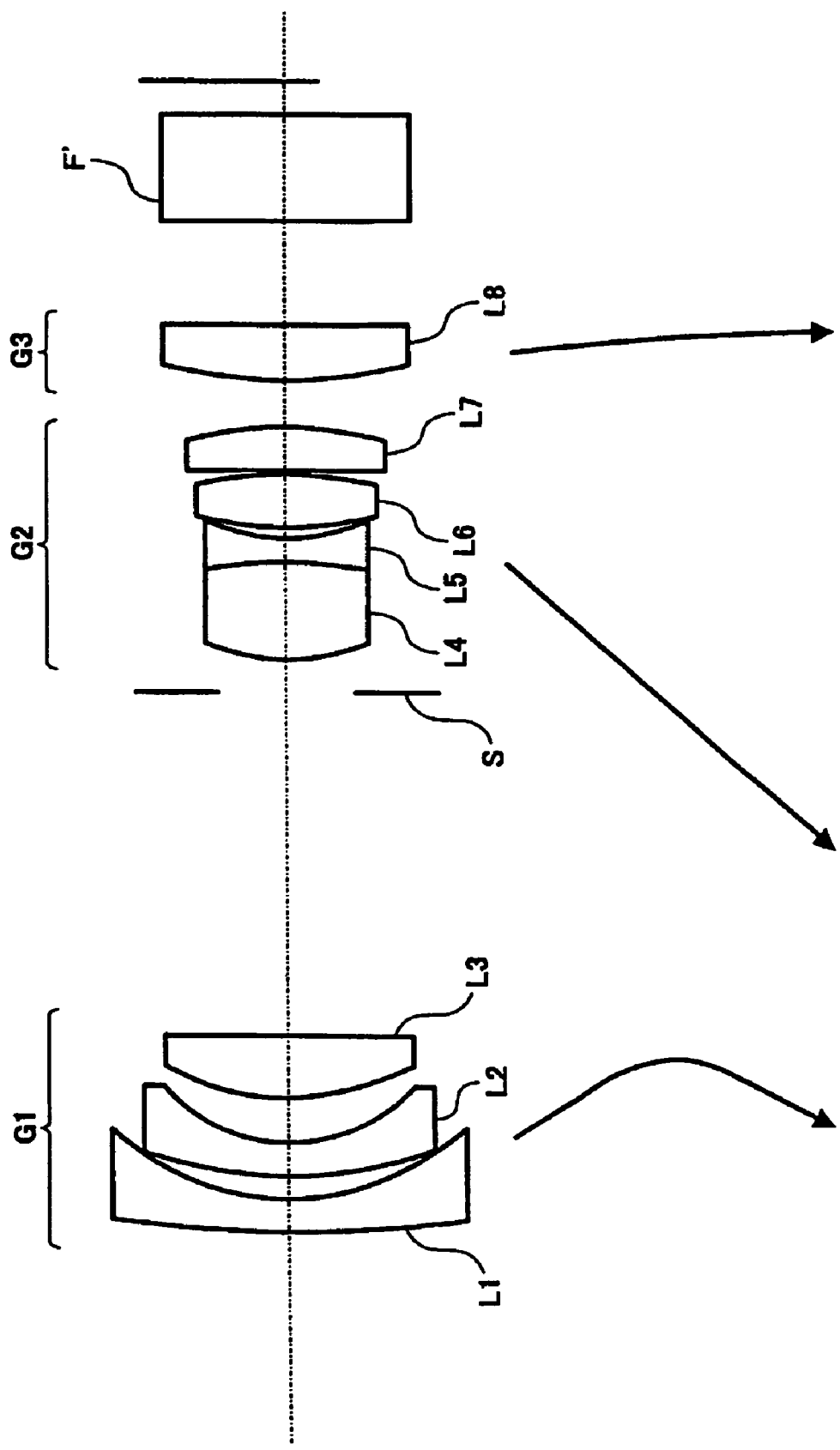
FIG. 3 is a cross-sectional view showing a construction of zoom lens of a numerical embodiment 3.
Figure 4:
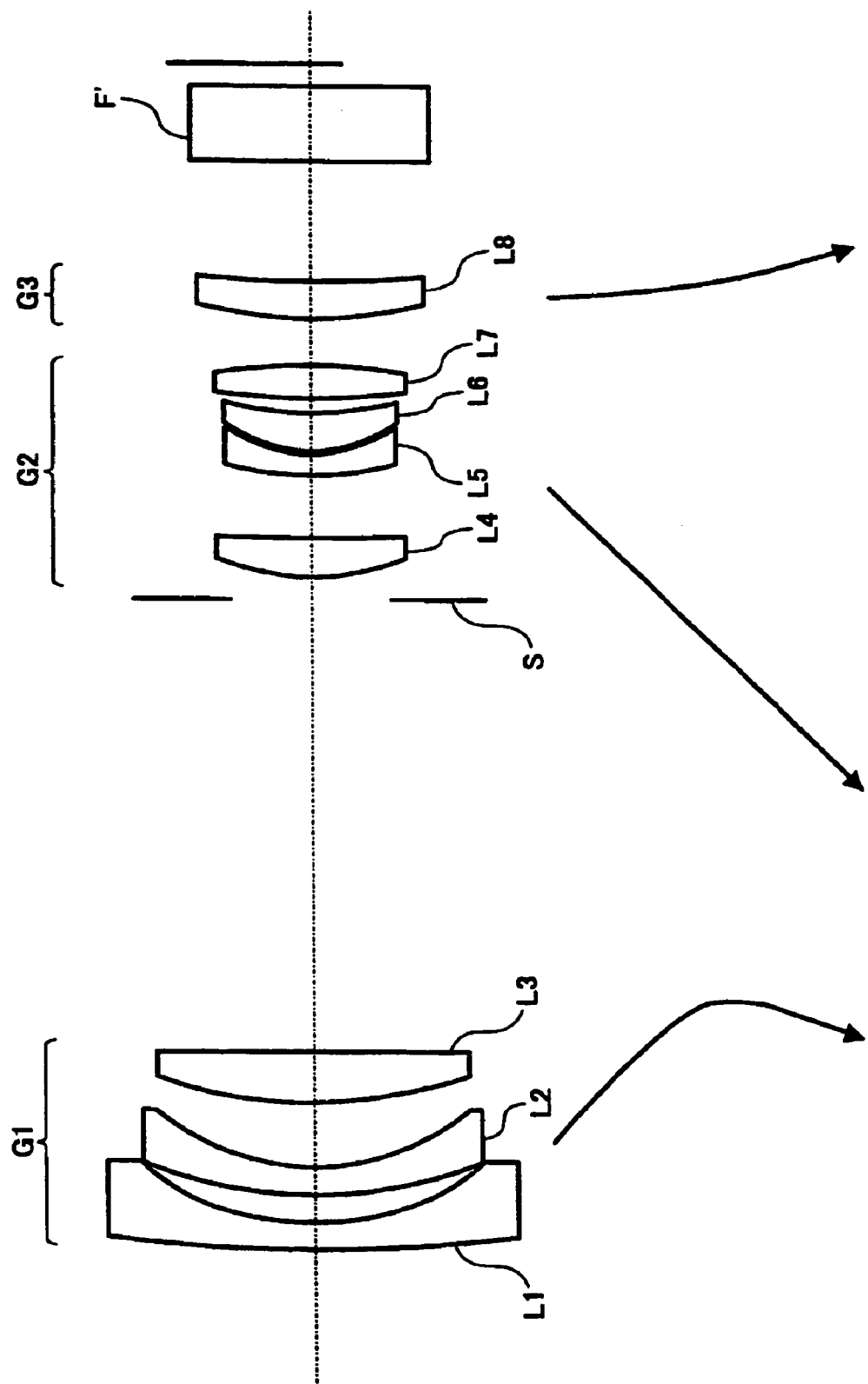
FIG. 4 is a cross-sectional view showing a construction of zoom lens of a numerical embodiment 4.
Figure 5:
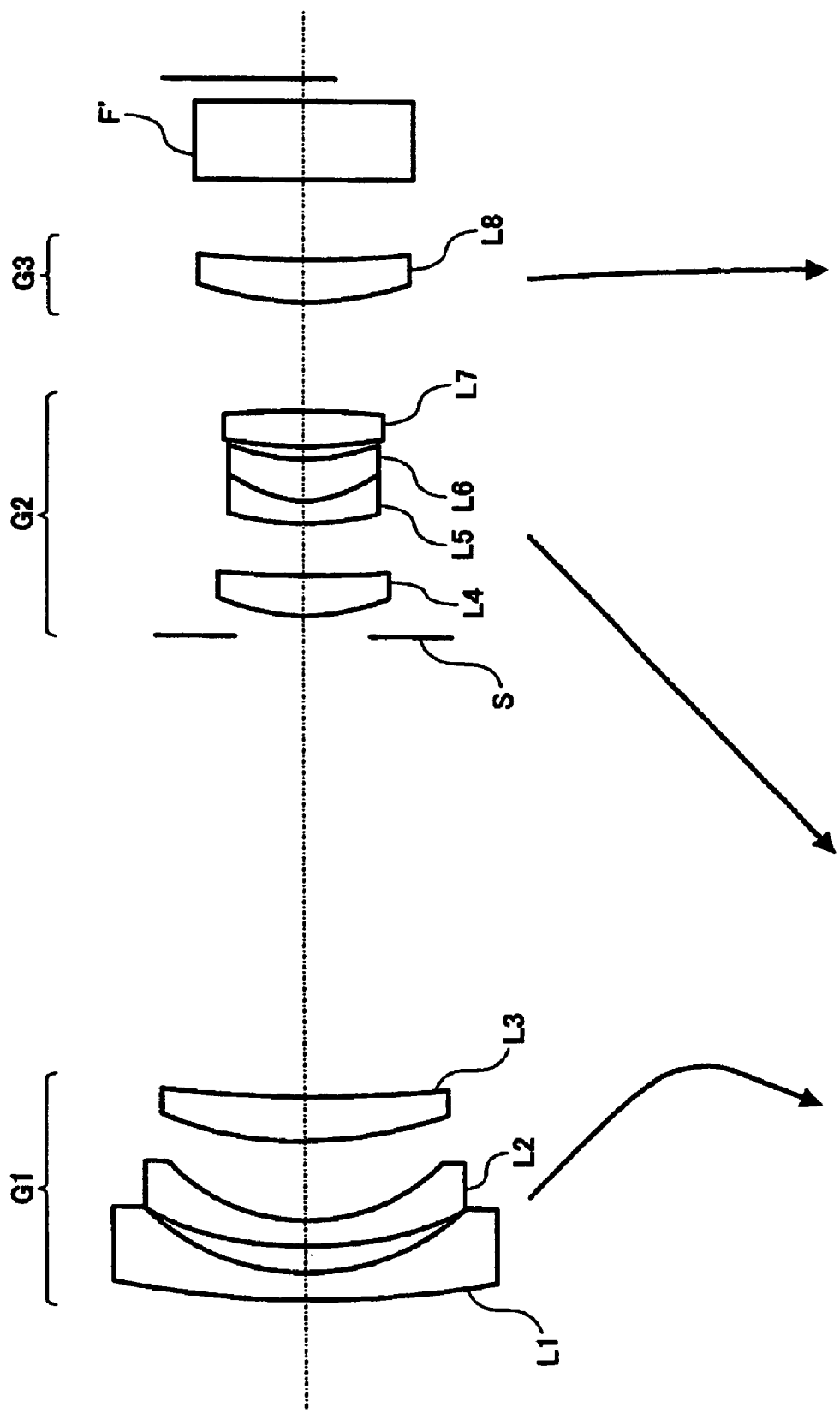
FIG. 5 is a cross-sectional view showing a construction of zoom lens of a numerical embodiment 5.

FIGS. 1 to 5 are cross-sectional views each showing a construction of zoom lenses of numerical embodiments 1 to 5 according to the present invention, wherein FIG. 1 shows a construction of a numerical embodiment 1, FIG. 2 shows a construction of a numerical embodiment 2, FIG. 3 shows a construction of a numerical embodiment 3, FIG. 4 shows a construction of a numerical embodiment 4, and FIG. 5 shows a construction of a numerical embodiment 5.

As shown in FIGS. 1 to 5, the numerical embodiments 1 to 5 of the present invention provides a zoom lenses comprising a first group G1 with a negative focal length, a second group G2 with a positive focal length, and a third group G3 with a positive focal length in turn from an object side, an aperture iris S provided in the object side of the second group G2 to move integral with the second group G2, wherein the second group G2 monotonously moves from the image side to the object side at the time of variation of magnification from a short focus end to a long focus end and the first group G1 moves to correct variation in position of an image face accompanying the variation of magnification, characterized in that each further comprises characteristics features as follows. F" indicates various filters. In addition, in order to further increase degree of freedom of aberration correction, the third group G3 is move a little at the time of variation of magnification.

The zoom lenses of the numerical embodiments 1 to 5 is characterized in that the second group G2 comprises four lenses: a positive lens L4, a negative lens L5, a positive lens L6, and a positive lens L7 in turn from the object side. Due to the relationship that the aperture iris S is located in the object side of the second group G2, the abaxial light passes most remotely separated from the optical axis when it passes a lens surface which is in the image side and most remote from the iris S in the second group G2, whereby the lens surface is deeply concerned in correction of abaxial aberration. Although the second group G2 generally has a symmetrical arrangement having a negative magnification, each side of which is provided with a positive magnification, the image side magnification which is deeply concerned in correction of abaxial aberration is divided into two lenses (a positive lens L6 and a positive lens L7), whereby it is possible to increase the degree of freedom and to excellently correct abaxial aberration.

In order to execute more sufficient aberration correction, it is preferable to satisfy the following relationship.

$$0.9 < (L_{PN}/Y') < 1.4$$

Herein, $L_{PN}$ is the distance from the apex of object side surface of the most object side positive lens L4 in the second group G2 to the image side surface of negative lens L5 which is the second lens from the object side of the second group G2, and Y' indicates the maximum image height. In the second group G2, both of the object side surface of the most object side positive lens L4 and the image side surface of negative lens L5, which is the second from the object side, have small curvatures, reciprocate aberration with each other, and do the greatest deal for correction of aberration. In order to perform excellent correction of aberration, the height of light passing through these two surfaces is important.

If ($L_{PN}/Y'$) is 1.4 or more, the height of on-axis marginal light in the image side lens L5 of negative surface which is the second from the object side becomes too small, whereby it becomes difficult to correct spherical aberration. Furthermore, it is disadvantageous for miniaturization of the second group G2. Meanwhile, if ($L_{PN}/Y'$) is 0.9 or less, the height of main abaxial light in the image side surface of the negative lens L5 which is the second from the object side becomes too small, whereby it becomes difficult to correct astigmatism and coma aberration.

In order to execute more excellent correction of aberration, it is preferred that the second group G2 comprises two or more aspherical surfaces as shown in FIGS. 1, 2, 4 and 5. If two aspherical surfaces are used in the positions in which light passing modes are different, whereby the degree of freedom for correction of aberration can be enhanced.

In order to execute most effective aberration correction, it is preferable that the most object side surface and the most image side surface of the second group G2 are formed in aspherical surfaces. Because the most object side surface of the second group G2 is adjacent to the aperture iris S, on-axial and abaxial light beams pass through them substantially without being separated, and the aspherical surfaces provided herein greatly contribute to correction of astigmatism and the like. Like this, by using the two aspherical surfaces provided in the second group G2 in the most object side surface and the most image side surface, each of aspherical surfaces induces sufficiently different effects, whereby the degree of freedom for correction of aberration.

On the assumption that two aspherical surfaces are used in the second group G2, in order to attain sufficient miniaturization and high performance, it is preferable to satisfy, the following conditional relationship.

$$1.5 < (L_{G2}/Y') < 2.5$$

Herein, $L_{G2}$ indicates the thickness of the second group G2 in the direction of optical axis, Y' indicates the maximum height of image. If ($L_{G2}/Y'$) is 2.5 or more, the thickness of G2 in the direction of optical axis is increased, whereby it is difficult to attain sufficient miniaturization. Meanwhile, if ($L_{G2}/Y'$) is 1.5 or less, the most image side of the second group G2 approaches to the aperture iris S and the effect of aspherical surface cannot be sufficiently exhibited, whereby, it is difficult to sufficiently correct various aberrations.

In the zoom lens of the present invention, in order to more excellently correct each aberration, if is preferred that the first group G1 comprises at least one negative lens L1, L2 with the larger curvature surface being faced to the image side, and at least one positive lens L3 with the larger curvature surface being faced to the object side in turn from the object side, wherein the image side surface of the at least one negative lens (in the embodiment, the negative lens L2) is aspherical, as shown in FIGS. 1 to 5. With this construction of the first group G1, the curvature of an image surface can be reduced, and by forming the surface having a large refractive angle of abaxial light in an aspherical surface, it is possible to suppress distortion aberration, especially at the short focus end. Furthermore, it is possible to provide an aspherical surface in the image side surface of the negative lens L1 instead of providing an aspherical surface in the image side surface of the negative lens L2, and it is also possible to an aspherical surface in each of image side surface of the negative lens L1 and negative lens L2.

In particular, as shown in FIGS. 1 to 5, the first group G1 may comprise three lenses: a negative lens L1 which is a negative meniscus lens with the convex surface being faced to the object side, a negative lens L2 with the larger curvature surface being faced to the image side, and a positive lens L3 with the larger curvature surface being faced to the object side in turn from the object side, wherein the image side surface of the negative lens L2 is aspherical. This construction is advantageous for widening angle of view because the capability of correcting aberration is enhanced.

In the zoom lens of the present invention, the second group may consist of three groups, four lenses: a positive lens L4, a negative lens L5 conjugated with the positive lens L4, a positive lens L6, and a positive lens L7 in turn from the object side, as shown in FIG. 2 and 3. In the second group G2, the object side surface of the most object side positive lens L4 and the image side surface of the negative lens L5 which is the second from the object side reciprocate aberrations as explained in the above, and for this reason, the influence on imaging performance given by the cement error (eccentricity and the like) of these two lenses is sometimes enlarged. By conjugating these two lenses, it becomes possible to suppress the cement error itself to be small.

In the zoom lens of the present invention, the second group G2 may comprise three groups, four lenses: a positive lens L4, a negative lens L5, a positive lens L6 conjugated with the negative lens L5, and a positive lens L7 in turn from the object side, as shown in FIG. 5. In the second group G2, the image side surface of the negative lens L5, the second lens from the object side, and the object side surface of the positive lens L6, the third lens from the object side, will largely reciprocate aberrations if they are designed to have a small difference in curvatures thereof. In such a case, although the influence on imaging performance given by the cement error (eccentricity and the like) of these two lenses is sometimes enlarged, it becomes possible to suppress the cement error itself to be small by conjugating these two lenses.

Herein below, specific numerical embodiments of zoom lens of the present invention will be indicated. The maximum height of image is 3.50 mm in numerical embodiments 1 to 3, and 4.62 mm in numerical embodiments 4 and 5.

The aberrations of the numerical embodiments are sufficiently corrected and adapted to correspond to a light-receiving device with 2,000,000 to 4,000,000 pixels. It is obvious from the embodiments that sufficient miniaturization and very satisfactory image performance can be attained if a zoom lens is constructed according to the present invention.

The meaning of symbols in the numerical embodiments is as follows:

f is focal length of entire system, F is F number, ω is half angle of view, R is radius of curvature, D is inter-surface space, Nd is refractive index, υ d is Abbe number, K is conical constant of aspherical surface, $A_4$ is 4th aspherical coefficient, $A_6$ is 6th aspherical coefficient, $A_8$ is 8th aspherical coefficient, $A_{10}$ is 10th aspherical coefficient, $A_{12}$ is 12th aspherical coefficient, $A_{14}$ is 14th aspherical coefficient, $A_{16}$ is 16th aspherical coefficient, and $A_{18}$ is 18th aspherical coefficient. In addition, "*" in the surface numbers indicates an aspherical surface. Furthermore, the unit of amount having a dimension of length is "mm."

Assuming that a reciprocal of paraxial curvature radius (paraxial curvature) is C, height from optical axis is H, thickness in the direction of optical axis is X, the aspherical surface used herein is defined by a following well-known relationship using conical constant K and aspherical coefficients:

$$X = \{CH^2/1 + \sqrt{(1 - (1 + K) C^2 H^2)}\} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

[Numerical Embodiment 1]
f = 4.33–10.18, F = 2.73–4.00, ω = 40.30–19.19

| Surface Nos. | R | D | Nd | υd | Remarks |
|---|---|---|---|---|---|
| 01 | 29.593 | 1.25 | 1.77250 | 49.62 | first lens: G1 |
|  |  |  |  |  | G1: (first group) |
| 02 | 7.058 | 1.20 |  |  |  |
| 03 | 17.247 | 1.10 | 1.74330 | 049.33 | second lens: G1 |
| 04* | 4.563 | 1.30 |  |  |  |
| 05 | 8.485 | 2.16 | 1.72825 | 28.32 | third lens: G1 |
| 06 | ∞ | variable (A) |  |  |  |
| 07 | iris | 1.00 |  |  |  |
| 08* | 5.283 | 2.61 | 1.72342 | 37.99 | fourth lens: G2 |
| 09 | −20.081 | 0.29 |  |  |  |
| 10 | −12.075 | 0.81 | 1.80518 | 25.46 | fifth lens: G2 |
| 11 | 5.253 | 0.31 |  |  |  |
| 12 | 8.812 | 1.35 | 1.58913 | 61.25 | sixth lens: G2 |
| 13 | 20.251 | 0.10 |  |  |  |
| 14 | 12.502 | 1.73 | 1.48749 | 70.44 | seventh lens: G2 |
| 15* | −8.992 | variable (B) |  |  |  |
| 16* | 13.337 | 1.65 | 1.48749 | 70.44 | eighth lens: G3 |
| 17 | 463.779 | variable (C) |  |  |  |
| 18 | ∞ | 3.25 | 1.51680 | 64.20 | various filters |
| 19 | ∞ |  |  |  |  |

Aspherical surface coefficient of the fourth surface:

K = 0.0, $A_4$ = −1.29720 × $10^{-3}$, $A_6$ = −5.09824 × $10^{-5}$,
$A_8$ = 1.81023 × $10^{-6}$, $A_{10}$ = −2.10769 × $10^{-7}$,
$A_{12}$ = −4.76553 × $10^{-9}$, $A_{14}$ = 8.28677 × $10^{-10}$,
$A_{16}$ = −2.46190 × $10^{-11}$, $A_{18}$ = −4.19978 × $10^{-18}$
Aspherical surface coefficient of the eighth surface:

K = 0.0, $A_4$ = −1.98718 × $10^{-4}$, $A_6$ = −9.47779 × $10^{-6}$,
$A_8$ = 2.05528 × $10^{-6}$, $A_{10}$ = −1.77908 × $10^{-7}$
Aspherical surface coefficient of the fifteenth surface:

K = 0.0, $A_4$ = 5.86592 × $10^{-4}$, $A_6$ = 3.85335 × $10^{-5}$,
$A_8$ = 2.22078 × $10^{-6}$, $A_{10}$ = 1.73297 × $10^{-7}$
Aspherical surface coefficient of the sixteenth surface:

K = 0.0, $A_4$ = −1.97840 × $10^{-4}$, $A_6$ = 1.55183 × $10^{-5}$,
$A_8$ = −1.27195 × $10^{-6}$, $A_{10}$ = 4.39912 × $10^{-8}$
Variable gap

| | Short focus end f = 4.33 | Intermediate focal length f = 6.63 | Long focus end f = 10.18 |
|---|---|---|---|
| A | 11.860 | 5.530 | 1.400 |
| B | 1.450 | 5.230 | 10.810 |
| C | 3.570 | 3.241 | 2.731 |

Numerical values of conditional relationship
($L_{PN}$/Y') = 1.06
($L_{G2}$/Y') = 2.06

[Numerical Embodiment 2]
f = 4.33–10.28, F = 2.75–4.08, ω = 40.30–19.03

| Surface Nos. | R | D | Nd | υd | Remarks |
|---|---|---|---|---|---|
| 01 | 18.152 | 1.00 | 1.77250 | 49.62 | first lens: G1 |
| 02 | 6.948 | 0.99 |  |  |  |

-continued $$X = \{CH^2/1 + \sqrt{(1 - (1 + K) C^2 H^2)}\} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

| | | | | |
|---|---|---|---|---|
| 03 | 13.261 | 1.00 | 1.74330 49.33 | second lens: G1 |
| 04* | 4.130 | 1.63 | | |
| 05 | 7.992 | 1.76 | 1.84666 23.78 | third lens: G1 |
| 06 | 21.770 | variable (A) | | |
| 07 | iris | 1.00 | | |
| 08* | 5.666 | 3.23 | 1.72342 37.99 | fourth lens: G2 |
| 09 | −10.575 | 0.80 | 1.80518 25.46 | fifth lens: G2 |
| 10 | 5.648 | 0.31 | | |
| 11 | 11.807 | 1.70 | 1.51680 64.20 | sixth lens: G2 |
| 12 | −11.807 | 0.10 | | |
| 13 | ∞ | 1.34 | 1.51680 64.20 | seventh lens: G2 |
| 14* | −15.216 | variable (B) | | |
| 15* | 11.050 | 1.64 | 1.48749 70.44 | eighth lens: G3 |
| 16 | 47.539 | variable (C) | | |
| 17 | ∞ | 3.25 | 1.51680 64.20 | various filters |
| 18 | ∞ | | | |

Aspherical surface coefficient of the fourth surface:

$K = 0.0, A_4 = -1.36732 \times 10^{-3}, A_6 = -6.93407 \times 10^{-5},$
$A_8 = -7.84082 \times 10^{-6}, A_{10} = 2.83825 \times 10^{-7},$
$A_{12} = -5.78120 \times 10^{-6}, A_{14} = -7.22128 \times 10^{-10},$
$A_{16} = 4.13152 \times 10^{-10}, A_{18} = -1.85992 \times 10^{-11}$ Aspherical surface coefficient of the eighth surface:

$K = 0.0, A_4 = -4.08236 \times 10^{-4}, A_6 = -7.50989 \times 10^{-6},$
$A_8 = 7.45071 \times 10^{-7}, A_{10} = -9.85596 \times 10^{-8}$ Aspherical surface coefficient of the fourteenth surface:

$K = 0.0, A_4 = 6.16408 \times 10^{-5}, A_6 = 4.52472 \times 10^{-6},$
$A_8 = 2.22316 \times 10^{-7}, A_{10} = -1.94698 \times 10^{-8}$ Aspherical surface coefficient of the fifteenth surface:

$K = 0.0, A_4 = -2.44412 \times 10^{-4}, A_6 = 1.88531 \times 10^{-5},$
$A_8 = -1.48017 \times 10^{-6}, A_{10} = 4.92294 \times 10^{-8}$ Variable gap

| | Short focus end $f = 4.33$ | Intermediate focal length $f = 6.64$ | Long focus end $f = 10.28$ |
|---|---|---|---|
| A | 10.380 | 5.120 | 1.400 |
| B | 1.450 | 5.600 | 10.980 |
| C | 3.442 | 2.939 | 2.873 |

Numerical values of conditional relationship
$(L_{PN}/Y') = 1.15$
$(L_{G2}/Y') = 2.14$

[Numerical Embodiment 3]
$f = 4.33–10.19, F = 2.67–4.01, \omega = 40.70–19.11$

| Surface Nos. | R | D | Nd | νd | Remarks |
|---|---|---|---|---|---|
| 01 | 53.342 | 1.03 | 1.77250 | 49.62 | first lens: G1 |
| 02 | 8.037 | 0.73 | | | |
| 03 | 13.775 | 1.00 | 1.74330 | 49.33 | second lens: G1 |
| 04* | 4.214 | 1.45 | | | |
| 05 | 8.951 | 1.99 | 1.74077 | 27.76 | third lens: G1 |
| 06 | ∞ | variable (A) | | | |
| 07 | iris | 1.00 | | | |
| 08* | 5.685 | 3.04 | 1.80610 | 37.27 | fourth lens: G2 |
| 09 | −12.982 | 0.80 | 1.84666 | 23.78 | fifth lens: G2 |
| 10 | 5.150 | 0.35 | | | |
| 11 | 12.099 | 1.66 | 1.49700 | 81.61 | sixth lens: G2 |
| 12 | −12.099 | 0.12 | | | |
| 13 | −71.229 | 1.30 | 1.49700 | 81.61 | seventh lens: G2 |
| 14 | −14.821 | variable (B) | | | |
| 15* | 10.924 | 1.81 | 1.49700 | 81.61 | eighth lens: G3 |
| 16 | 273.119 | variable (C) | | | |
| 17 | ∞ | 3.25 | 1.51680 | 64.20 | various filters |
| 18 | ∞ | | | | |

-continued $$X = \{CH^2/1 + \sqrt{(1 - (1 + K) C^2 H^2)}\} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

Aspherical surface coefficient of the fourth surface:

$K = 0.0, A_4 = -1.78480 \times 10^{-3}, A_6 = 2.57794 \times 10^{-6},$
$A_8 = -1.85124 \times 10^{-5}, A_{10} = 2.70432 \times 10^{-6},$
$A_{12} = -2.20540 \times 10^{-7}, A_{14} = 4.63624 \times 10^{-9},$
$A_{16} = 3.18005 \times 10^{-10}, A_{18} = -1.58854 \times 10^{-11}$ Aspherical surface coefficient of the eighth surface:

$K = 0.0, A_4 = -2.95071 \times 10^{-4}, A_6 = -3.13869 \times 10^{-5},$
$A_8 = 5.35642 \times 10^{-6}, A_{10} = -4.09858 \times 10^{-7}$ Aspherical surface coefficient of the fifteenth surface:

$K = 0.0, A_4 = -3.31876 \times 10^{-4}, A_6 = 2.64955 \times 10^{-5},$
$A_8 = -1.99490 \times 10^{-6}, A_{10} = 5.74717 \times 10^{-8}$ Variable gap

| | Short focus end $f = 4.33$ | Intermediate focal length $f = 6.64$ | Long focus end $f = 10.19$ |
|---|---|---|---|
| A | 11.820 | 5.240 | 1.400 |
| B | 1.440 | 5.660 | 11.330 |
| C | 3.250 | 2.889 | 2.748 |

Numerical values of conditional relationship
$(L_{PN}/Y') = 1.10$
$(L_{G2}/Y') = 2.08$

[Numerical Embodiment 4]
$f = 5.97–16.88, F = 2.62–4.36, \omega = 39.23–15.52$

| Surface Nos. | R | D | Nd | νd | Remarks |
|---|---|---|---|---|---|
| 01 | 70.388 | 1.20 | 1.77250 | 49.62 | first lens: G1 |
| 02 | 10.023 | 1.26 | | | |
| 03 | 17.180 | 1.20 | 1.74330 | 49.33 | second lens: G1 |
| 04* | 7.054 | 2.98 | | | |
| 05 | 15.475 | 2.49 | 1.71736 | 29.50 | third lens: G1 |
| 06 | −592.689 | variable (A) | | | |
| 07 | iris | 1.00 | | | |
| 08* | 8.278 | 1.84 | 1.69350 | 53.20 | fourth lens: G2 |
| 09 | 48.706 | 2.86 | | | |
| 10 | 12.452 | 1.00 | 1.84666 | 23.78 | fifth lens: G2 |
| 11 | 5.338 | 0.16 | | | |
| 12 | 5.761 | 1.67 | 1.48749 | 70.44 | sixth lens: G2 |
| 13 | 10.083 | 0.62 | | | |
| 14 | 25.534 | 1.64 | 1.58913 | 61.25 | seventh lens: G2 |
| 15* | −33.377 | variable (B) | | | |
| 16* | 15.427 | 1.76 | 1.58913 | 61.25 | eighth lens: G3 |
| 17 | 42.788 | variable (C) | | | |
| 18 | ∞ | 3.33 | 1.51680 | 64.20 | various filters |
| 19 | ∞ | | | | |

Aspherical surface coefficient of the fourth surface:

$K = 0.0, A_4 = -3.90444 \times 10^{-4}, A_6 = -8.14745 \times 10^{-6},$
$A_8 = 4.05425 \times 10^{-7}, A_{10} = -2.37422 \times 10^{-8},$
$A_{12} = 4.83887 \times 10^{-10}, A_{14} = -3.00058 \times 10^{-13},$
$A_{16} = -1.47703 \times 10^{-13}, A_{18} = 1.35176 \times 10^{-15}$ Aspherical surface coefficient of the eighth surface:

$K = 0.0, A_4 = -21.19781 \times 10^{-4}, A_6 = -9.57080 \times 10^{-7},$
$A_8 = -1.21055 \times 10^{-8}, A_{10} = -4.74520 \times 10^{-10}$ Aspherical surface coefficient of the fifteenth surface:

$K = 0.0, A_4 = 6.26695 \times 10^{-5}, A_6 = -1.53604 \times 10^{-6},$
$A_8 = 2.74416 \times 10^{-7}, A_{10} = -2.31852 \times 10^{-6}$ Aspherical surface coefficient of the sixteenth surface:

$K = 0.0, A_4 = -4.48058 \times 10^{-5}, A_6 = 4.63819 \times 10^{-6},$
$A_8 = -2.28407 \times 10^{-7}, A_{10} = 4.37430 \times 10^{-9}$ Variable gap -continued $$X = \{CH^2/1 + \sqrt{(1 - (1 + K) C^2 H^2)}\} + A_4 \cdot H^4 + A_6 \cdot H^6 + A_8 \cdot H^8 + A_{10} \cdot H^{10} + A_{12} \cdot H^{12} + A_{14} \cdot H_{14} + A_{16} \cdot H^{16} + A_{18} \cdot H^{18}$$

| | Short focus end f = 5.97 | Intermediate focal length f = 10.04 | Long focus end f = 16.88 |
|---|---|---|---|
| A | 20.636 | 8.566 | 1.584 |
| B | 2.137 | 8.266 | 18.481 |
| C | 5.240 | 4.611 | 3.042 |

Numerical values of conditional relationship
$(L_{pN}/Y') = 1.23$
$(L_{G2}/Y') = 2.11$

[Numerical Embodiment 5]
f = 5.97–16.88, F = 2.68–4.42, ω = 39.20–15.52

| Surface Nos. | R | D | Nd | vd | Remarks |
|---|---|---|---|---|---|
| 01 | 51.310 | 1.20 | 1.74330 | 49.22 | first lens: G1 |
| 02 | 9.499 | 1.12 | | | |
| 03 | 14.486 | 1.20 | 1.80610 | 40.74 | second lens: G1 |
| 04* | 6.911 | 3.47 | | | |
| 05 | 15.461 | 2.06 | 1.84666 | 23.78 | third lens: G1 |
| 06 | 56.433 | variable (A) | | | |
| 07 | iris | 1.00 | | | |
| 08* | 8.571 | 1.81 | 1.74330 | 49.33 | fourth lens: G2 |
| 09 | 38.021 | 2.22 | | | |
| 10 | 10.292 | 1.00 | 1.84666 | 23.78 | fifth lens: G2 |
| 11 | 4.918 | 1.83 | 1.48749 | 70.44 | sixth lens: G2 |
| 12 | 8.816 | 0.57 | | | |
| 13 | 22.000 | 1.61 | 1.48749 | 70.44 | seventh lens: G2 |
| 14* | −33.647 | variable (B) | | | |
| 15 | 13.767 | 1.83 | 1.51680 | 64.20 | eighth lens: G3 |
| 16 | 39.444 | variable (C) | | | |
| 17 | ∞ | 3.33 | 1.51680 | 64.20 | various filters |
| 18 | ∞ | | | | |

Aspherical surface coefficient of the fourth surface:

$K = 0.0$, $A_4 = -3.5021030 \times 10^{-4}$, $A_6 = -8.45461 \times 10^{-6}$,
$A_8 = 3.87166 \times 10^{-7}$, $A_{10} = -2.37791 \times 10^{-8}$,
$A_{12} = 4.86388 \times 10^{-10}$, $A_{14} = -3.79112 \times 10^{-18}$,
$A_{16} = -1.52048 \times 10^{-18}$, $A_{18} = 1.32833 \times 10^{-15}$ Aspherical surface coefficient of the eighth surface:

$K = 0.0$, $A_4 = -9.80638 \times 10^{-5}$, $A_6 = -3.44779 \times 10^{-7}$,
$A_8 = -4.47522 \times 10^{-8}$, $A_{10} = -8.37430 \times 10^{-10}$ Aspherical surface coefficient of the fourteenth surface:

$K = 0.0$, $A_4 = 1.83538 \times 10^{-4}$, $A_6 = 6.09812 \times 10^{-7}$,
$A_8 = 3.72360 \times 10^{-7}$, $A_{10} = -1.70939 \times 10^{-8}$ Aspherical surface coefficient of the fifteenth surface:

$K = 0.0$, $A_4 = -4.21513 \times 10^{-5}$, $A_6 = 2.95947 \times 10^{-6}$,
$A_8 = -1.23500 \times 10^{-7}$, $A_{10} = 2.32351 \times 10^{-9}$ Variable gap

| | Short focus end f = 5.97 | Intermediate focal length f = 10.05 | Long focus end f = 16.88 |
|---|---|---|---|
| A | 20.111 | 8.930 | 2.078 |
| B | 4.759 | 10.445 | 19.078 |
| C | 3.457 | 3.056 | 3.054 |

Figure 6:
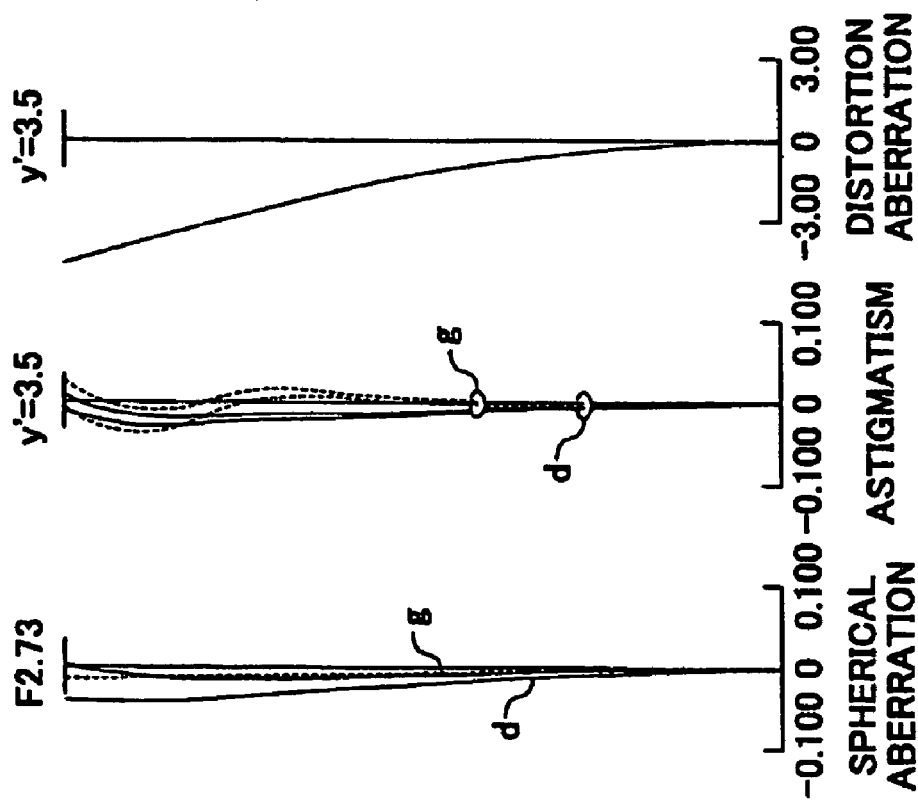
FIG. 6 shows an aberration curve in a short focus end of the zoom lens of the numerical embodiment 1.
Figure 7:
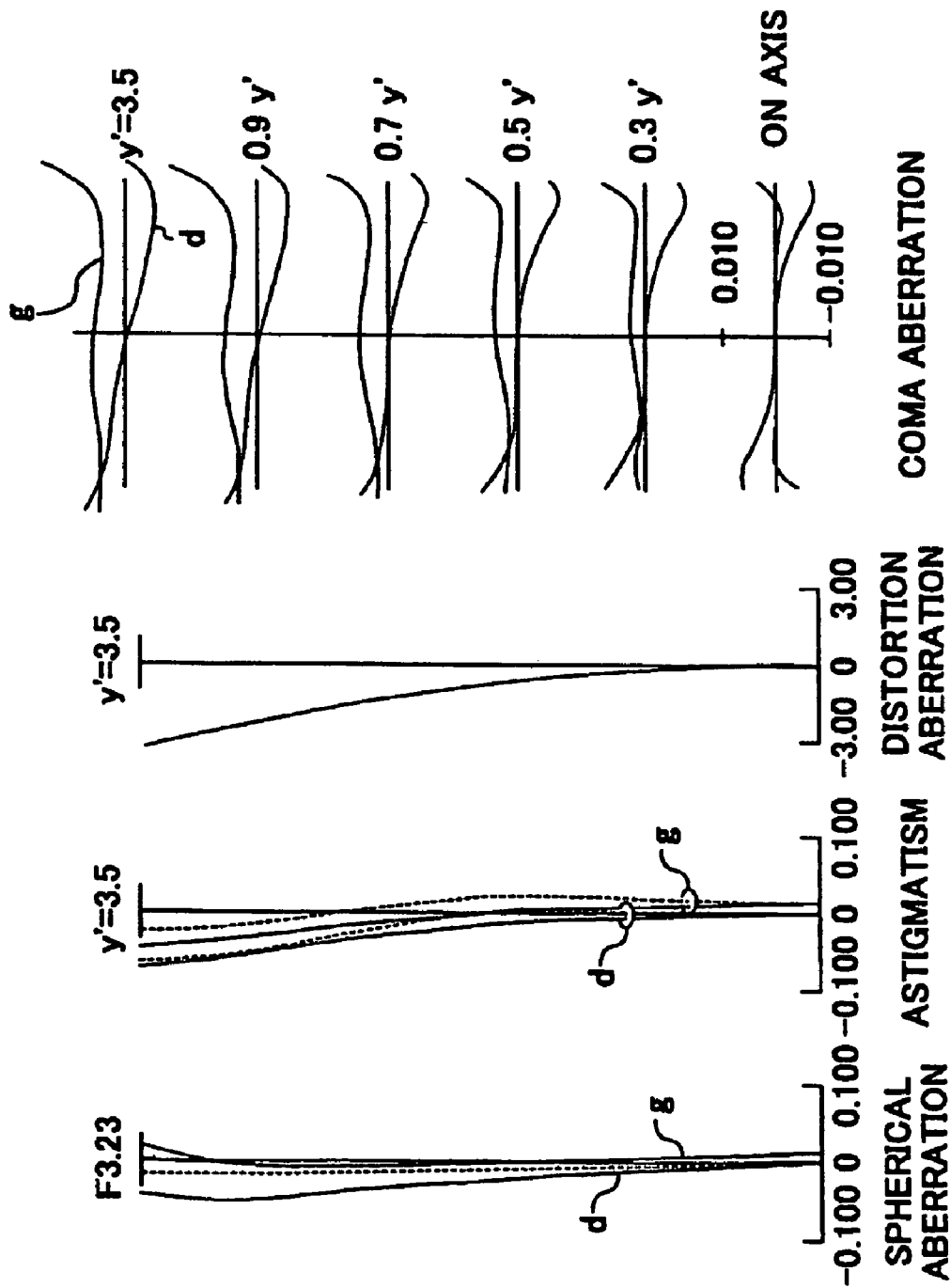
FIG. 7 shows an aberration curve in an intermediate focal length of the zoom lens of the numerical embodiment 1.
Figure 8:
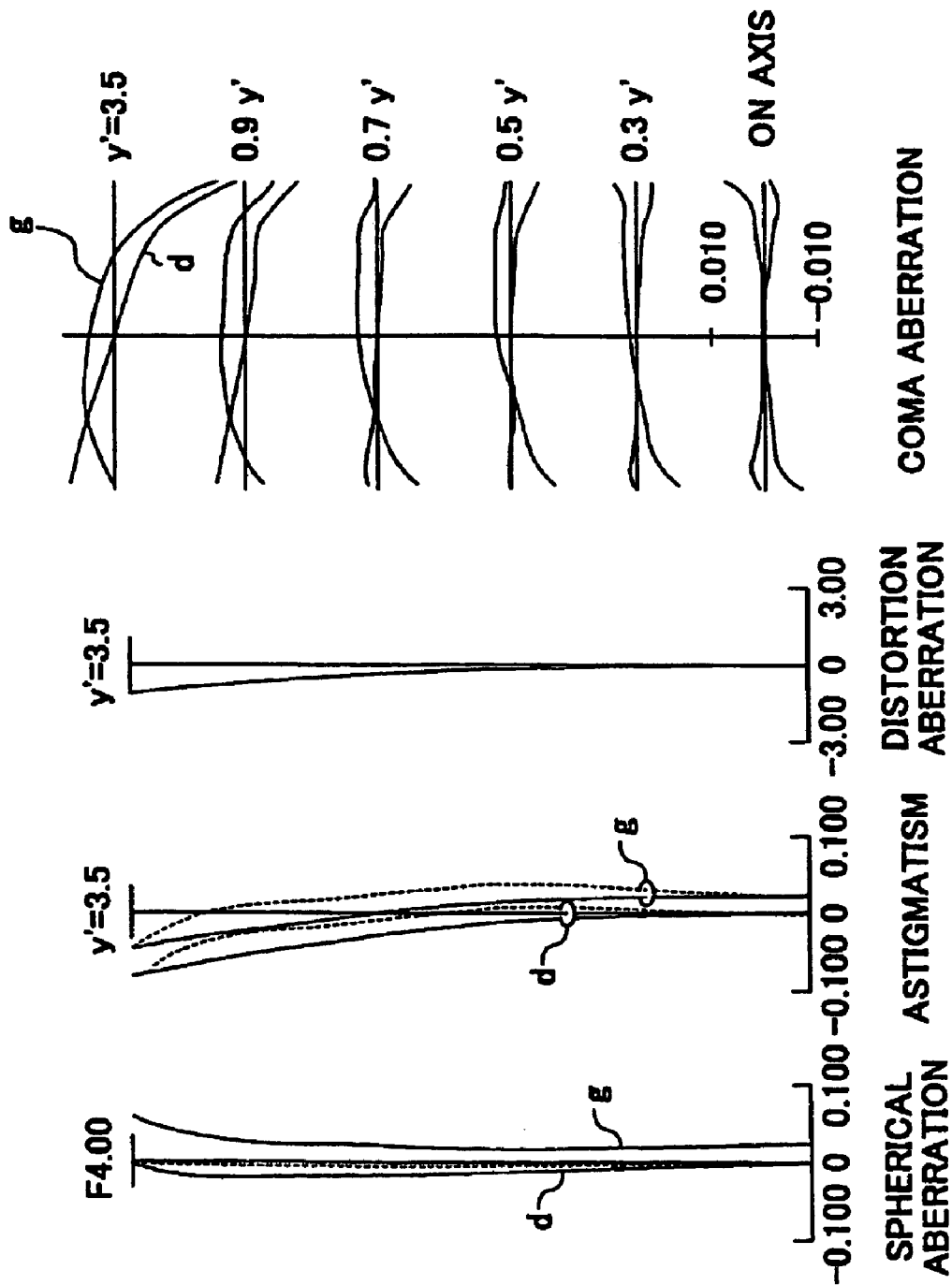
FIG. 8 shows an aberration curve in a long focus end of the zoom lens of the numerical embodiment 1.
Figure 9:
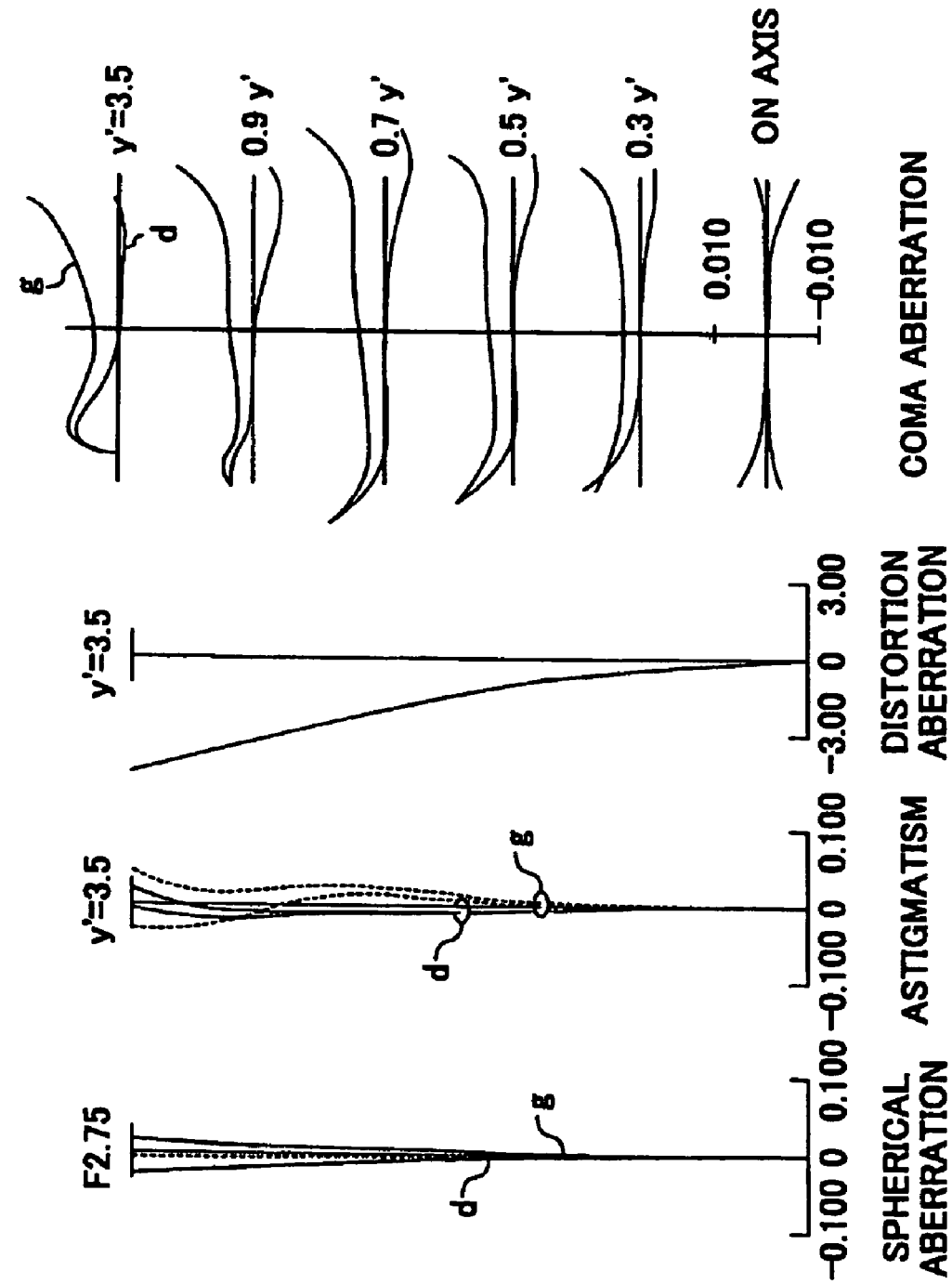
FIG. 9 shows an aberration curve in a short focus end of the zoom lens of the numerical embodiment 2.
Figure 10:
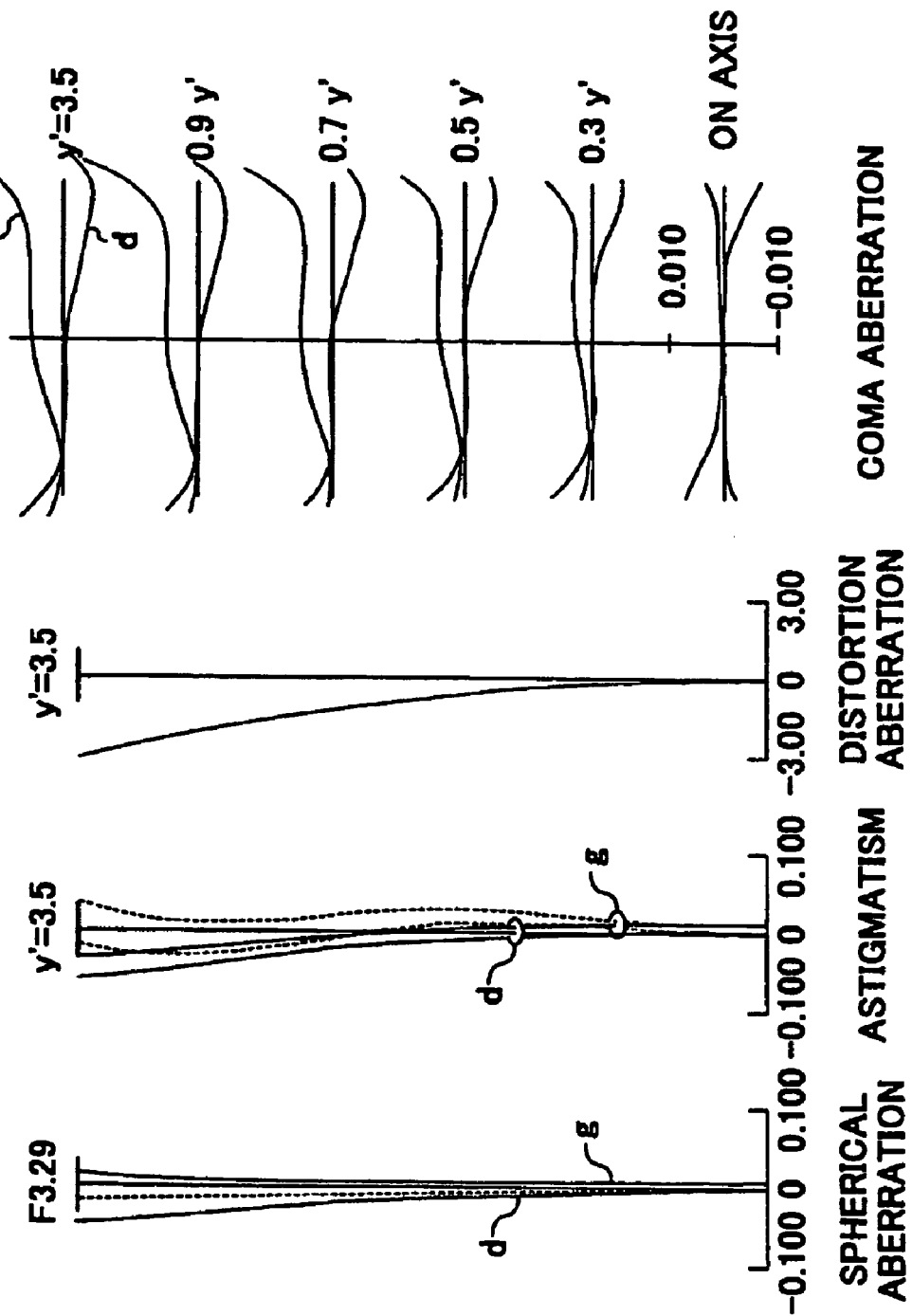
FIG. 10 shows an aberration curve in an intermediate focal length of the zoom lens of the numerical embodiment 2.
Figure 11:
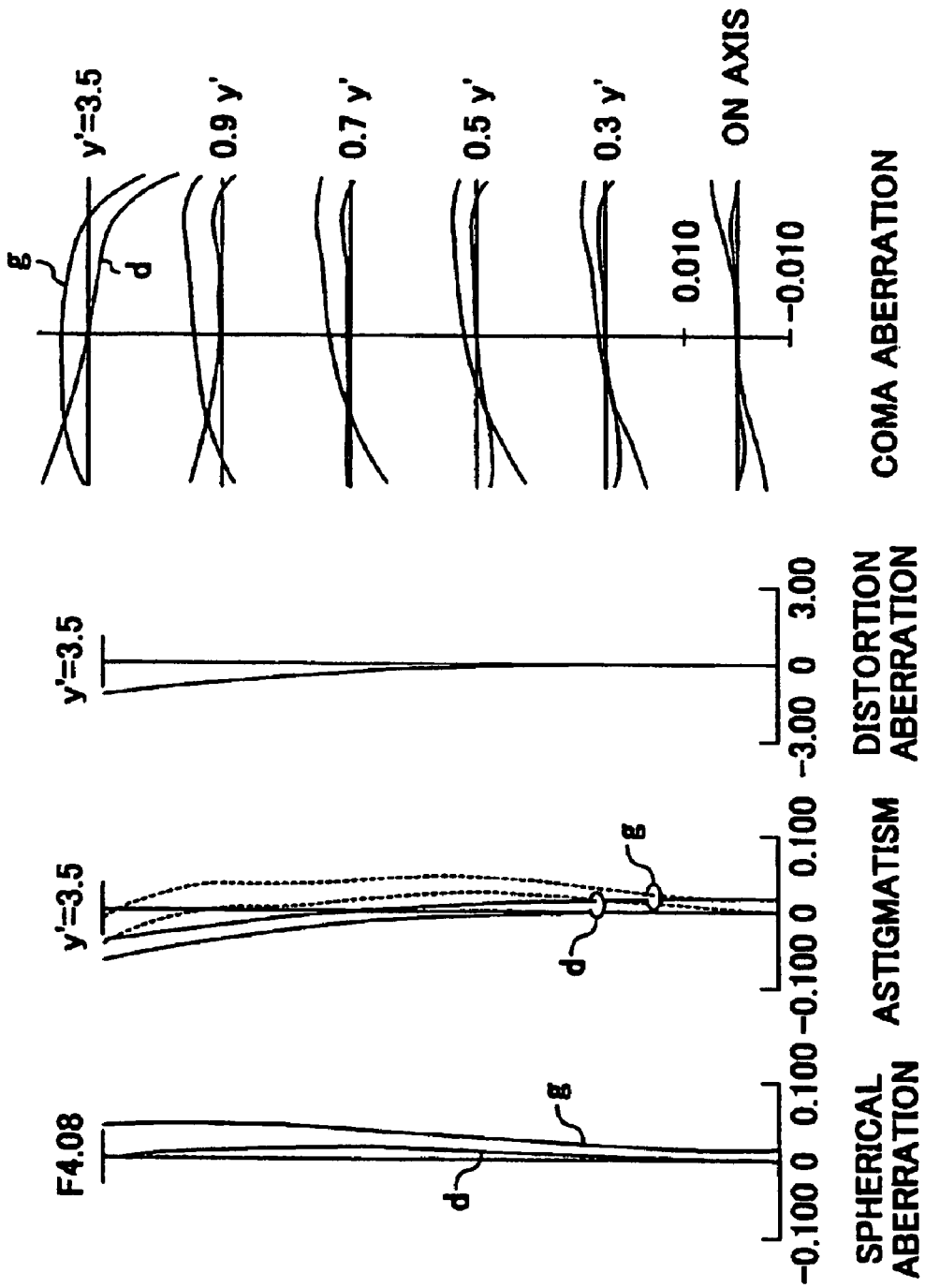
FIG. 11 shows an aberration curve in a long focus end of the zoom lens of the numerical embodiment 2.
Figure 12:
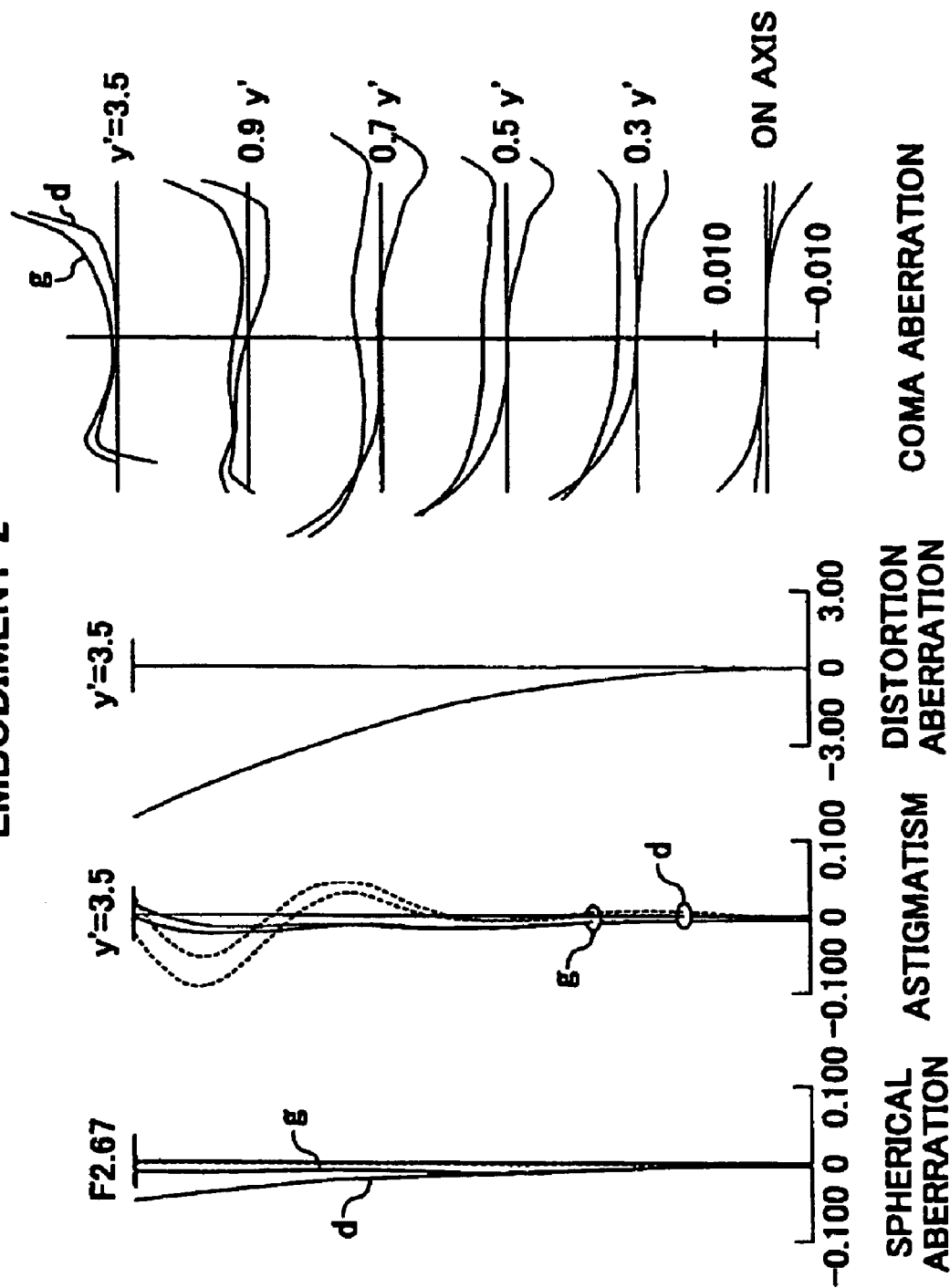
FIG. 12 shows an aberration curve in a short focus end of the zoom lens of the numerical embodiment 3.
Figure 13:
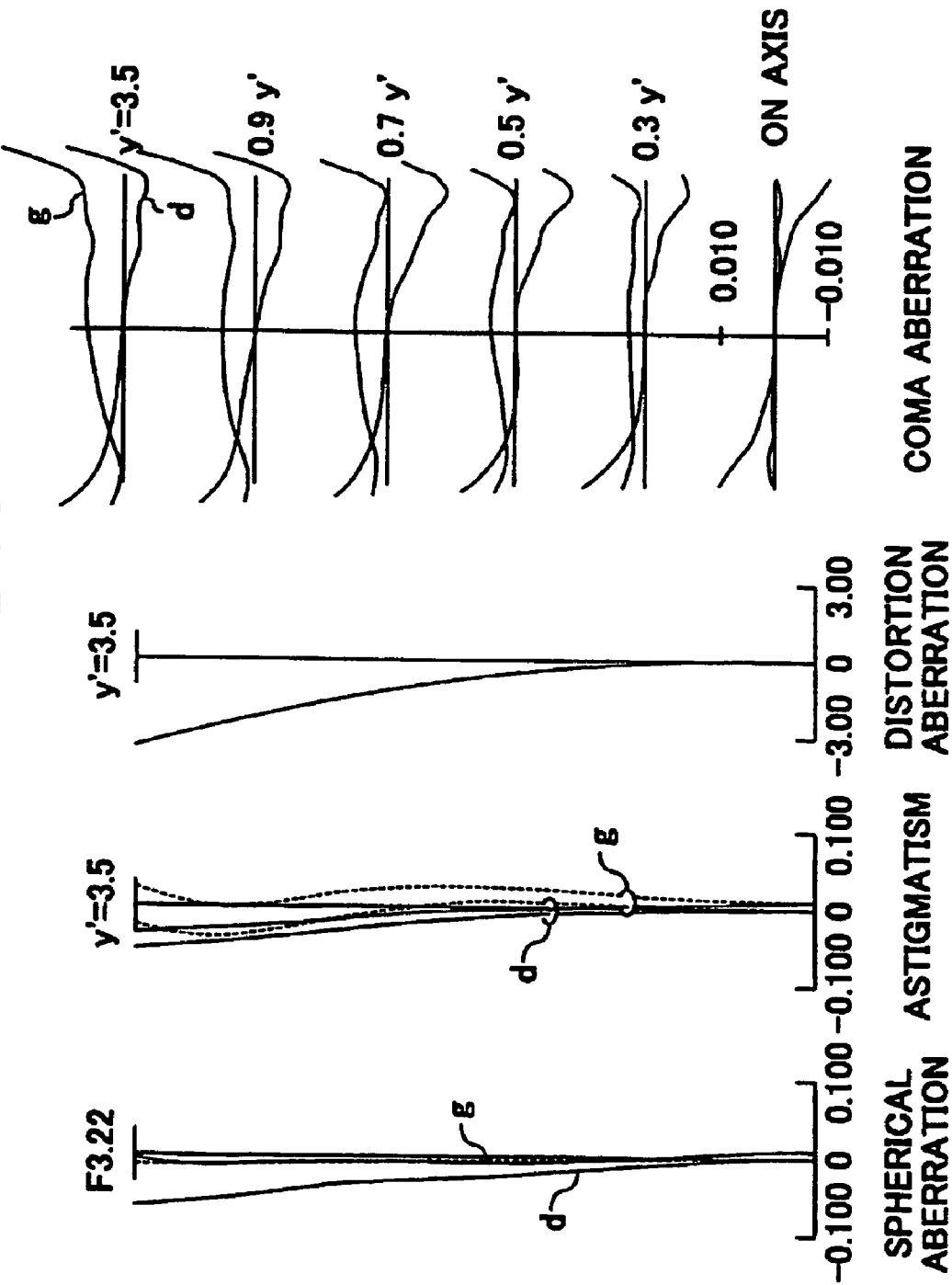
FIG. 13 shows an aberration curve in an intermediate focal length of the zoom lens of the numerical embodiment 3.
Figure 14:
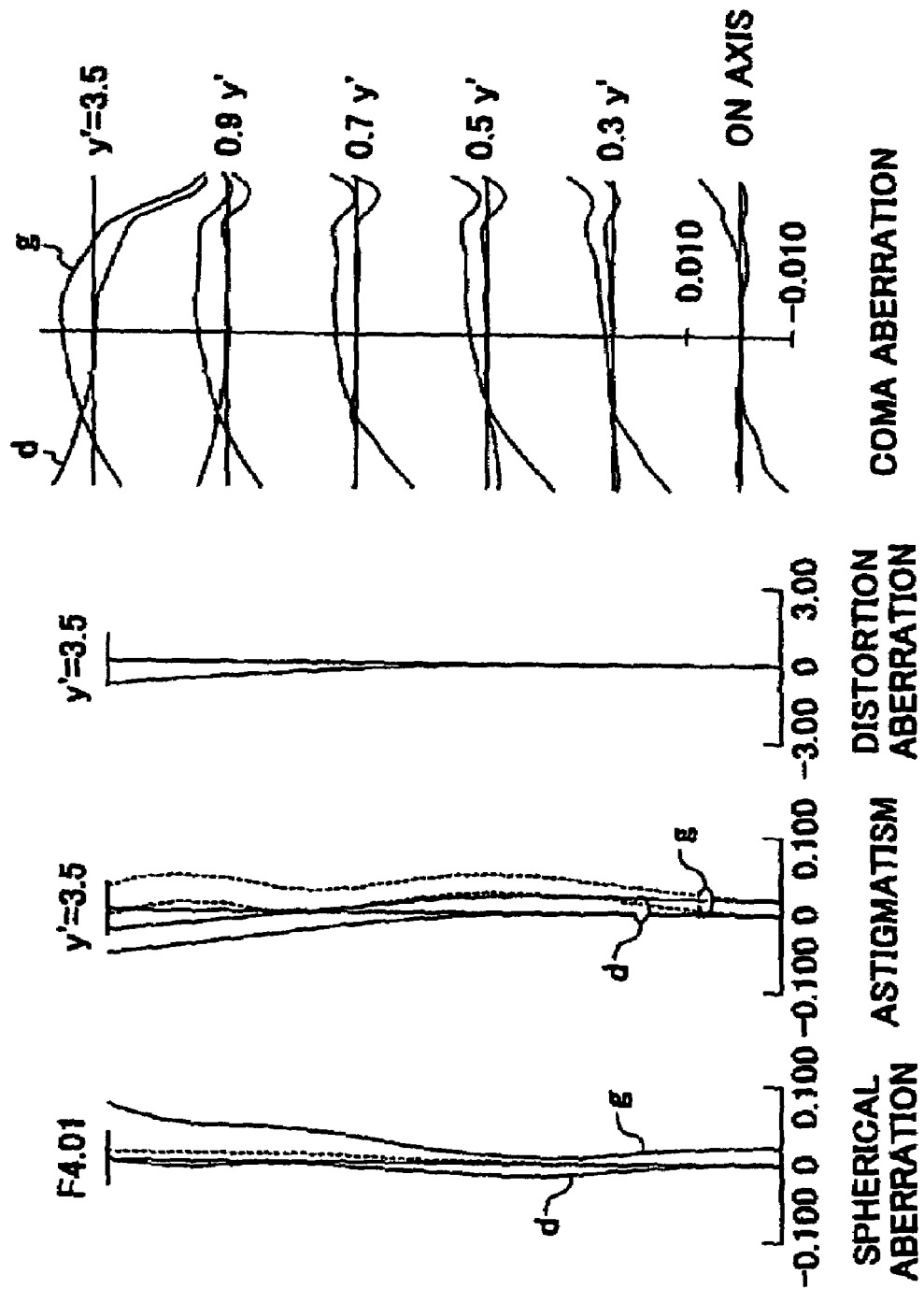
FIG. 14 shows an aberration curve in a long focus end of the zoom lens of the numerical embodiment 3.
Figure 15:
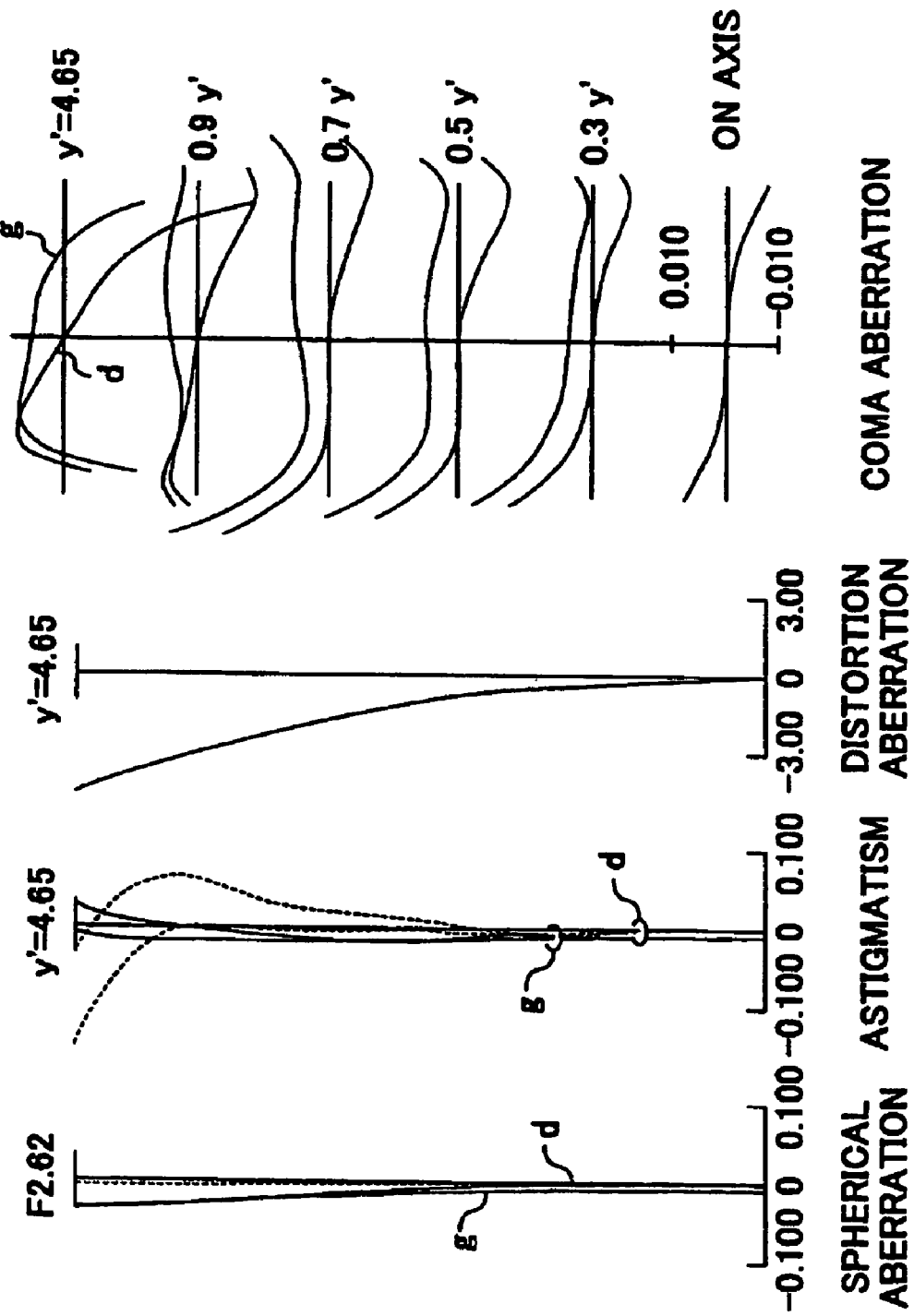
FIG. 15 shows an aberration curve in a short focus end of the zoom lens of the numerical embodiment 4.
Figure 16:
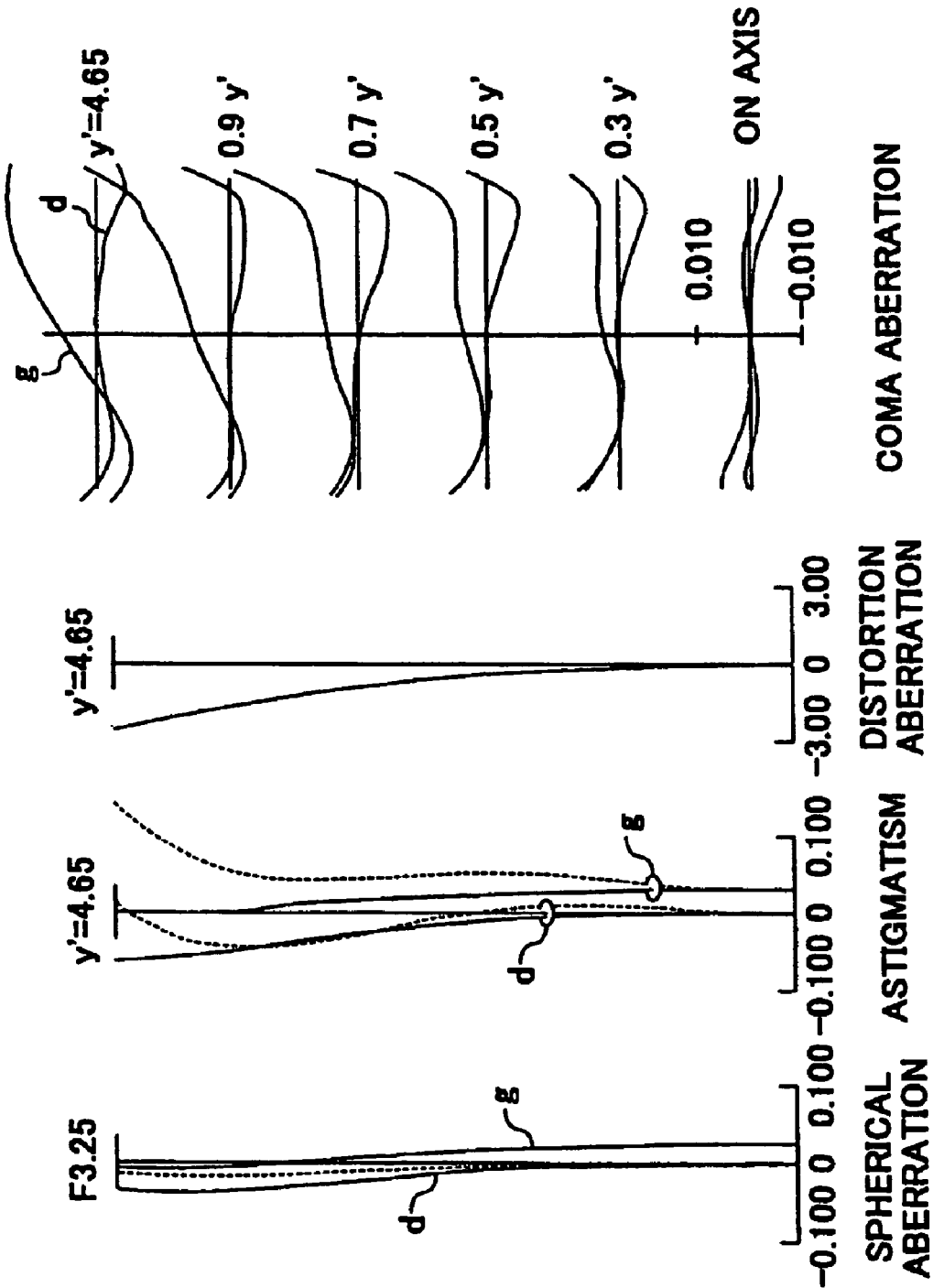
FIG. 16 shows an aberration curve in an intermediate focal length of the zoom lens of the numerical embodiment 4.
Figure 17:
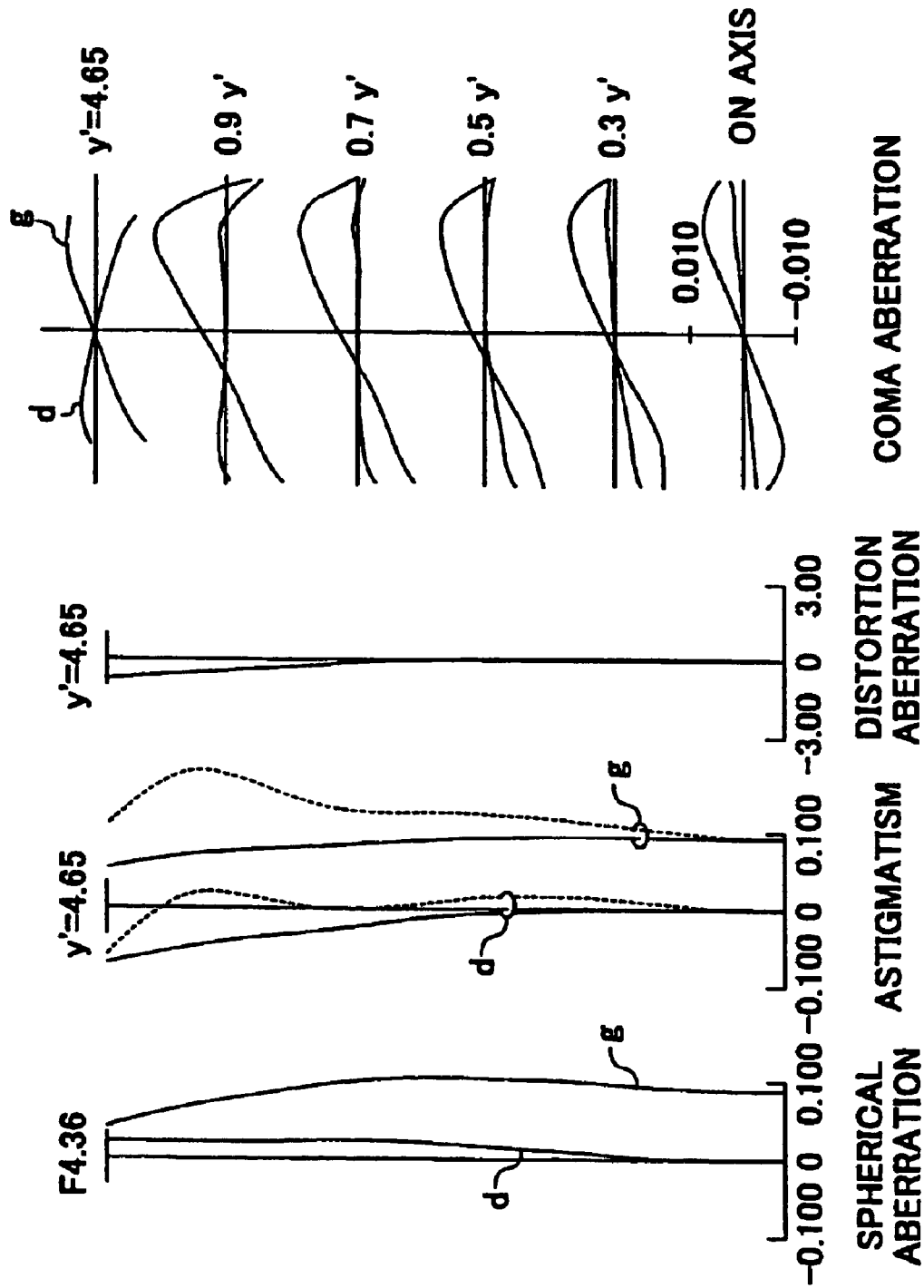
FIG. 17 shows an aberration curve in a long focus end of the zoom lens of the numerical embodiment 4.
Figure 18:
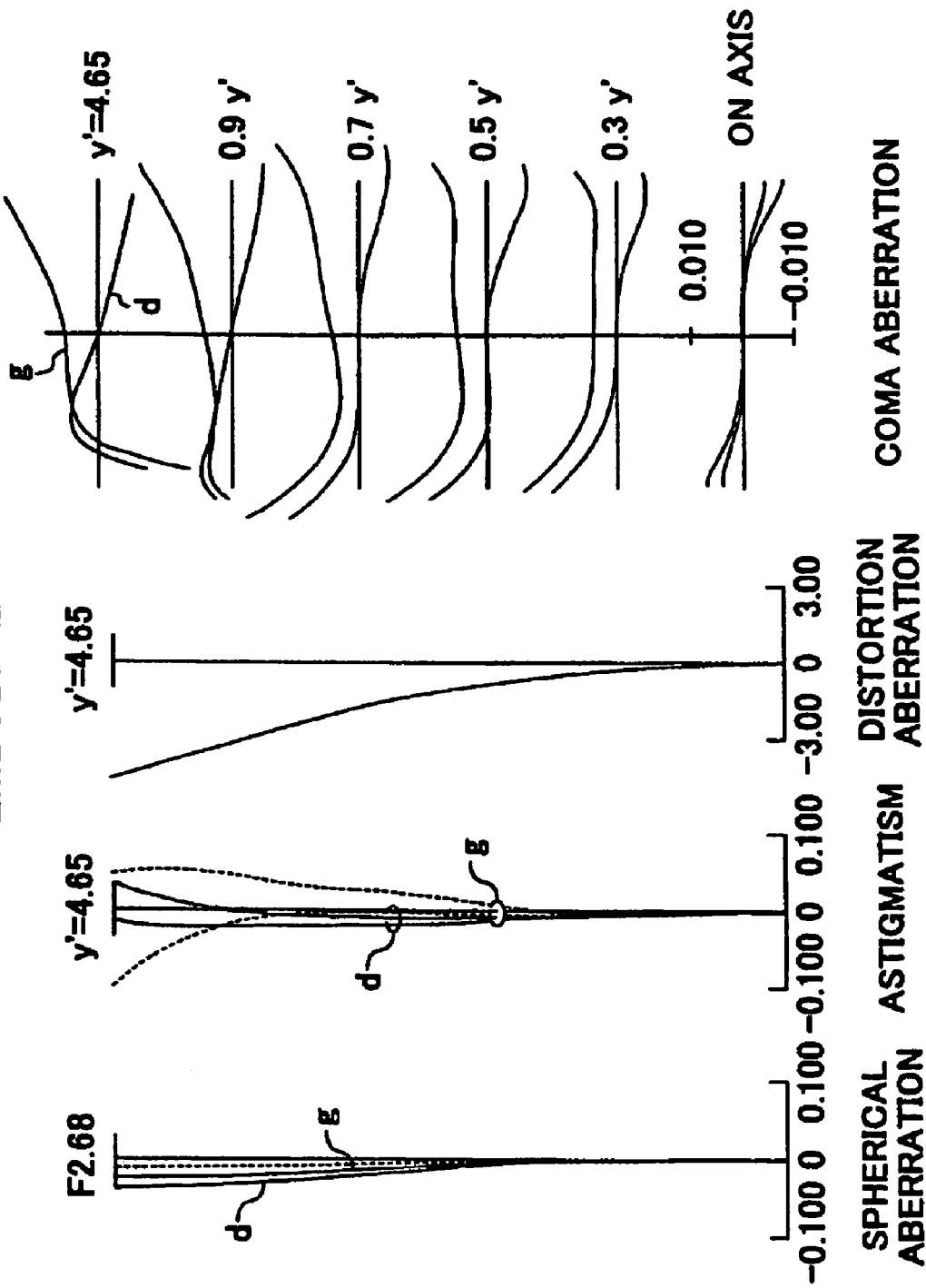
FIG. 18 shows an aberration curve in a short focus end of the zoom lens of the numerical embodiment 5.
Figure 19:
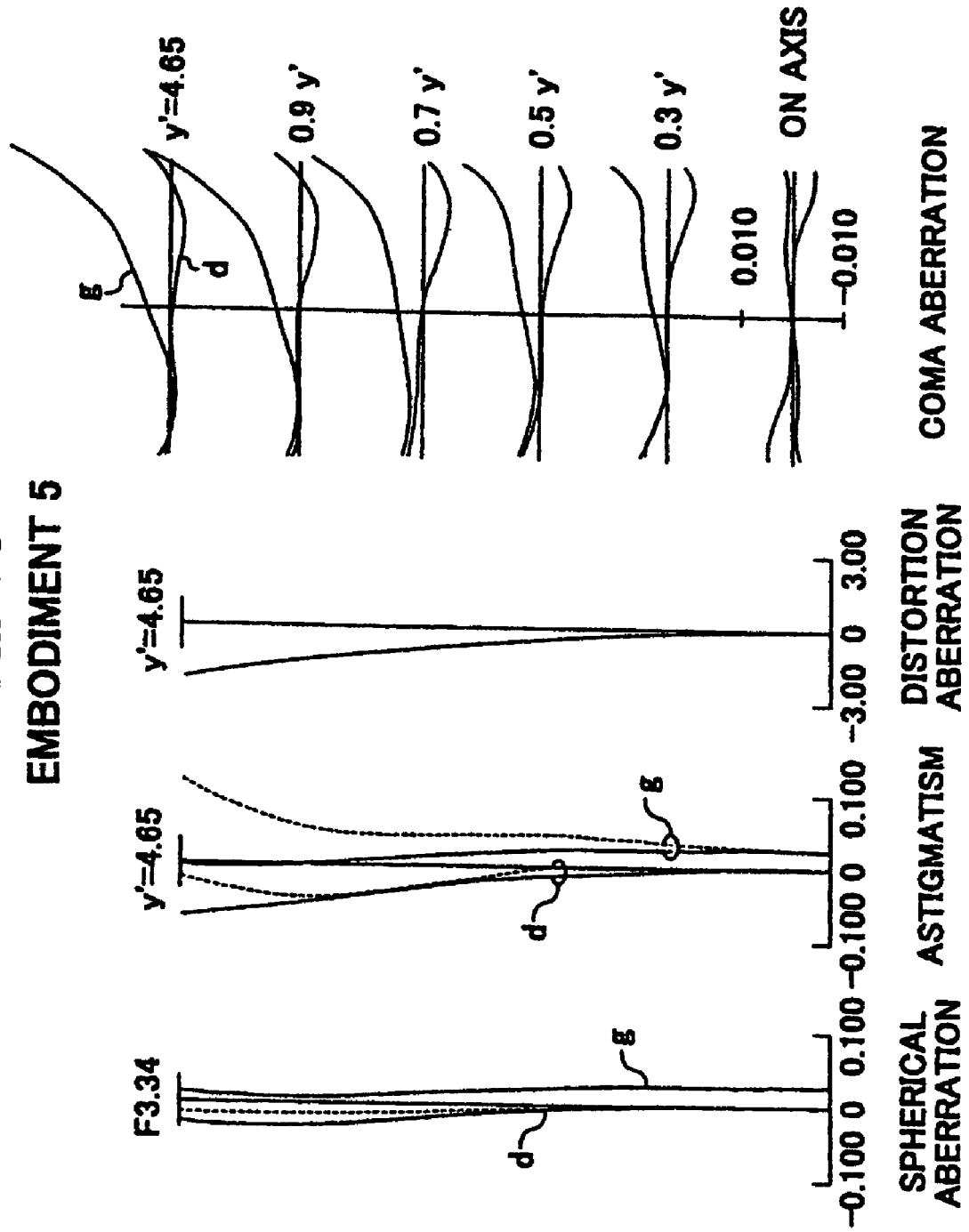
FIG. 19 shows an aberration curve in an intermediate focal length of the zoom lens of the numerical embodiment 5.
Figure 20:
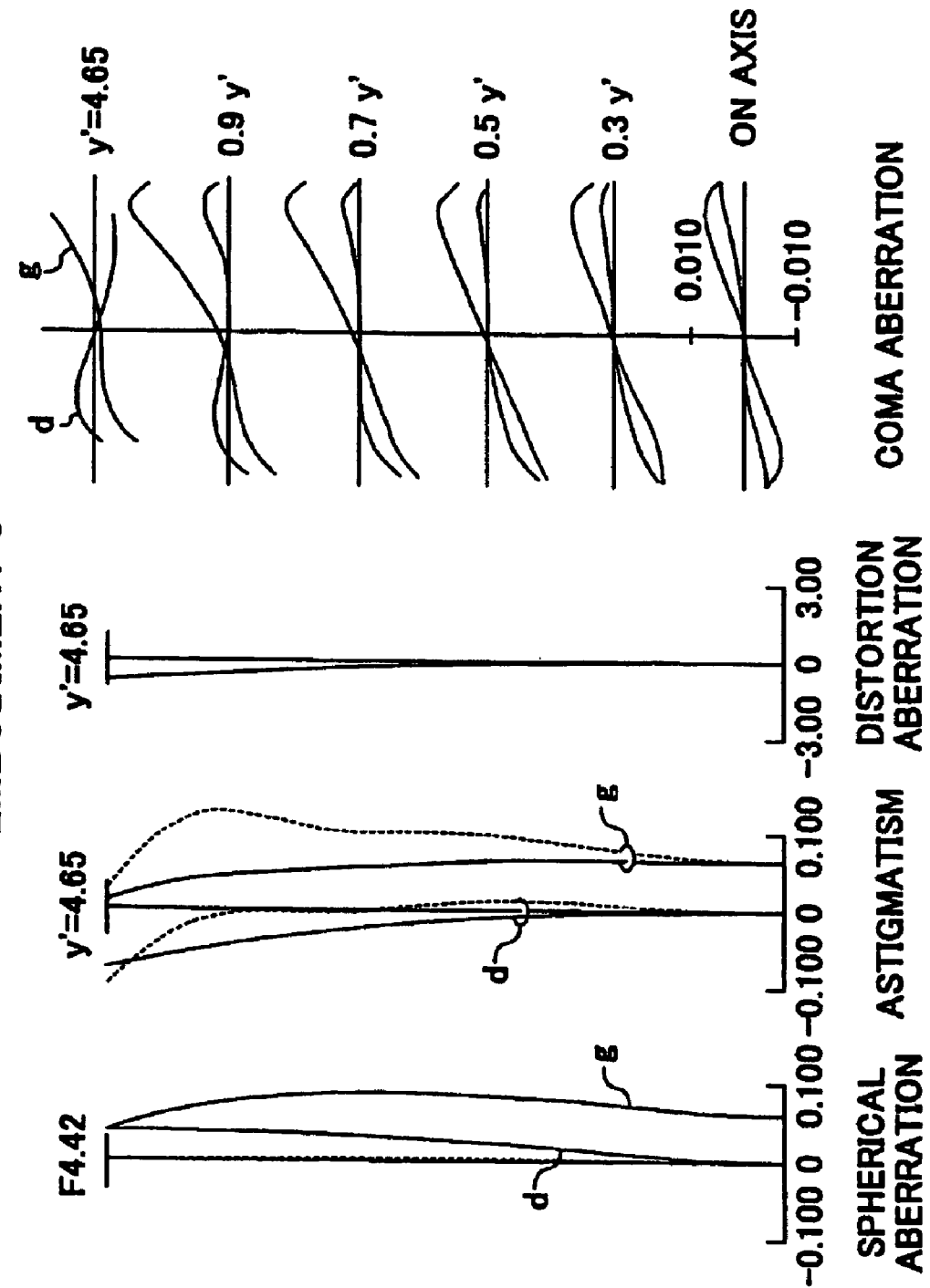
FIG. 20 shows an aberration curve in a long focus end of the zoom lens of the numerical embodiment 5.

Numerical values of conditional relationship
$(L_{PN}/Y') = 1.08$
$(L_{G2}/Y') = 1.94$ FIGS. 6 to 8 sequentially show aberration curves related to the numerical embodiment 1. FIG. 6 relates to a short focus end, FIG. 7 relates to intermediate focal length, and FIG. 8 relates to a long focus end. FIGS. 9 to 11 sequentially show aberration curves related to numerical embodiment 2. FIG. 9 relates to a short focus end, FIG. 10 relates to an intermediate focal length, and FIG. 11 relates to a long focus end FIGS. 12 to 14 sequentially show aberration curves related to the numerical embodiment 3. FIG. 12 relates to a short focus end, FIG. 13 relates to an intermediate focal length, and FIG. 14 relates to a long focus end. FIGS. 15 to 17 sequentially show aberration curves related to the numerical embodiment 4. FIG. 15 relates to a short focus end, FIG. 16 relates to an intermediate focal length, and FIG. 17 relates to a long focus end FIGS. 18 to 20 sequentially show aberration curves related to the numerical embodiment 5. FIG. 18 relates to a short focus end, FIG. 19 relates to an intermediate focal length, and FIG. 20 relates to a long focus end. In addition, in the drawings of spherical aberrations of aberration curves of FIGS. 6 to 20, the dotted lines indicate sine conditions. Also, in the drawings of astigmatisms of aberration curves of FIGS. 6 to 20, solid lines indicate sagittal and dotted lines indicate meridional.

Figure 21A:
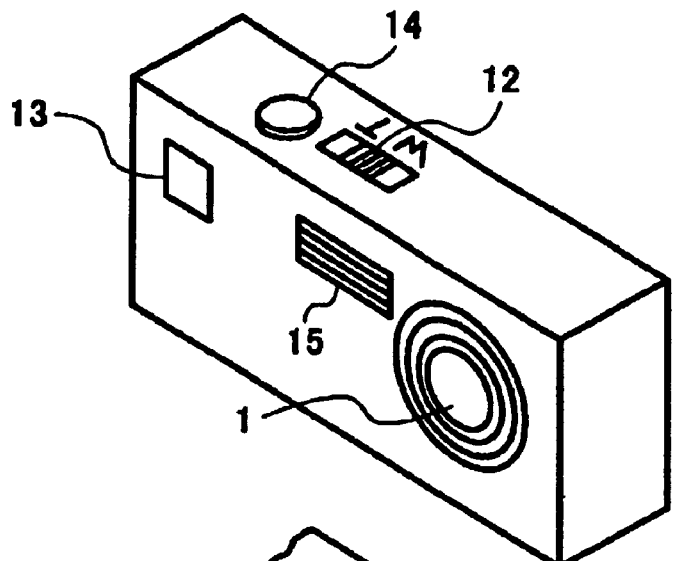
FIGS. 21(A) through 21(C) are appearance views of a digital camera as an embodiment of a camera (portable information terminal unit) according to the present invention, in which (A) is a front side perspective view at the time of carrying along, (B) is a view showing the state where a lens barrel is drawn out, and (C) is a rear side perspective view.
Figure 21B:
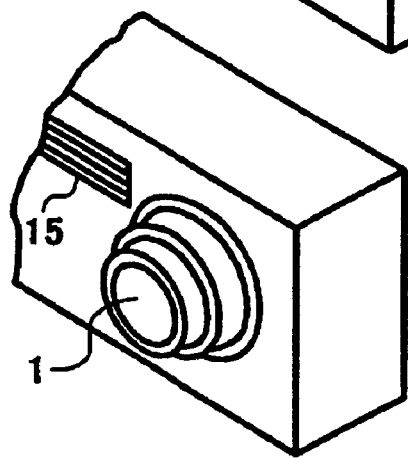
Figure 21C:
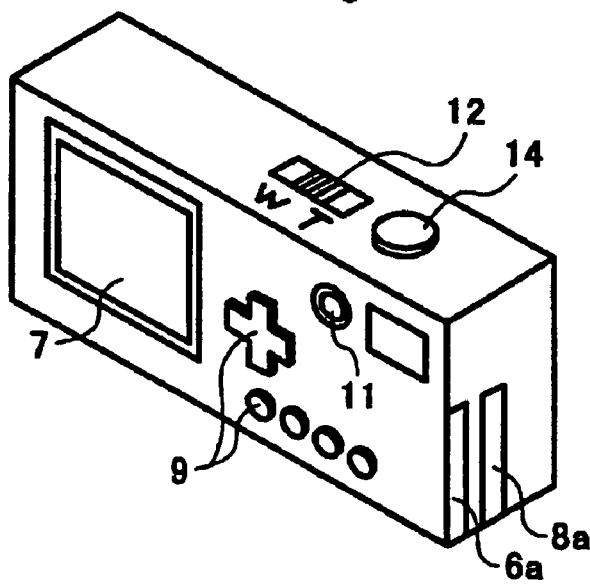
Figure 22:
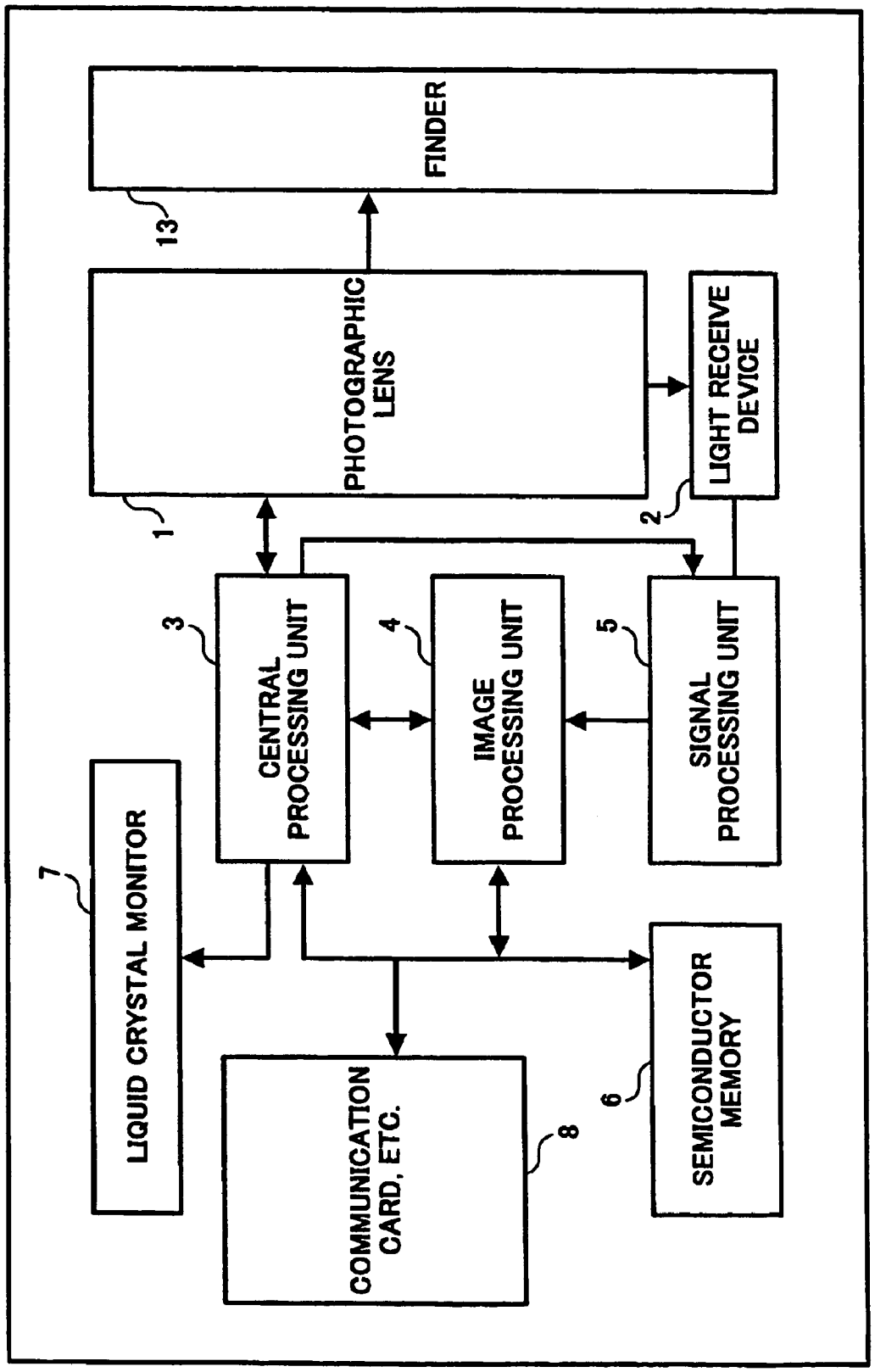
FIG. 22 is a block diagram showing a construction of circuit of the digital camera shown in FIG. 21.
Figure 23:
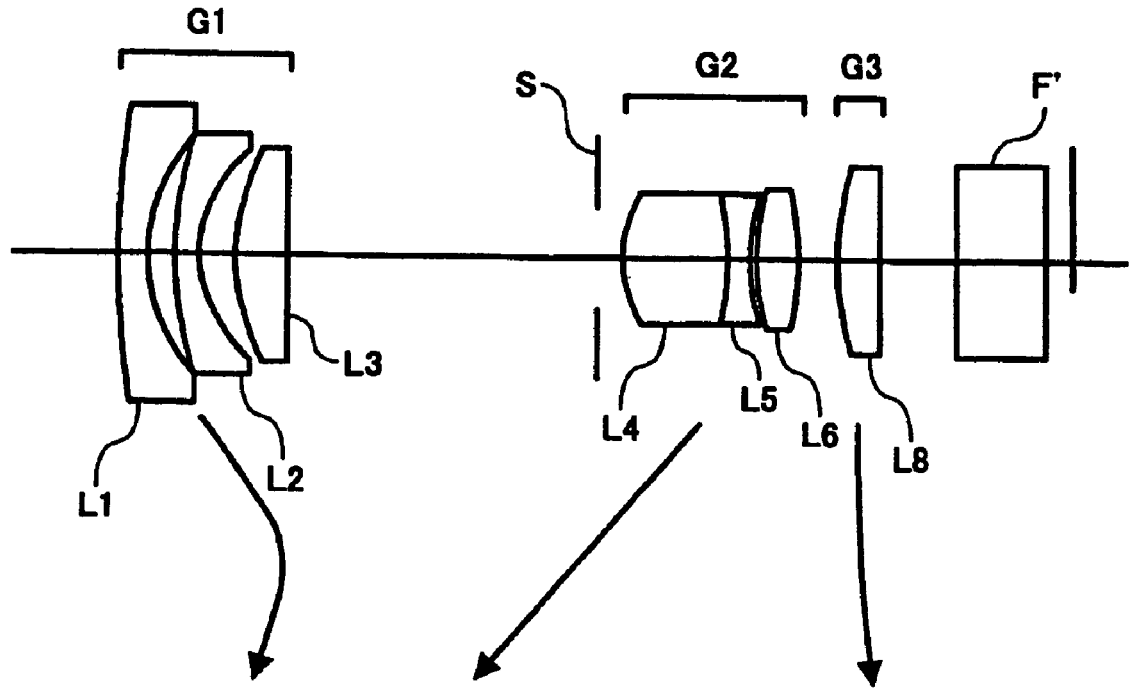
FIG. 23 is a view showing the arrangement of lenses in a short focus end and the movement of each group accompanying variation of magnification of zoom lens in an embodiment 6.
Figure 24:
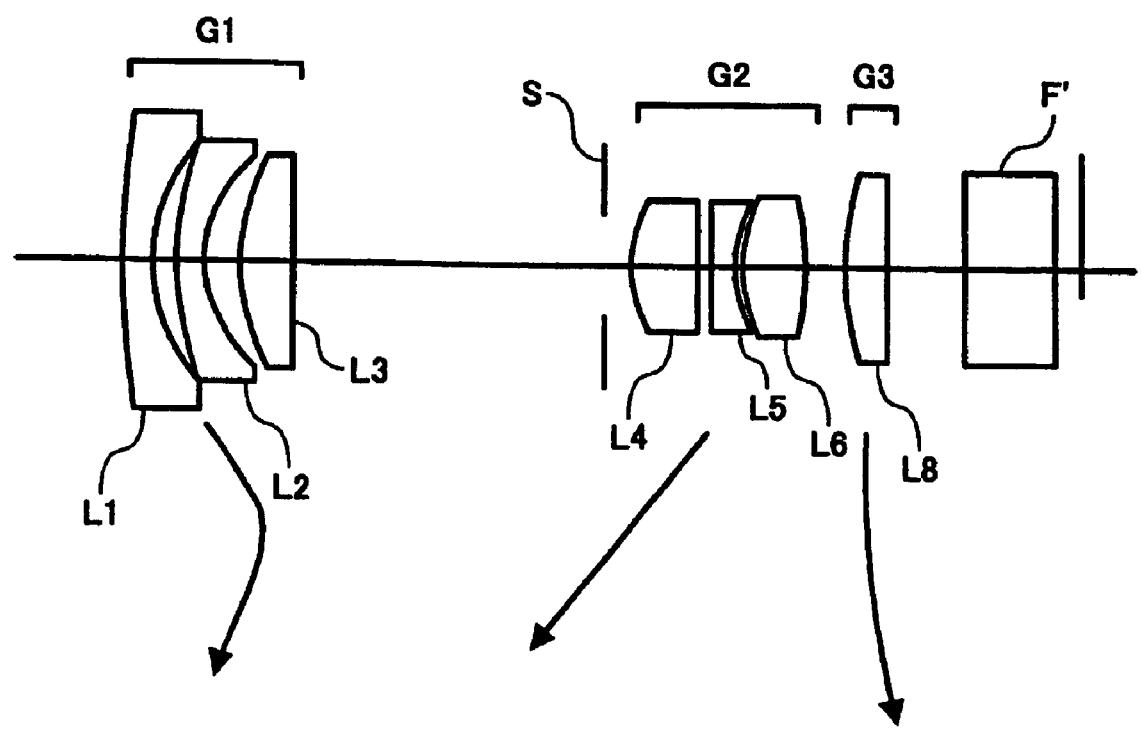
FIG. 24 is a view showing the arrangement of lenses in a short focus end of zoom lens and the movement of each group accompanying variation of magnification in an embodiment 7.
Figure 25:
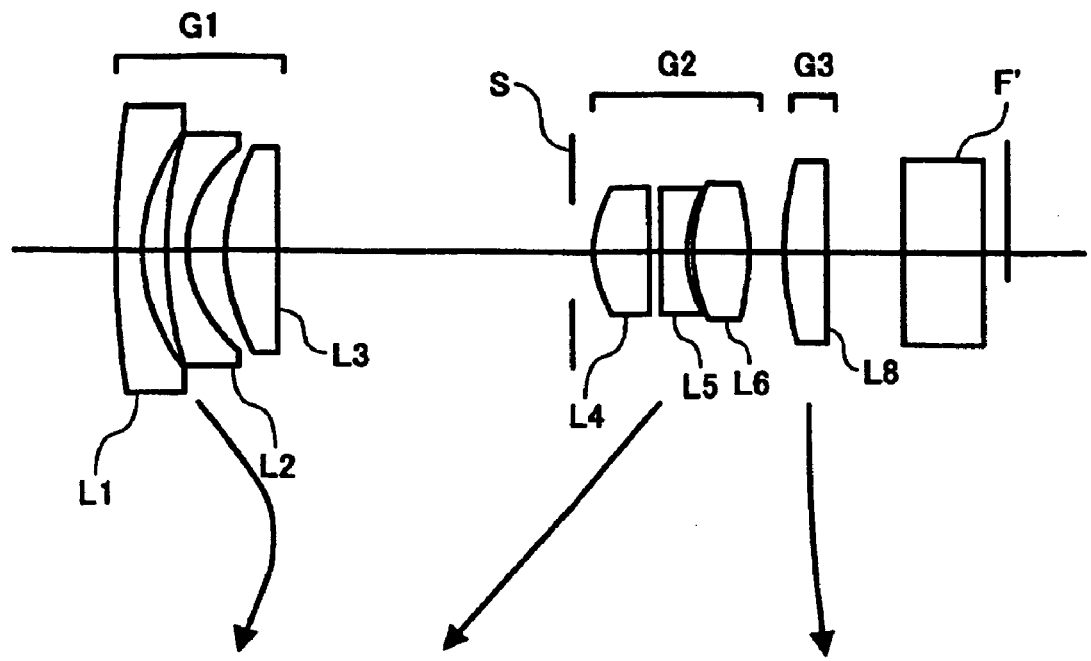
FIG. 25 is a view showing the arrangement of lenses in a short focus end of zoom lens and the movement of each group accompanying variation of magnification in an embodiment 8.
Figure 26:
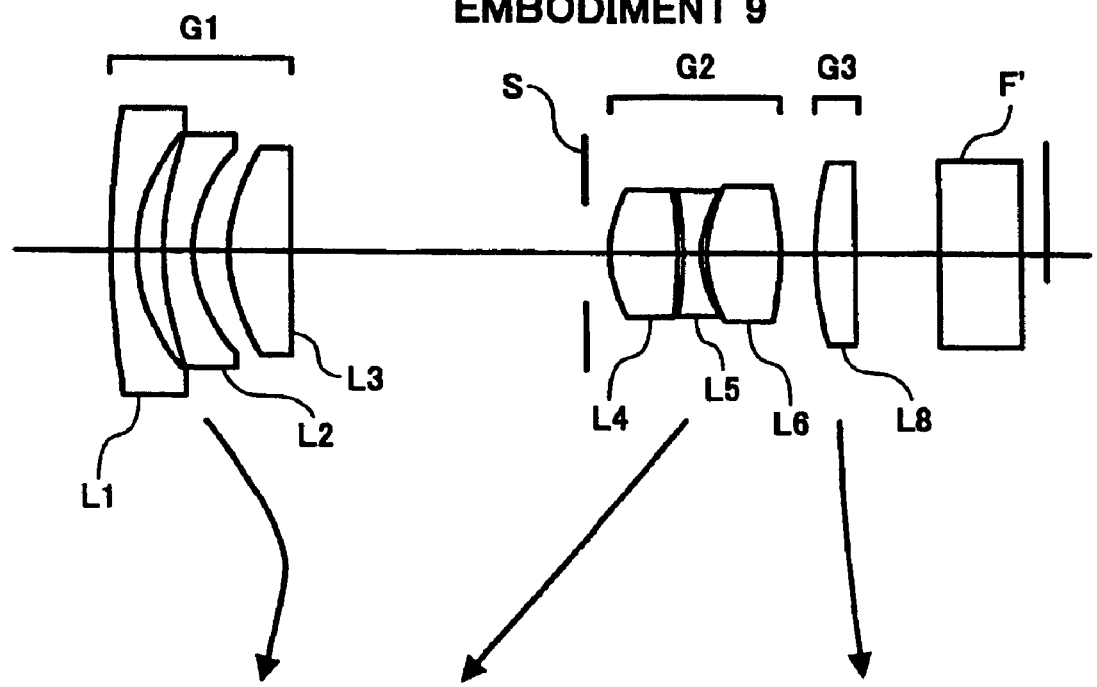
FIG. 26 is a view showing the arrangement of lenses in a short focus end of zoom lens and the movement of each group accompanying variation of magnification in an embodiment 9.
Figure 27:
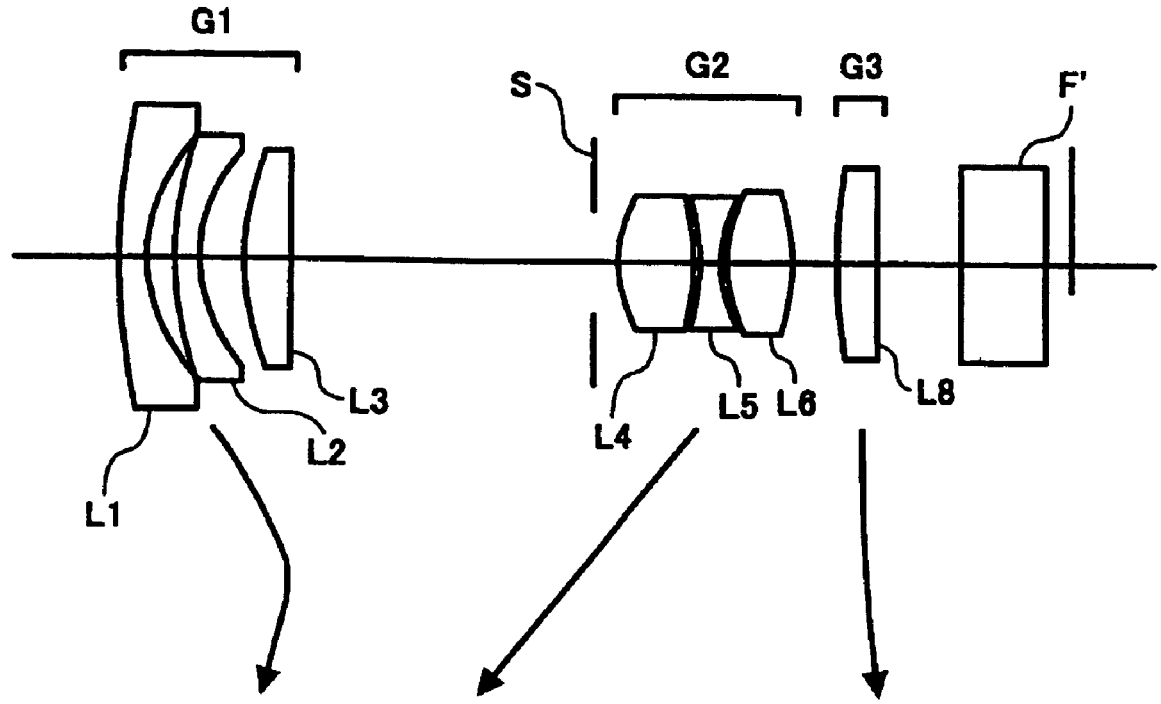
FIG. 27 is a view showing the arrangement of lenses in a short focus end of zoom lens and the movement of each group accompanying variation of magnification in an embodiment 10.
Figure 28:
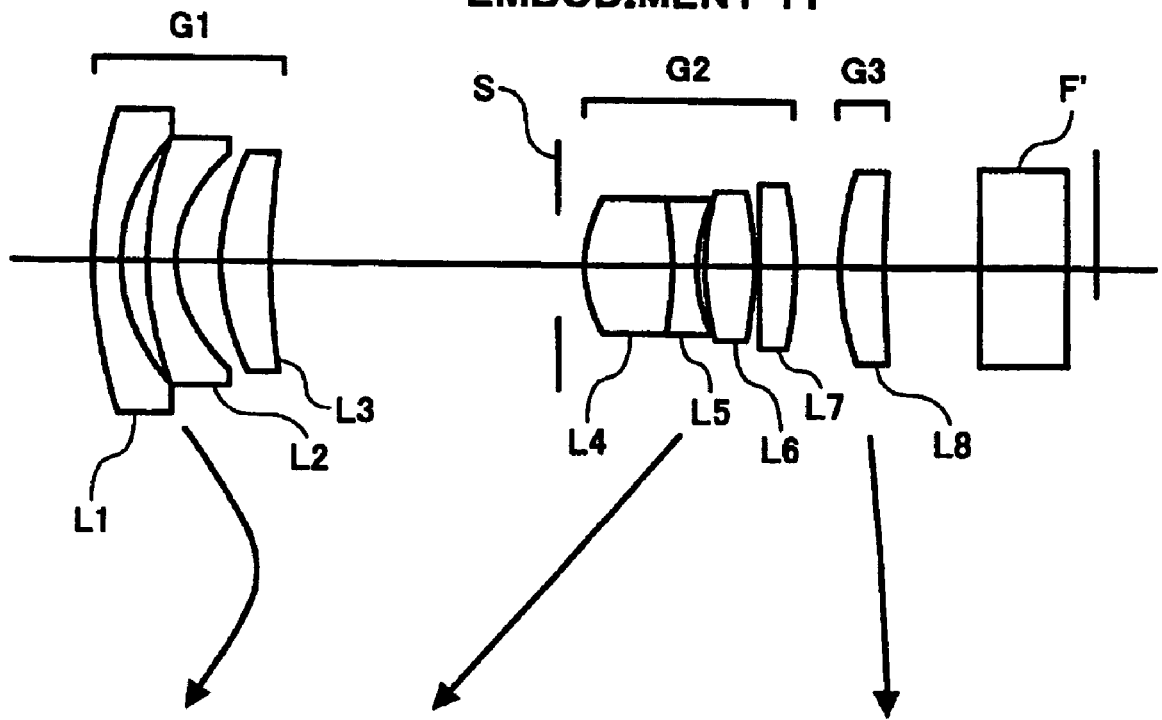
FIG. 28 is a view showing the arrangement of lenses in a short focus end of zoom lens and the movement of each group accompanying variation of magnification in an embodiment 11.
Figure 29:
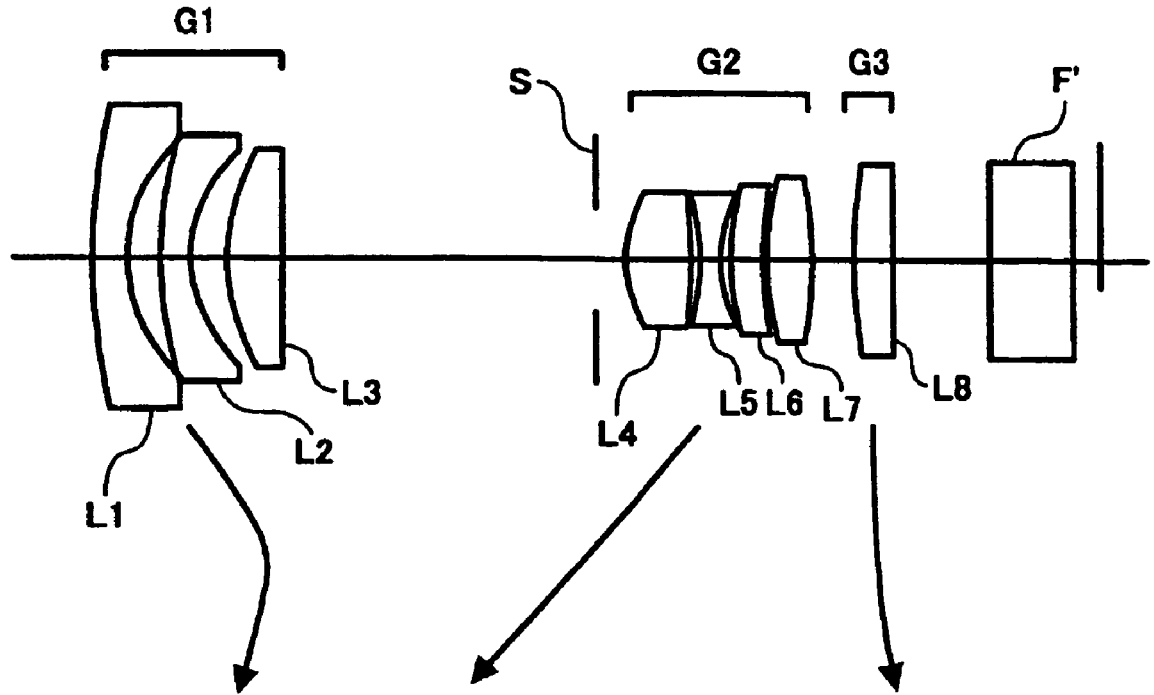
FIG. 29 is a view showing the arrangement of lenses in a short focus end of zoom lens and the movement of each group accompanying variation of magnification in an embodiment 12.
Figure 30:
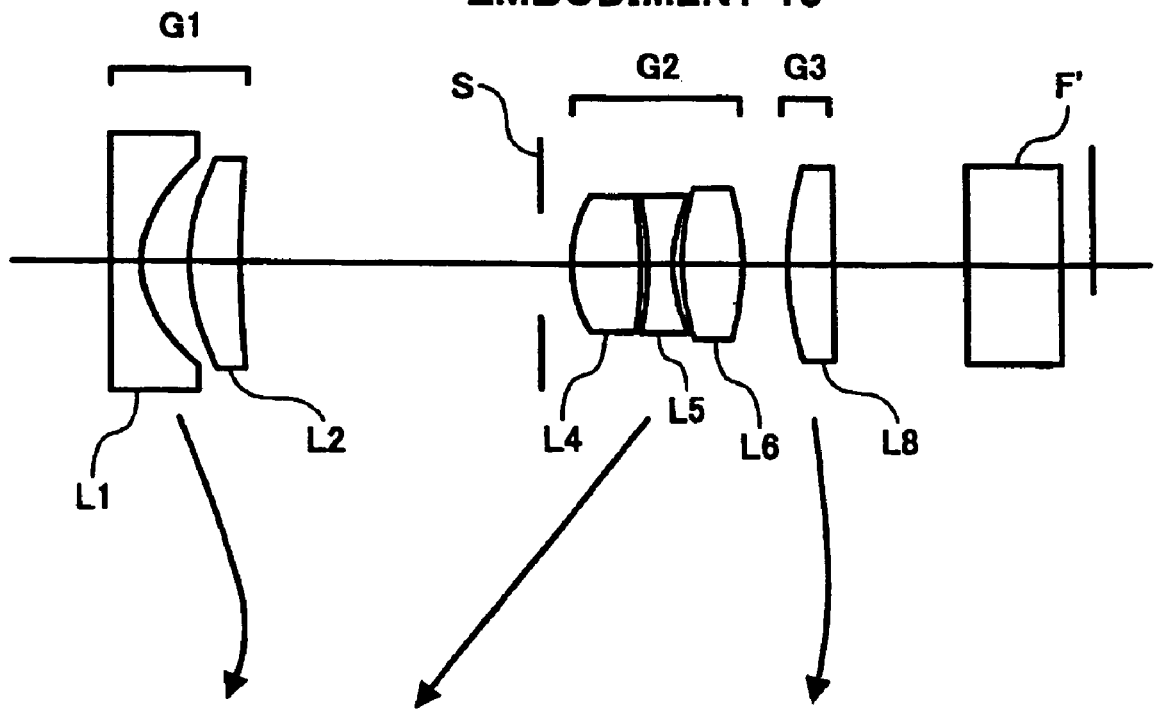
FIG. 30 is a view showing the arrangement of lenses in a short focus end of zoom lens and the movement of each group accompanying variation of magnification in an embodiment 13.

Lastly, an embodiment of digital camera (camera unit) as a potable information terminal unit is shown with reference to FIGS. 21 and 22.

The digital camera comprises a photographic lens 1 and a light-receiving device (area sensor) 2, wherein the image of photograph object formed by the photographic lens 1 is adapted to be read by the light-receiving device 2. As the photographic lens 1, it is possible to use a zoom lens of any of said numerical embodiments 1 to 5.

The output from the light-receiving device 2 is processed by a signal processing unit 5 controlled by a central processing unit 3 and transformed to digital information. The image information digitalized by the signal processing unit 5 receives a predetermined image processing in an image processing unit 4 controlled by the central processing unit 3, and then is recorded in a semiconductor memory 6. On a liquid crystal monitor 7, an image which is photographed or the image recorded in the semiconductor memory 6 can be displayed. In addition, the image recorded in the semiconductor memory 6 may be transmitted to the outside using a communication card 8 and the like.

The photographic lens 1 is in the collapsed state as shown in FIG. 21(A) at the time of carrying the camera along, and if a user operates a switch 11 of magnification source to put on the magnification source as shown in FIG. 21(C), the lens barrel is extended as shown in FIG. 21(B). In this case, each group of said zoom lens is arranged, for example, at the short focus end within the lens barrel of the photographic lens 1, and the arrangement of each group is changed by operating a zoom lever 12, whereby it is possible to execute variation of magnification to the long focus end. In this case, a finder 13 also varies magnification in connection with the change of angle of view of the photographic lens 1.

Focusing is carried out by half-compression of a shutter button 14. In the zoom lens of the photographic lens 1, the focusing can be performed by the movement of the first group G1 or the third group G3, or by the movement of the light-receiving device 2. If the shutter button 4 is further compressed in, photographing is performed and then the aforementioned processing is performed.

When the image recorded in the semiconductor memory 6 is displayed on the liquid crystal monitor 7 or transmitted to the outside using the communication card 8, an operation button 9 is used. The semiconductor memory 6, communication card 8 and the like are used by being respectively inserted into an exclusive or common slot. In the present embodiment, a memory card slot 6a for inserting the semiconductor memory 6 and a communication card slot 8a for inserting the communication card 8 are provided. Furthermore, reference numeral 15 indicates a flash.

In the camera (portable information terminal unit) as explained in the above, the zoom lenses in the numerical embodiments 1 to 5 can be used as a photographic lens. Therefore, it is possible to realize a compact camera (portable information terminal unit) of high image quality using the light-receiving device 2 of classes of 2,000,000 to 4,000,000 pixels. Thereby, it is possible for the user to photograph an image of high image quality using a portable information terminal unit of excellent portability and to transmit the image to the outside.

The present invention is not limited to the above embodiments. That is, the present invention can be embodied by being variously modified without departing from the gist of the present invention.

(Embodiments 6 to 13)

With each of these embodiments, aberration can be sufficiently corrected and it is possible to cope with a light-receiving device of 2,000,000 to 3,000,000 pixels. It is obvious from the embodiments that greatly satisfactory image performance can be secured while attaining sufficient miniaturization by constructing the zoom lens as in the present invention.

[Embodiment 6]
$f = 4.33–10.28, F = 2.73–4.10, \omega = 40.29–18.97$

| Surface Nos. | R | D | Nd | vd | Remarks |
|---|---|---|---|---|---|
| 01 | 40.685 | 1.00 | 1.77250 | 49.62 | first lens |
| 02 | 7.403 | 0.95 | | | |
| 03 | 14.152 | 1.00 | 1.74330 | 49.33 | second lens |
| 04* | 4.479 | 1.41 | | | |
| 05 | 8.729 | 2.01 | 1.72825 | 28.32 | third lens |
| 06 | ∞ | variable (A) | | | |
| 07 | iris | 1.00 | | | |
| 08* | 5.652 | 3.87 | 1.74400 | 44.90 | fourth lens |
| 09 | −14.306 | 0.80 | 1.80518 | 25.46 | fifth lens |
| 10 | 5.615 | 0.35 | | | |
| 11 | 11.620 | 1.55 | 1.63854 | 55.45 | sixth lens |
| 12* | −13.784 | variable (B) | | | |
| 13* | 13.554 | 1.65 | 1.48749 | 70.44 | seventh lens |
| 14 | −98.025 | variable (C) | | | |
| 15 | ∞ | 3.25 | 1.51680 | 64.20 | various filters |
| 16 | ∞ | | | | |

The first to third lenses form the first group, the fourth to sixth lenses form the second group, and the seventh lens forms the third group. The forth lens and fifth lens which are present in the second group are conjugate lenses.
Aspherical surfaces:

Fourth surface;

$K = 0.0, A_4 = -1.37618 \times 10^{-8}, A_6 = -5.03401 \times 10^{-5},$
$A_8 = 1.57384 \times 10^{-6}, A_{10} = -2.30976 \times 10^{-7},$
$A_{12} = -3.26464 \times 10^{-9}, A_{14} = 4.00882 \times 10^{-10},$
$A_{16} = 1.97709 \times 10^{-11}, A_{18} = -1.97909 \times 10^{-12}$
Eighth surface;

$K = 0.0, A_4 = -3.10301 \times 10^{-4}, A_6 = -9.60865 \times 10^{-6},$
$A_8 = 1.38603 \times 10^{-6}, A_{10} = -1.17724 \times 10^{-7}$
Twelfth surface;

$K = 0.0, A_4 = 4.87200 \times 10^{-4}, A_6 = 4.48027 \times 10^{-5},$
$A_8 = -1.67451 \times 10^{-6}, A_{10} = 4.32123 \times 10^{-7}$
Thirteenth surface;

$K = 0.0, A_4 = -2.44272 \times 10^{-4}, A_6 = 2.13490 \times 10^{-5},$
$A_8 = -1.60140 \times 10^{-6}, A_{10} = 5.24693 \times 10^{-8}$
Variable amount

| | Short focus end f = 4.33 | Intermediate focal length f = 6.64 | Long focus end f = 10.28 |
|---|---|---|---|
| A | 11.640 | 5.480 | 1.400 |
| B | 1.440 | 4.890 | 10.180 |
| C | 3.096 | 2.892 | 2.559 |

Numerical values of conditional relationship
$(L_{G2}/Y') = 1.88$
$(R_{31} + R_{32})/(R_{31} - R_{32}) = -0.085$
$(f_{L1}/f_{L2}) = 1.29$

[Embodiment 7]
$f = 4.33–10.28, F = 2.71–4.06, \omega = 40.30–18.94$

| Surface Nos. | R | D | Nd | vd | Remarks |
|---|---|---|---|---|---|
| 01 | 42.748 | 1.00 | 1.77250 | 49.62 | first lens |
| 02 | 7.443 | 0.89 | | | |
| 03 | 13.728 | 1.00 | 1.74330 | 49.33 | second lens |
| 04* | 4.394 | 1.50 | | | |
| 05 | 8.857 | 2.00 | 1.72825 | 28.32 | third lens |
| 06 | ∞ | variable (A) | | | |
| 07 | iris | 1.00 | | | |
| 08* | 5.337 | 2.41 | 1.74400 | 44.90 | fourth lens |
| 09 | −198.170 | 0.52 | | | |
| 10 | −42.607 | 0.88 | 1.80518 | 25.46 | fifth lens |
| 11 | 4.924 | 0.21 | | | |
| 12 | 6.330 | 2.51 | 1.51680 | 64.20 | sixth lens |
| 13* | −12.554 | variable (B) | | | |
| 14* | 13.923 | 1.68 | 1.48749 | 70.44 | seventh lens |
| 15 | −117.275 | variable (C) | | | |
| 15 | ∞ | 3.25 | 1.51680 | 64.20 | various filters |
| 16 | ∞ | | | | |

The first to third lenses form the first group, the fourth to sixth lenses form the second group, and the seventh lens forms the third group.
Aspherical surfaces:

Fourth surface;

$K = 0.0, A_4 = -1.42635 \times 10^{-3}, A_6 = -6.33122 \times 10^{-5},$
$A_8 = 2.18856 \times 10^{-6}, A_{10} = -1.81517 \times 10^{-7},$
$A_{12} = -1.54734 \times 10^{-9}, A_{14} = 5.33510 \times 10^{-10},$
$A_{16} = 7.16118 \times 10^{-11}, A_{18} = -4.28124 \times 10^{-12}$
Eighth surface;

$K = 0.0, A_4 = -2.71616 \times 10^{-4}, A_6 = -1.37281 \times 10^{-5},$
$A_8 = 2.07664 \times 10^{-6}, A_{10} = -1.81165 \times 10^{-7}$
Thirteenth surface;

$K = 0.0, A_4 = 9.17882 \times 10^{-4}, A_6 = 5.21195 \times 10^{-5},$
$A_8 = -1.05410 \times 10^{-6}, A_{10} = 3.21835 \times 10^{-7}$
Fourteenth surface;

$K = 0.0, A_4 = -2.69023 \times 10^{-4}, A_6 = 3.06885 \times 10^{-5},$
$A_8 = -2.70949 \times 10^{-6}, A_{10} = 9.24380 \times 10^{-8}$
Variable amount

| | Short focus end f = 4.33 | Intermediate focal length f = 6.64 | Long focus end f = 10.28 |
|---|---|---|---|
| A | 11.680 | 5.480 | 1.400 |
| B | 1.440 | 4.850 | 10.180 |
| C | 3.044 | 2.873 | 2.528 |

Numerical values of conditional relationship
$(L_{G2}/Y') = 1.87$
$(R_{31} + R_{32})/(R_{31} - R_{32}) = -0.315$
$(f_{L1}/f_{L2}) = 1.30$

[Embodiment 8]
$f = 4.33–10.28, F = 2.67–4.03, \omega = 40.31–18.96$

| Surface Nos. | R | D | Nd | vd | Remarks |
|---|---|---|---|---|---|
| 01 | 52.284 | 1.00 | 1.77250 | 49.62 | first lens |
| 02 | 7.548 | 0.90 | | | |
| 03 | 14.553 | 1.00 | 1.74330 | 49.33 | second lens |
| 04* | 4.429 | 1.45 | | | |

-continued

| | | | | | |
|---|---|---|---|---|---|
| 05 | 9.086 | 2.11 | 1.72825 | 28.32 | third lens |
| 06 | −123.655 | variable (A) | | | |
| 07 | iris | 1.00 | | | |
| 08* | 5.316 | 2.25 | 1.74400 | 44.90 | fourth lens |
| 09 | −545.787 | 0.47 | | | |
| 10 | −38.991 | 1.18 | 1.80518 | 25.46 | fifth lens |
| 11 | 4.987 | 0.19 | | | |
| 12 | 6.737 | 2.27 | 1.51680 | 64.20 | sixth lens |
| 13* | −11.295 | variable (B) | | | |
| 14* | 13.622 | 1.73 | 1.48749 | 70.44 | seventh lens |
| 15 | −75.425 | variable (C) | | | |
| 16 | ∞ | 3.25 | 1.51680 | 64.20 | various filters |
| 17 | ∞ | | | | |

The first to third lenses constitute a first group, the fourth to sixth lenses constitute a second group and the seventh lens constitutes a third group.

Aspherical surfaces:

Fourth surface;

$K = 0.0, A_4 = -1.52225 \times 10^{-3}, A_6 = -4.90276 \times 10^{-5},$
$A_8 = -3.89047 \times 10^{-7}, A_{10} = 1.40729 \times 10^{-7},$
$A_{12} = -3.52907 \times 10^{-8}, A_{14} = 1.18808 \times 10^{-9},$
$A_{16} = 5.42840 \times 10^{-11}, A_{18} = -3.71221 \times 10^{-12}$ Eighth surface;

$K = 0.0, A_4 = -2.57172 \times 10^{-4}, A_6 = -1.36917 \times 10^{-5},$
$A_8 = 2.21542 \times 10^{-6}, A_{10} = -1.81900 \times 10^{-7}$ Thirteenth surface;

$K = 0.0, A_4 = 8.29889 \times 10^{-4}, A_6 = 4.54452 \times 10^{-5},$
$A_8 = -2.92852 \times 10^{-7}, A_{10} = 3.36336 \times 10^{-7}$ Fourteenth surface;

$K = 0.0, A_4 = -2.39053 \times 10^{-4}, A_6 = 2.27231 \times 10^{-5},$
$A_8 = -1.86944 \times 10^{-6}, A_{10} = 6.13185 \times 10^{-8}$ Variable amount

| | Short focus end<br>f = 4.33 | Intermediate focal length<br>f = 6.64 | Long focus end<br>f = 10.28 |
|---|---|---|---|
| A | 11.600 | 5.420 | 1.380 |
| B | 1.440 | 5.040 | 10.700 |
| C | 3.191 | 2.996 | 2.556 |

Numerical values in the conditional relationship
$(L_{G2}/Y') = 1.82$
$(R_{31} + R_{32})/(R_{31} - R_{32}) = -0.253$
$(f_{L1}/f_{L2}) = 1.29$

[Embodiment 9]
f = 4.33–10.30, F = 2.71–4.04, ω = 40.29–18.95

| Surface Nos. | R | D | Nd | vd | Remarks |
|---|---|---|---|---|---|
| 01 | 29.129 | 1.00 | 1.77250 | 49.62 | first lens |
| 02 | 6.828 | 1.16 | | | |
| 03 | 16.225 | 1.00 | 1.74330 | 49.33 | second lens |
| 04* | 4.651 | 1.47 | | | |
| 05 | 9.174 | 2.39 | 1.74077 | 27.76 | third lens |
| 06 | ∞ | variable (A) | | | |
| 07 | iris | 1.00 | | | |
| 08* | 5.233 | 2.76 | 1.72342 | 37.99 | fourth lens |
| 09 | −19.253 | 0.16 | | | |
| 10 | −13.695 | 0.80 | 1.80518 | 25.46 | fifth lens |
| 11 | 4.961 | 0.18 | | | |
| 12 | 6.324 | 2.98 | 1.51680 | 64.20 | sixth lens |
| 13* | −10.432 | variable (B) | | | |
| 14* | 13.397 | 1.60 | 1.48749 | 70.44 | seventh lens |
| 15 | 153.379 | variable (C) | | | |
| 16 | ∞ | 3.26 | 1.51680 | 64.20 | various filters |
| 17 | ∞ | | | | |

The first to third lenses constitute a first group, the fourth to sixth lenses constitute a second group and the seventh lens constitutes a third group.

Aspherical surfaces:

Fourth surface;

$K = 0.0, A_4 = -1.27929 \times 10^{-3}, A_6 = -4.75375 \times 10^{-5},$
$A_8 = 1.78640 \times 10^{-6}, A_{10} = -2.09707 \times 10^{-7},$
$A_{12} = -3.99557 \times 10^{-9}, A_{14} = 8.29203 \times 10^{-10},$
$A_{16} = -2.46067 \times 10^{-11}, A_{18} = -3.28212 \times 10^{-18}$ Eighth surface;

$K = 0.0, A_4 = -2.23927 \times 10^{-4}, A_6 = -9.69866 \times 10^{-6},$
$A_8 = 1.89347 \times 10^{-6}, A_{10} -1.43145 \times 10^{-7}$ Thirteenth surface;

$K = 0.0, A_4 = 8.10959 \times 10^{-4}, A_6 = 4.46654 \times 10^{-5},$
$A_8 = -1.33415 \times 10^{-6}, A_{10} = 3.10407 \times 10^{-7}$ Fourteenth surface;

$K = 0.0, A_4 = -2.22347 \times 10^{-4}, A_6 = 2.09486 \times 10^{-5},$
$A_8 = -1.79477 \times 10^{-6}, A_{10} = 6.32978 \times 10^{-8}$ Variable amount

| | Short focus end<br>f = 4.33 | Intermediate focal length<br>f = 6.64 | Long focus end<br>f = 10.30 |
|---|---|---|---|
| A | 11.700 | 5.410 | 1.300 |
| B | 1.450 | 5.040 | 10.740 |
| C | 3.520 | 3.254 | 2.651 |

Numerical values in the conditional relationships
$(L_{G2}/Y') = 1.97$
$(R_{31} + R_{32})/(R_{31} - R_{32}) = -0.245$
$(f_{L1}/f_{L2}) = 1.29$

[Embodiment 10]
f = 4.33–10.28, F = 2.70–4.03, ω = 40.29–18.97

| Surface Nos. | R | D | Nd | vd | Remarks |
|---|---|---|---|---|---|
| 01 | 26.338 | 1.00 | 1.77250 | 49.62 | first lens |
| 02 | 5.957 | 1.15 | | | |
| 03 | 11.354 | 1.00 | 1.74330 | 49.33 | second lens |
| 04* | 4.800 | 1.68 | | | |
| 05 | 9.326 | 1.89 | 1.74077 | 27.76 | third lens |
| 06 | 76.543 | variable (A) | | | |
| 07 | iris | 1.00 | | | |
| 08* | 5.240 | 2.97 | 1.72342 | 37.99 | fourth lens |
| 09 | −17.637 | 0.20 | | | |
| 10 | −11.727 | 0.81 | 1.80518 | 25.46 | fifth lens |
| 11 | 5.109 | 0.17 | | | |
| 12 | 6.368 | 2.50 | 1.51680 | 64.20 | sixth lens |
| 13* | −10.112 | variable (B) | | | |
| 14* | 13.474 | 1.60 | 1.48749 | 70.44 | seventh lens |
| 15 | 164.596 | variable (C) | | | |
| 16 | ∞ | 3.25 | 1.51680 | 64.20 | various filters |
| 17 | ∞ | | | | |

The first to third lenses constitute a first group, the fourth to sixth lenses constitute a second group and the seventh lens constitutes a third group.

Aspherical surfaces:

Fourth surface;

$K = 0.0, A_4 = -1.18340 \times 10^{-3}, A_6 = -5.15513 \times 10^{-5},$
$A_8 = 2.55275 \times 10^{-6}, A_{10} = -2.44284 \times 10^{-7},$
$A_{12} = -3.45686 \times 10^{-9}, A_{14} = 1.00396 \times 10^{-9},$
$A_{16} = -4.09624 \times 10^{-11}, A_{18} = 2.60442 \times 10^{-13}$ Eighth surface;

$K = 0.0, A_4 = -2.06641 \times 10^{-4}, A_6 = -6.64406 \times 10^{-6},$
$A_8 = 1.79604 \times 10^{-6}, A_{10} = -1.27500 \times 10^{-7}$ Thirteenth surface;

$K = 0.0, A_4 = 1.00672 \times 10^{-3}, A_5 = 5.77660 \times 10^{-5},$
$A_8 = -1.35110 \times 10^{-6}, A_{10} = 4.73799 \times 10^{-7}$ -continued Fourteenth surface;

K = 0.0, $A_4 = -2.40787 \times 10^{-4}$, $A_6 = 3.74236 \times 10^{-5}$,
$A_8 = -3.77197 \times 10^{-6}$, $A_{10} = 1.38975 \times 10^{-7}$
Variable amount

| | Short focus end<br>f = 4.33 | Intermediate focal length<br>f = 6.64 | Long focus end<br>f = 10.28 |
|---|---|---|---|
| A | 11.840 | 5.630 | 1.530 |
| B | 1.660 | 5.160 | 10.570 |
| C | 3.306 | 3.072 | 2.665 |

Numerical values in the conditional relationships
($L_{G2}/Y'$) = 1.90
($R_{31} + R_{32}$)/($R_{31} - R_{32}$) = −0.227
($f_{L1}/f_{L2}$) = 0.851

[Embodiment 11]
f = 4.33–10.28, F = 2.75–4.08, ω = 40.30–19.03

| Surface Nos. | R | D | Nd | vd | Remarks |
|---|---|---|---|---|---|
| 01 | 18.512 | 1.00 | 1.77250 | 49.62 | first lens |
| 02 | 6.948 | 0.99 | | | |
| 03 | 13.261 | 1.00 | 1.74330 | 49.33 | second lens |
| 04* | 4.130 | 1.63 | | | |
| 05 | 7.992 | 1.76 | 1.84666 | 23.78 | third lens |
| 06 | 21.770 | variable (A) | | | |
| 07 | iris | 1.00 | | | |
| 08* | 5.666 | 3.23 | 1.72342 | 37.99 | fourth lens |
| 09 | −10.575 | 0.80 | 1.80518 | 25.46 | fifth lens |
| 10 | 5.648 | 0.31 | | | |
| 11 | 11.807 | 1.70 | 1.51680 | 64.20 | sixth lens |
| 12 | −11.807 | 0.10 | | | |
| 13 | ∞ | 1.34 | 1.51680 | 64.20 | seventh lens |
| 14* | −15.216 | variable (B) | | | |
| 15* | 11.050 | 1.64 | 1.48749 | 70.44 | eighth lens |
| 16 | 47.539 | variable (C) | | | |
| 17 | ∞ | 3.25 | 1.51680 | 64.20 | various filters |
| 18 | ∞ | | | | |

The first to third lenses constitute a first group, the fourth to
seventh lenses constitute a second group and the eighth lens
constitutes a third group.
Aspherical surfaces:

Fourth surface;

K = 0.0, $A_4 = -1.36732 \times 10^{-3}$, $A_6 = -6.93407 \times 10^{-5}$,
$A_8 = -7.84082 \times 10^{-7}$, $A_{10} = 2.83825 \times 10^{-7}$,
$A_{12} = -5.78120 \times 10^{-8}$, $A_{14} = -7.22128 \times 10^{-10}$,
$A_{16} = 4.13152 \times 10^{-10}$, $A_{18} = -1.85992 \times 10^{-11}$
Eighth surface;

K = 0.0, $A_4 = -4.08286 \times 10^{-4}$, $A_6 = -7.50989 \times 10^{-6}$,
$A_8 = 7.45071 \times 10^{-7}$, $A_{10} = -9.85596 \times 10^{-8}$
Fourteenth surface;

K = 0.0, $A_4 = 6.16408 \times 10^{-5}$, $A_6 = 4.52472 \times 10^{-6}$,
$A_8 = 2.22316 \times 10^{-7}$, $A_{10} = -1.94698 \times 10^{-8}$
Fifteenth surface;

K = 0.0, $A_4 = -2.44412 \times 10^{-4}$, $A_6 = 1.88531 \times 10^{-5}$,
$A_8 = -1.48017 \times 10^{-6}$, $A_{10} = 4.92294 \times 10^{-8}$
Variable amount

| | Short focus end<br>f = 4.33 | Intermediate focal length<br>f = 6.64 | Long focus end<br>f = 10.28 |
|---|---|---|---|
| A | 10.380 | 5.120 | 1.400 |
| B | 1.450 | 5.600 | 10.980 |
| C | 3.442 | 2.939 | 2.873 |

Numerical values in the conditional relationships
($L_{G2}/Y'$) = 2.14
($f_{L1}/f_{L2}$) = 1.77

[Embodiment 12]
f = 4.33–10.18, F = 2.73–4.00, ω = 40.30–19.19

| Surface Nos. | R | D | Nd | vd | Remarks |
|---|---|---|---|---|---|
| 01 | 29.593 | 1.25 | 1.77250 | 49.62 | first lens |
| 02 | 7.058 | 1.20 | | | |
| 03 | 17.247 | 1.10 | 1.74330 | 49.33 | second lens |
| 04* | 4.563 | 1.30 | | | |
| 05 | 8.485 | 2.16 | 1.72825 | 28.32 | third lens |
| 06 | ∞ | variable (A) | | | |
| 07 | iris | 1.00 | | | |
| 08* | 5.283 | 2.61 | 1.72342 | 37.99 | fourth lens |
| 09 | −20.081 | 0.29 | | | |
| 10 | −12.075 | 0.81 | 1.80518 | 25.46 | fifth lens |
| 11 | 5.253 | 0.31 | | | |
| 12 | 8.812 | 1.35 | 1.58913 | 61.25 | sixth lens |
| 13 | 20.251 | 0.10 | | | |
| 14 | 12.502 | 1.73 | 1.48749 | 70.44 | seventh lens |
| 15* | −8.992 | variable (B) | | | |
| 16* | 13.337 | 1.65 | 1.48749 | 70.44 | eighth lens |
| 17 | 463.779 | variable (C) | | | |
| 18 | ∞ | 3.25 | 1.51680 | 64.20 | various filters |
| 19 | ∞ | | | | |

The first to third lenses constitute a first group, the fourth to
seventh lenses constitute a second group and the eighth lens
constitutes a third group.
Aspherical surfaces:

Fourth surface;

K = 0.0, $A_4 = -1.29720 \times 10^{-3}$, $A_6 = -5.09824 \times 10^{-5}$,
$A_8 = 1.81023 \times 10^{-6}$, $A_{10} = -2.10769 \times 10^{-7}$,
$A_{12} = -4.76553 \times 10^{-9}$, $A_{14} = 8.28677 \times 10^{-10}$,
$A_{16} = -2.46190 \times 10^{-11}$, $A_{18} = -4.19978 \times 10^{-13}$
Eighth surface;

K = 0.0, $A_4 = -1.98718 \times 10^{-4}$, $A_6 = -9.47779 \times 10^{-6}$,
$A_8 = 2.05528 \times 10^{-6}$, $A_{10} = -1.77908 \times 10^{-7}$
Fifteenth surface;

K = 0,0, $A_4 = 5.86592 \times 10^{-4}$, $A_6 = 3.85335 \times 10^{-5}$,
$A_8 = -2.22078 \times 10^{-6}$, $A_{10} = 1.73297 \times 10^{-7}$
Sixteenth surface;

K = 0.0, $A_4 = -1.97840 \times 10^{-4}$, $A_6 = 1.55183 \times 10^{-5}$,
$A_8 = -1.27195 \times 10^{-6}$, $A_{10} = 4.39912 \times 10^{-8}$
Variable amount

| | Short focus end<br>f = 4.33 | Intermediate focal length<br>f = 6.63 | Long focus end<br>f = 10.18 |
|---|---|---|---|
| A | 11.860 | 5.530 | 1.400 |
| B | 1.450 | 5.230 | 10.810 |
| C | 3.570 | 3.241 | 2.731 |

Numerical values in the conditional relationships
($L_{G2}/Y'$) = 2.06
($f_{L1}/f_{L2}$) = 1.42

[Embodiment 13]
f= 5.46–10.29, F = 2.76–3.64, ω = 33.92–19.03

| Surface Nos. | R | D | Nd | vd | Remarks |
|---|---|---|---|---|---|
| 01 | 128.673 | 1.00 | 1.80610 | 40.74 | first lens |
| 02* | 4.108 | 1.50 | | | |
| 03 | 8.797 | 1.75 | 1.84666 | 23.78 | second lens |
| 04 | 56.875 | variable (A) | | | |
| 05 | iris | 1.00 | | | |
| 06* | 5.276 | 2.39 | 1.72342 | 37.99 | third lens |
| 07 | −16.390 | 0.23 | | | |
| 08 | −10.483 | 0.80 | 1.80518 | 25.46 | fourth lens |
| 09 | 5.803 | 0.21 | | | |
| 10 | 7.974 | 2.29 | 1.51680 | 64.20 | fifth lens |
| 11* | −9.846 | variable (B) | | | |
| 12* | 13.220 | 1.55 | 1.48749 | 70.44 | sixth lens |

-continued

| 13 | 132.376 | variable (C) | | | |
| 14 | ∞ | 3.25 | 1.51680 | 4.20 | various filters |
| 15 | ∞ | | | | |

The first and second lenses constitute a first group, the third to fifth lenses constitute a second group and the sixth lens constitutes a third group.
Aspherical surfaces:

Second surface;

$K = 0.0, A_4 = -1.41341 \times 10^{-3}, A_6 = -8.23203 \times 10^{-5},$
$A_8 = 3.51562 \times 10^{-6}, A_{10} = -4.08043 \times 10^{-7},$
$A_{12} = -2.02424 \times 10^{-8}, A_{14} = 1.46185 \times 10^{-9},$
$A_{16} = 8.49258 \times 10^{-11}, A_{18} = -8.85489 \times 10^{-12}$
Sixth surface;

$K = 0.0, A_4 = -1.06275 \times 10^{-4}, A_6 = 7.68066 \times 10^{-6},$
$A_8 = 1.00953 \times 10^{-6}, A_{10} = -4.21879 \times 10^{-7}$
Eleventh surface;

$K = 0.0, A_4 = 9.01094 \times 10^{-4}, A_6 = 6.60691 \times 10^{-5},$
$A_8 = -4.27954 \times 10^{-7}, A_{10} = 5.21148 \times 10^{-7}$
Twelfth surface;

$K = 0.0, A_4 = -3.07368 \times 10^{-4}, A_6 = 2.58407 \times 10^{-5},$
$A_8 = -1.98853 \times 10^{-6}, A_{10} = 6.58622 \times 10^{-8}$
Variable amount

| | Short focus end f = 5.46 | Intermediate focal length f = 7.50 | Long focus end f = 10.29 |
|---|---|---|---|
| A | 10.010 | 5.730 | 2.280 |
| B | 1.460 | 4.390 | 7.200 |
| C | 4.540 | 4.367 | 4.954 |

Numerical values in the conditional relationships
$(L_{G2}/Y') = 1.69$
$(R_{31} + R_{32})/(R_{31} - R_{32}) = -0.105$ FIGS. 23 to 30 show sequentially, by arrows, manners each group of the zoom lenses moves according to variation of magnification to the long focus end and the lens arrangement in the short focus end. In these figures, as in the embodiments 1 to 6, G1 indicates a first group, G2 indicates a second group, G3 indicates a third group, S indicates an iris and F" indicates various filters. In the respective embodiments, in order to increase degree of freedom in aberration correction, the third group G3 moves a little.

Figure 31:
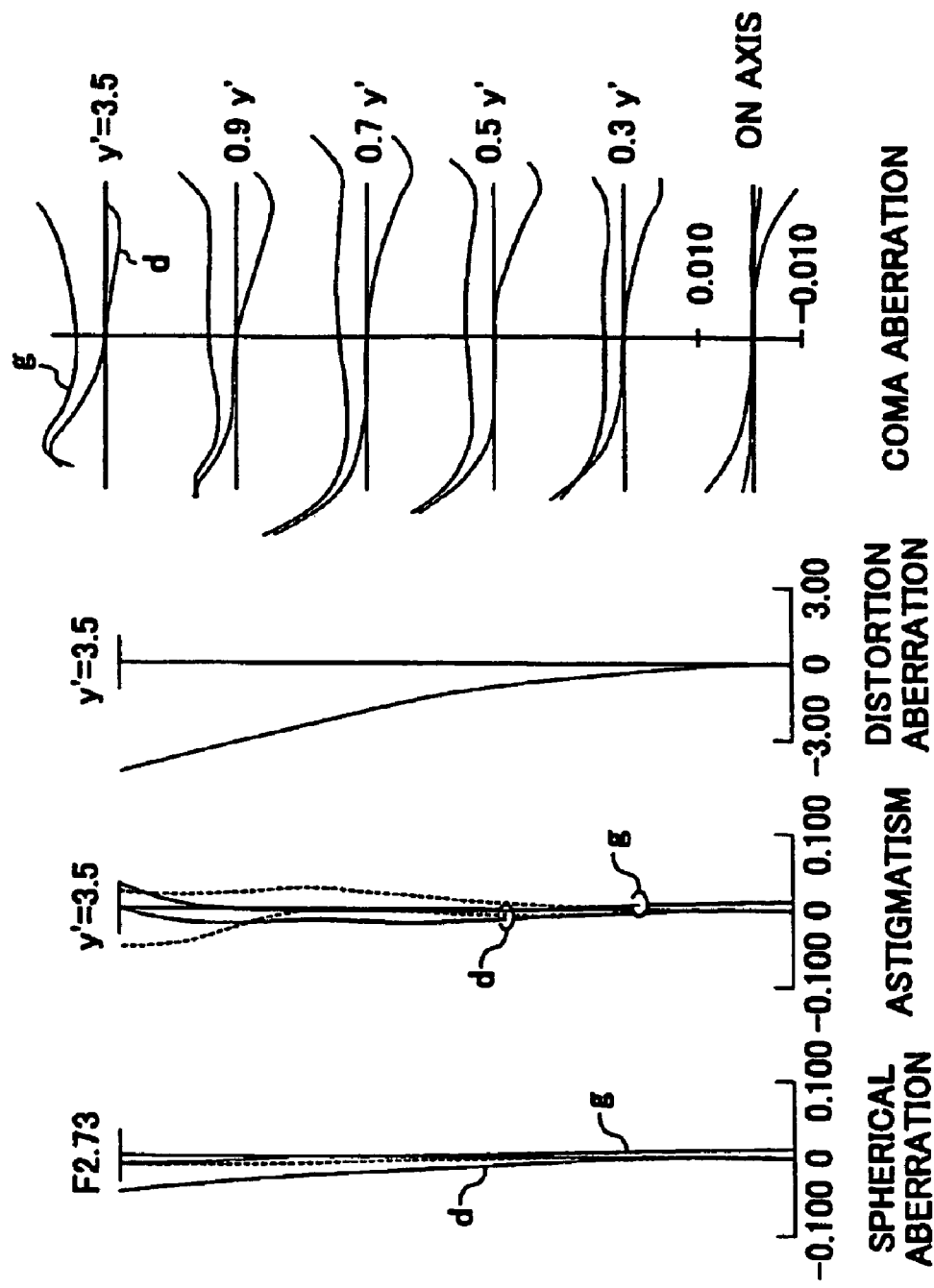
FIG. 31 shows an aberration curve in a short focus end of zoom lens of the embodiment 6.
Figure 32:
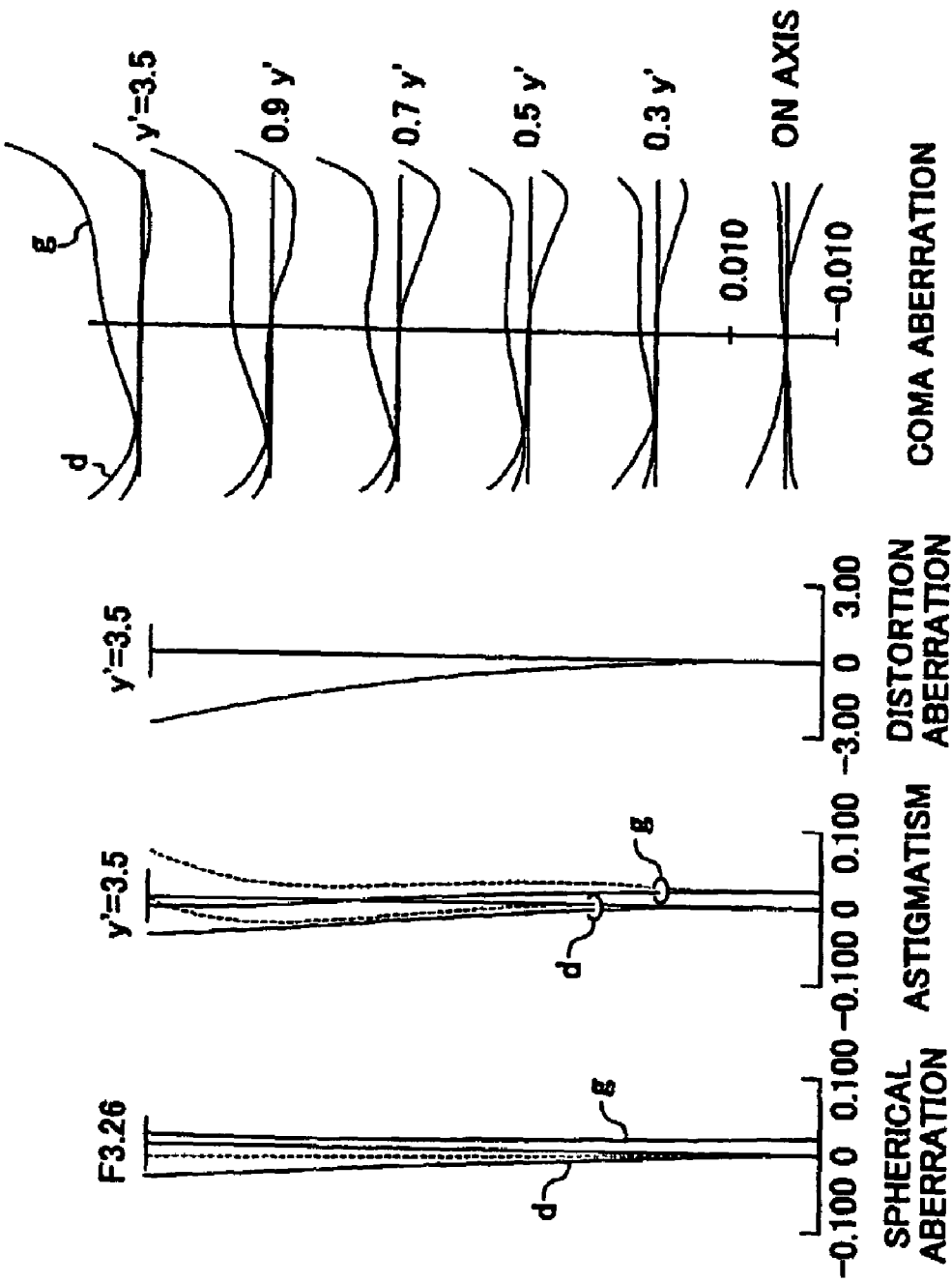
FIG. 32 shows an aberration curve in an intermediate focal length of zoom lens of the embodiment 6.
Figure 33:
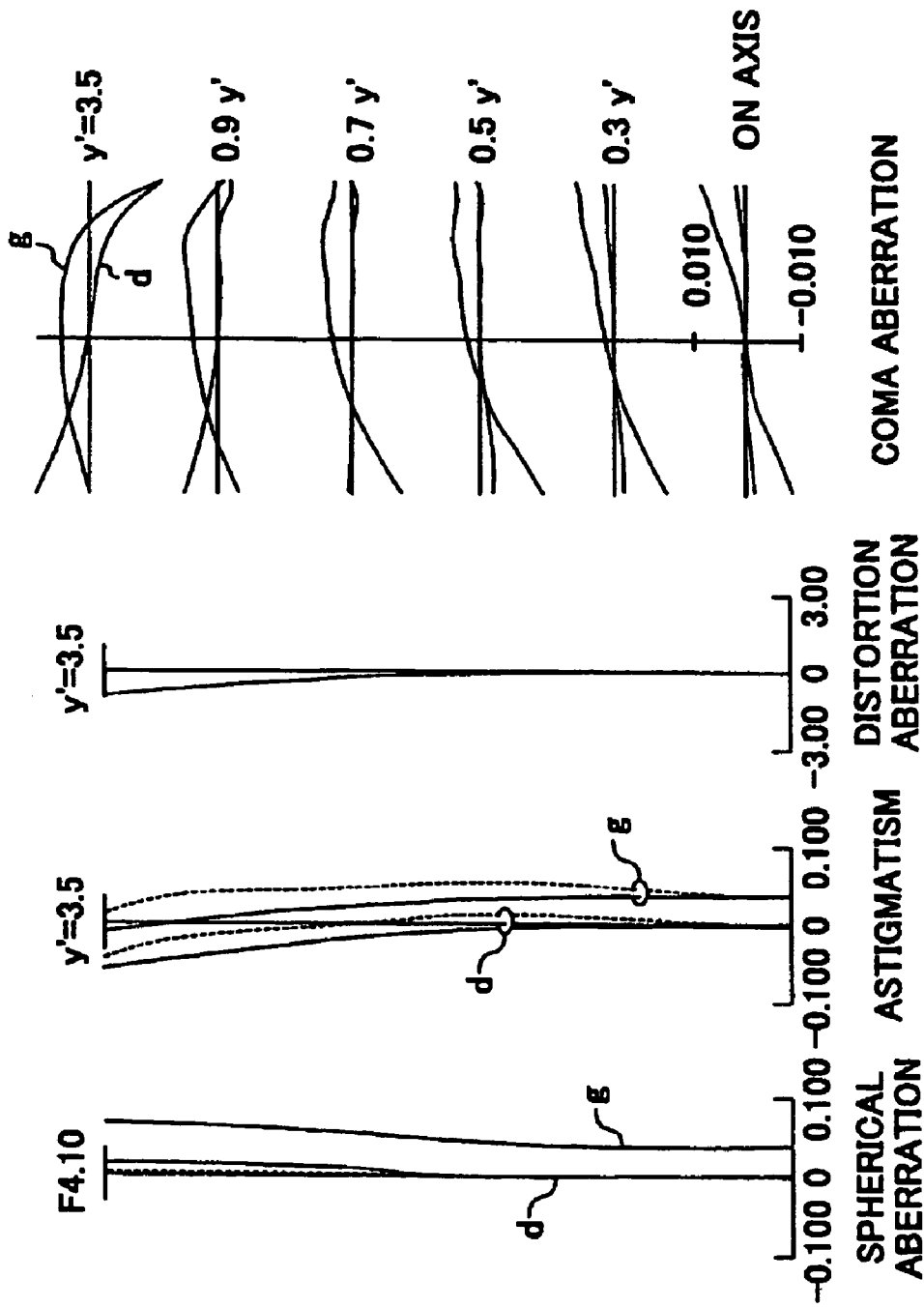
FIG. 33 shows an aberration curve in a long focus end of zoom lens of the embodiment 6.
Figure 34:
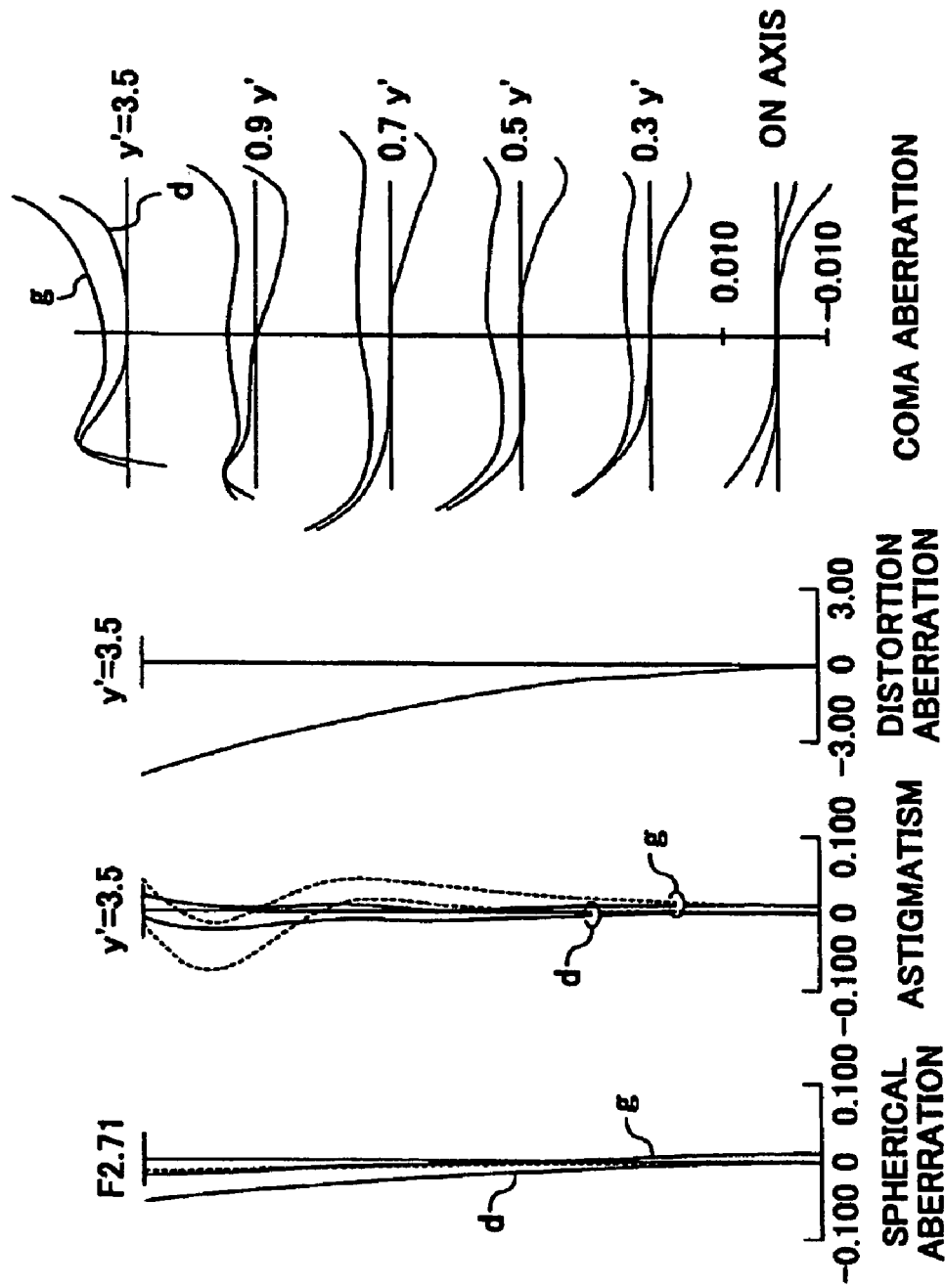
FIG. 34 shows an aberration curve in a short focus end of zoom lens of the embodiment 7.
Figure 35:
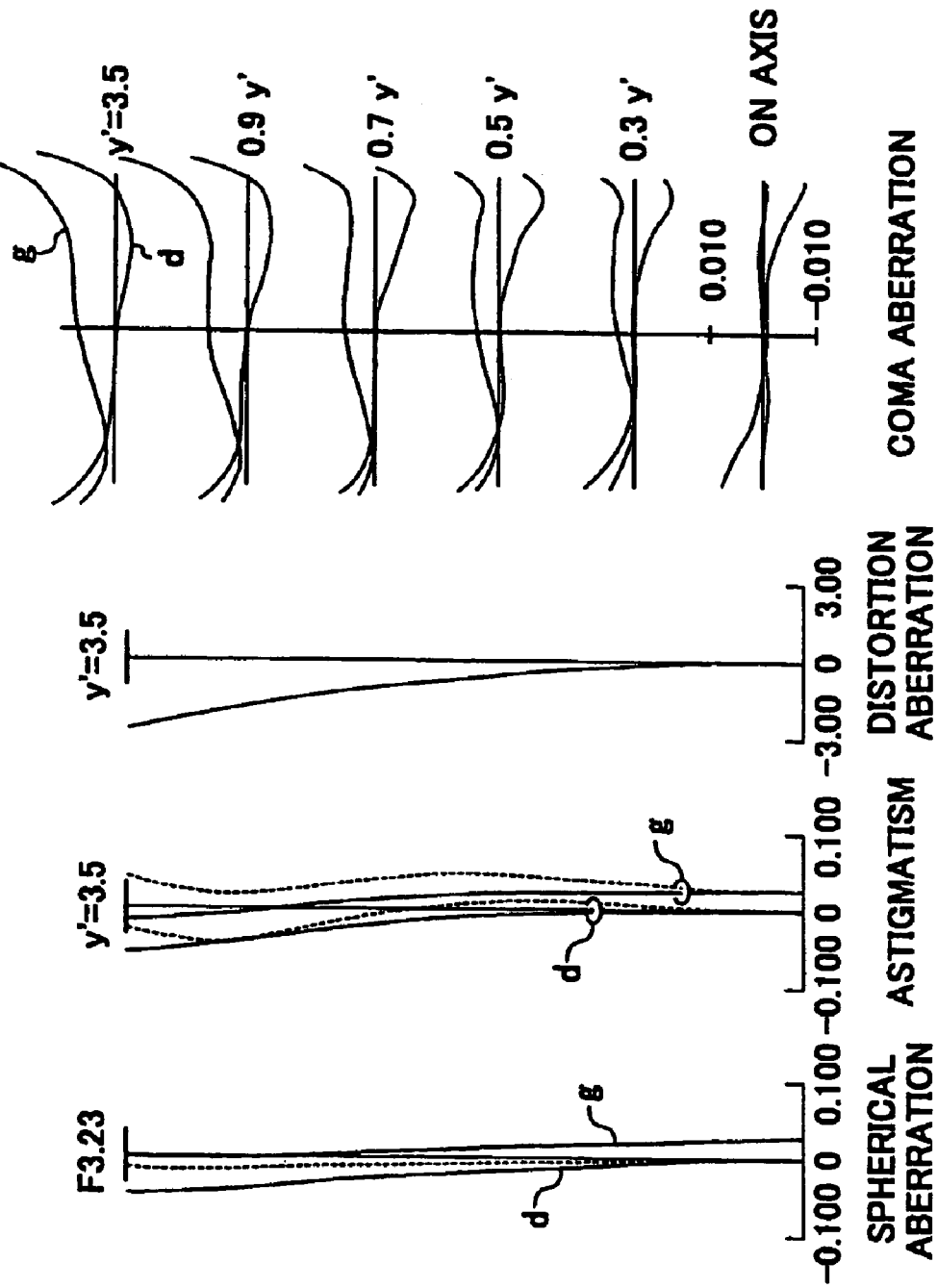
FIG. 35 shows an aberration curve in an intermediate focal length of zoom lens of the embodiment 7.
Figure 36:
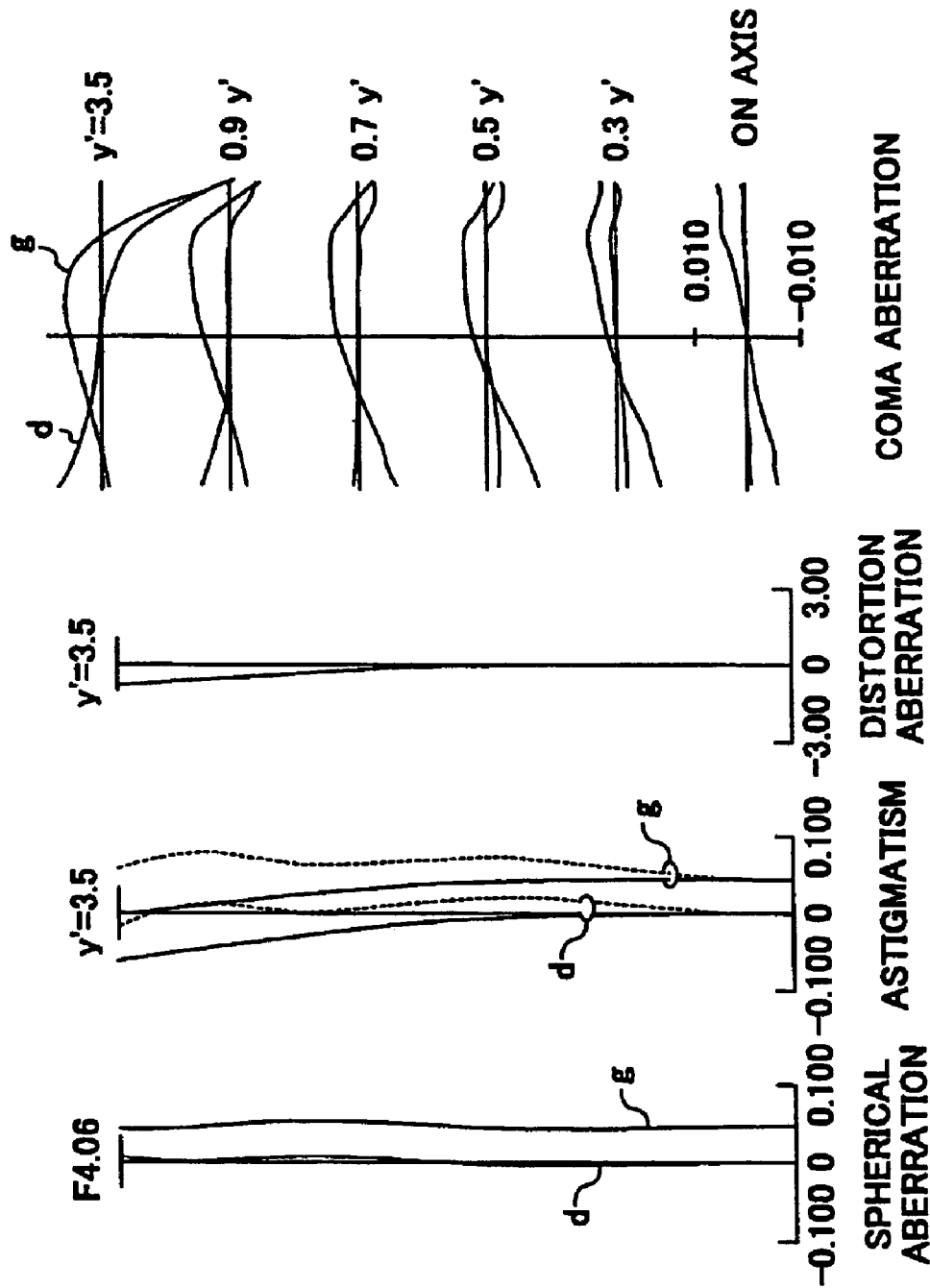
FIG. 36 shows an aberration curve in a long focus end of zoom lens of the embodiment 7.

Aberration curve graphs in the short focus end, the intermediate focal length and the long focus end according to the embodiment 6 are sequentially shown in FIGS. 31 to 33. Aberration curve graphs in the short focus end, the intermediate focal length and the long focus end according to the embodiment 7 are sequentially shown in FIGS. 34 to 36.

Figure 37:
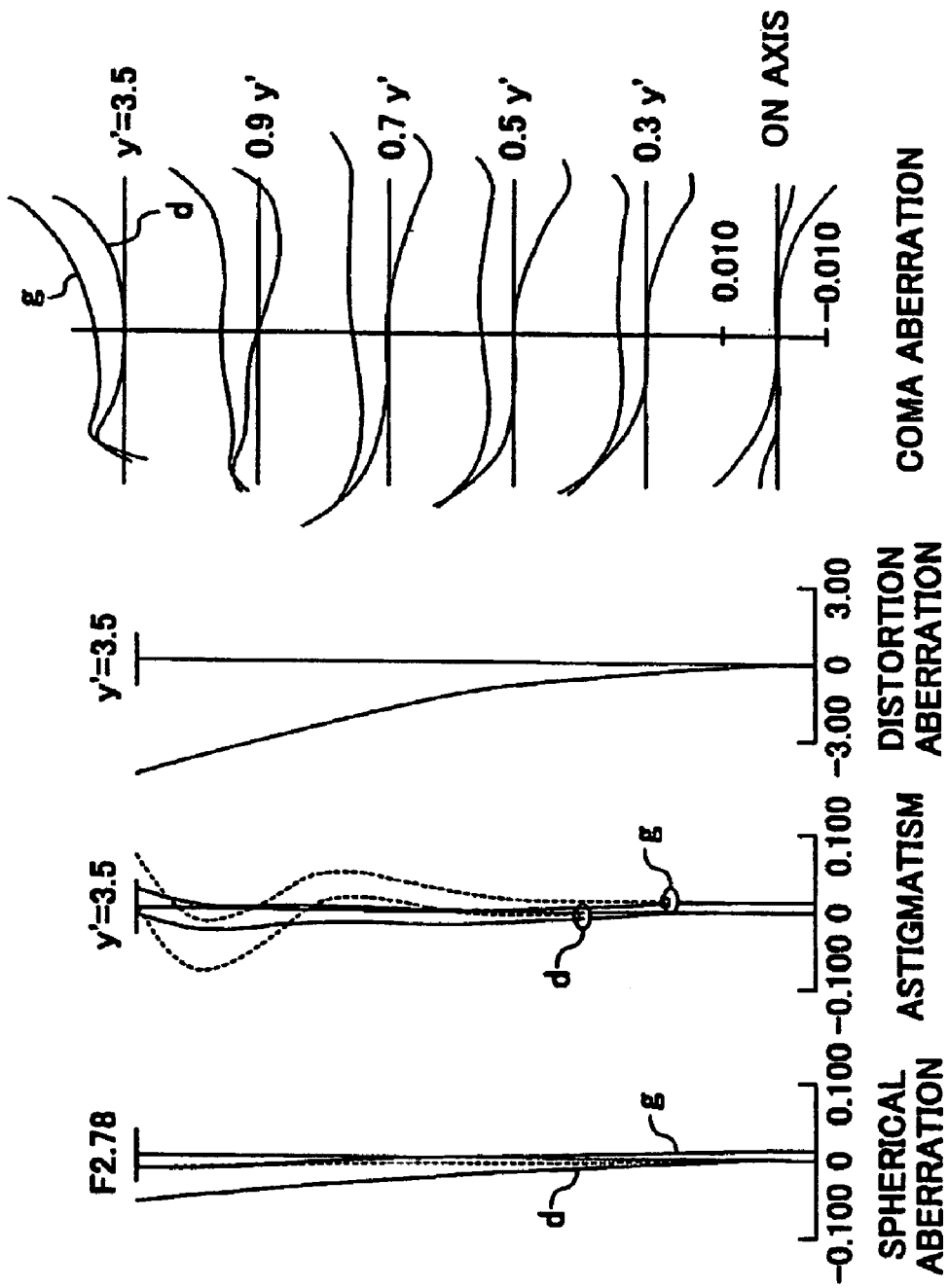
FIG. 37 shows an aberration curve in a short focus end of zoom lens of the embodiment 8.
Figure 38:
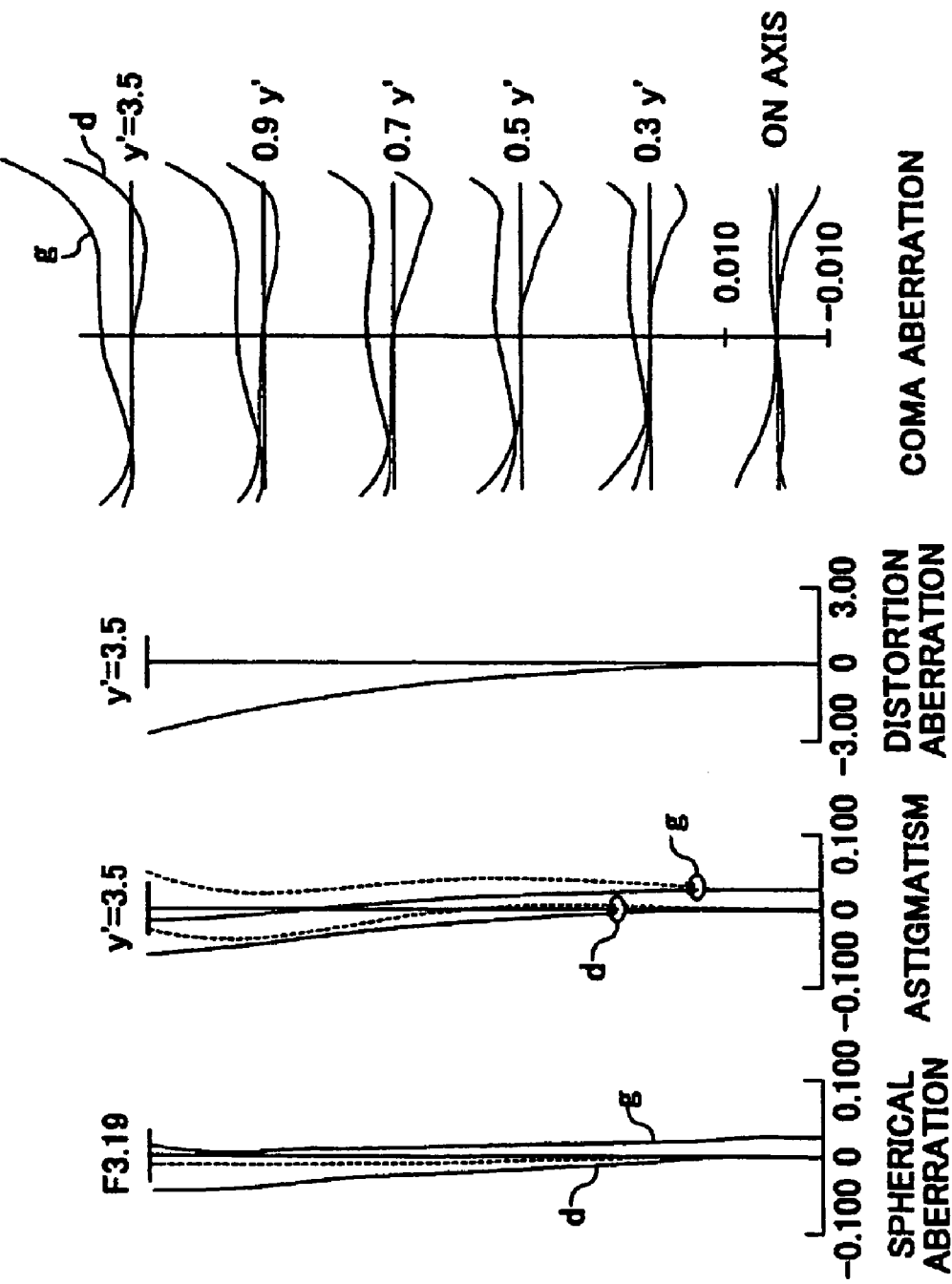
FIG. 38 shows an aberration curve in an intermediate focal length of zoom lens of the embodiment 8.
Figure 39:
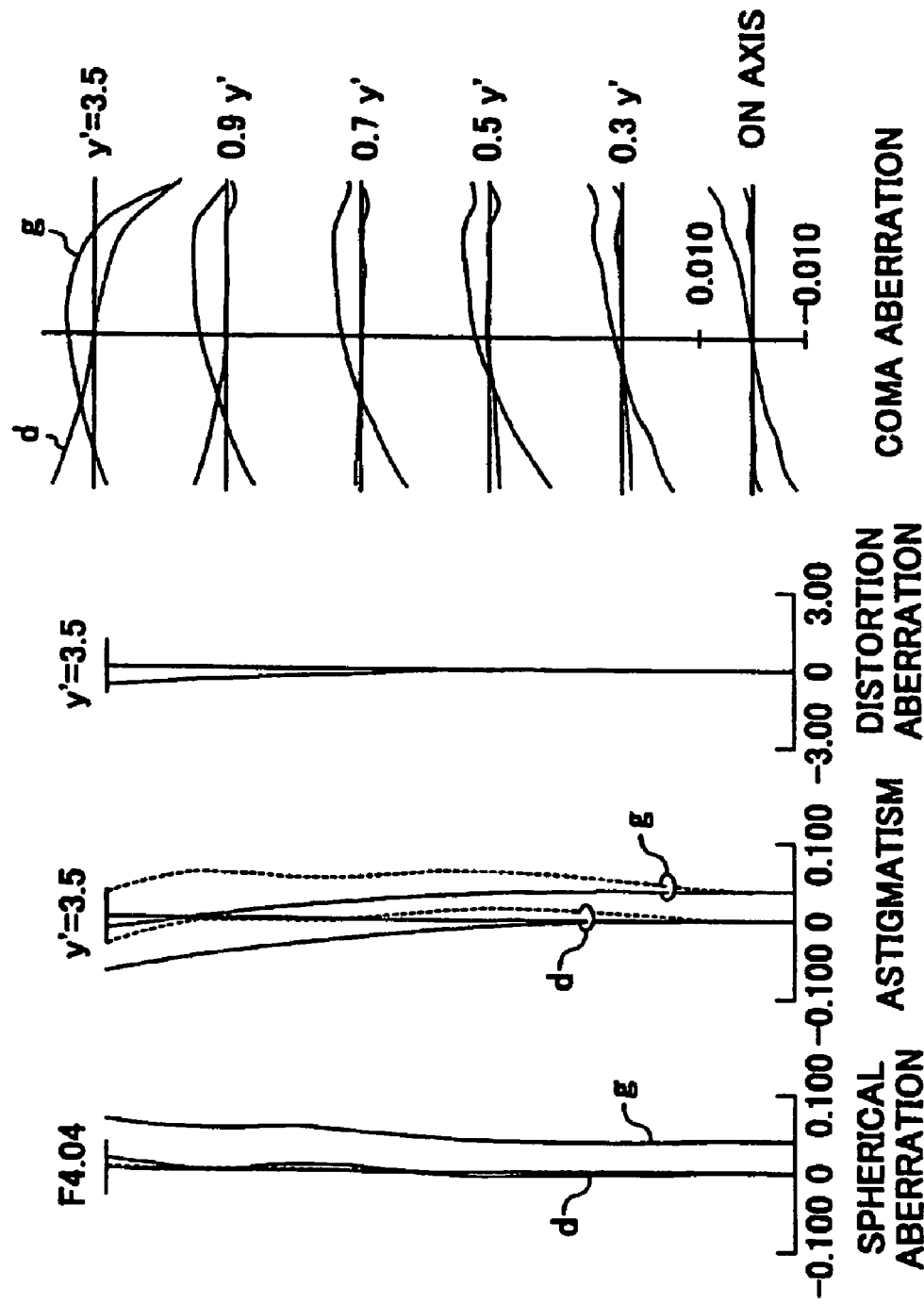
FIG. 39 shows an aberration curve in a long focus end of zoom lens of the embodiment 8.
Figure 40:
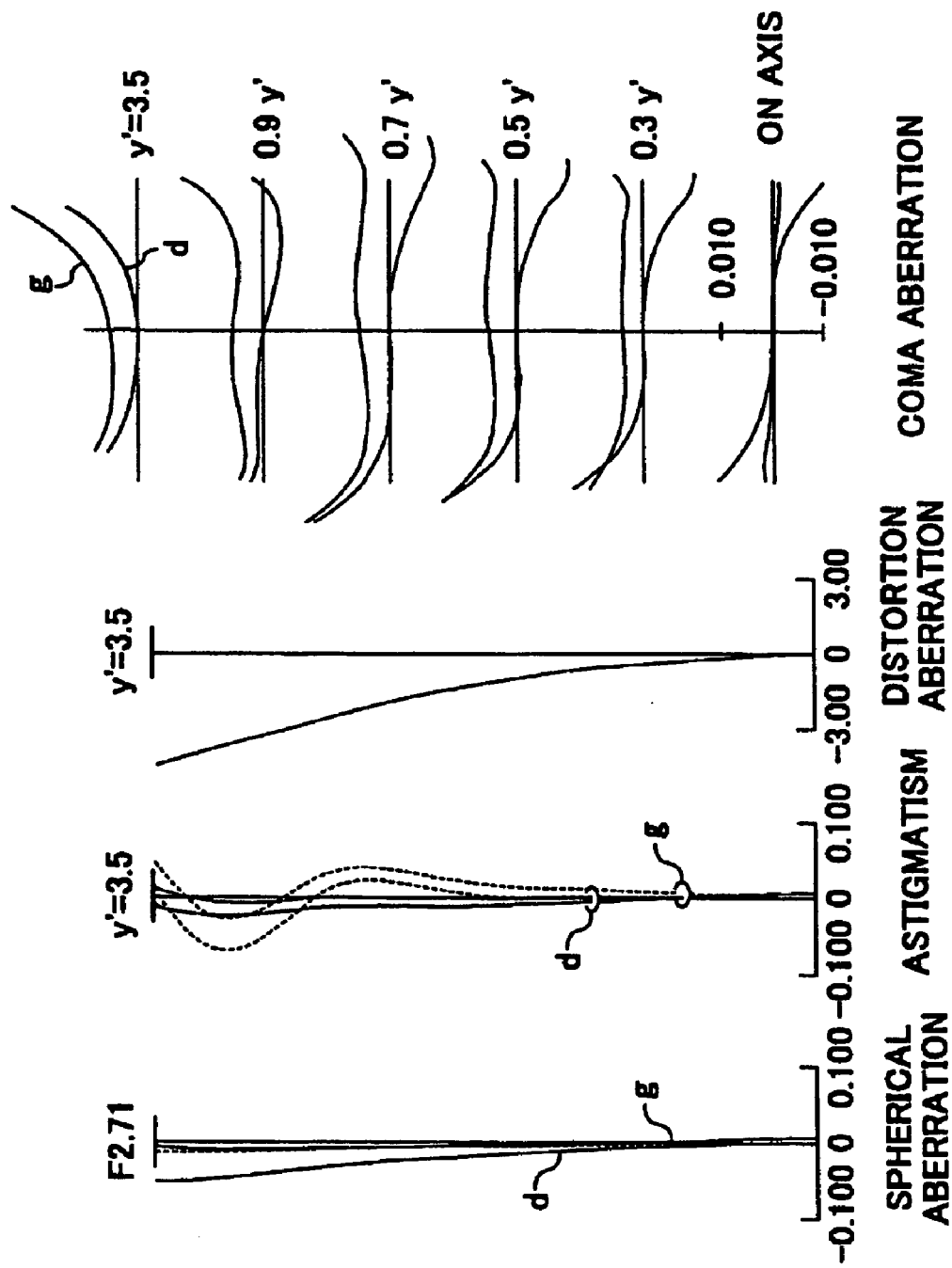
FIG. 40 shows an aberration curve in a short focus end of zoom lens of the embodiment 9.
Figure 41:
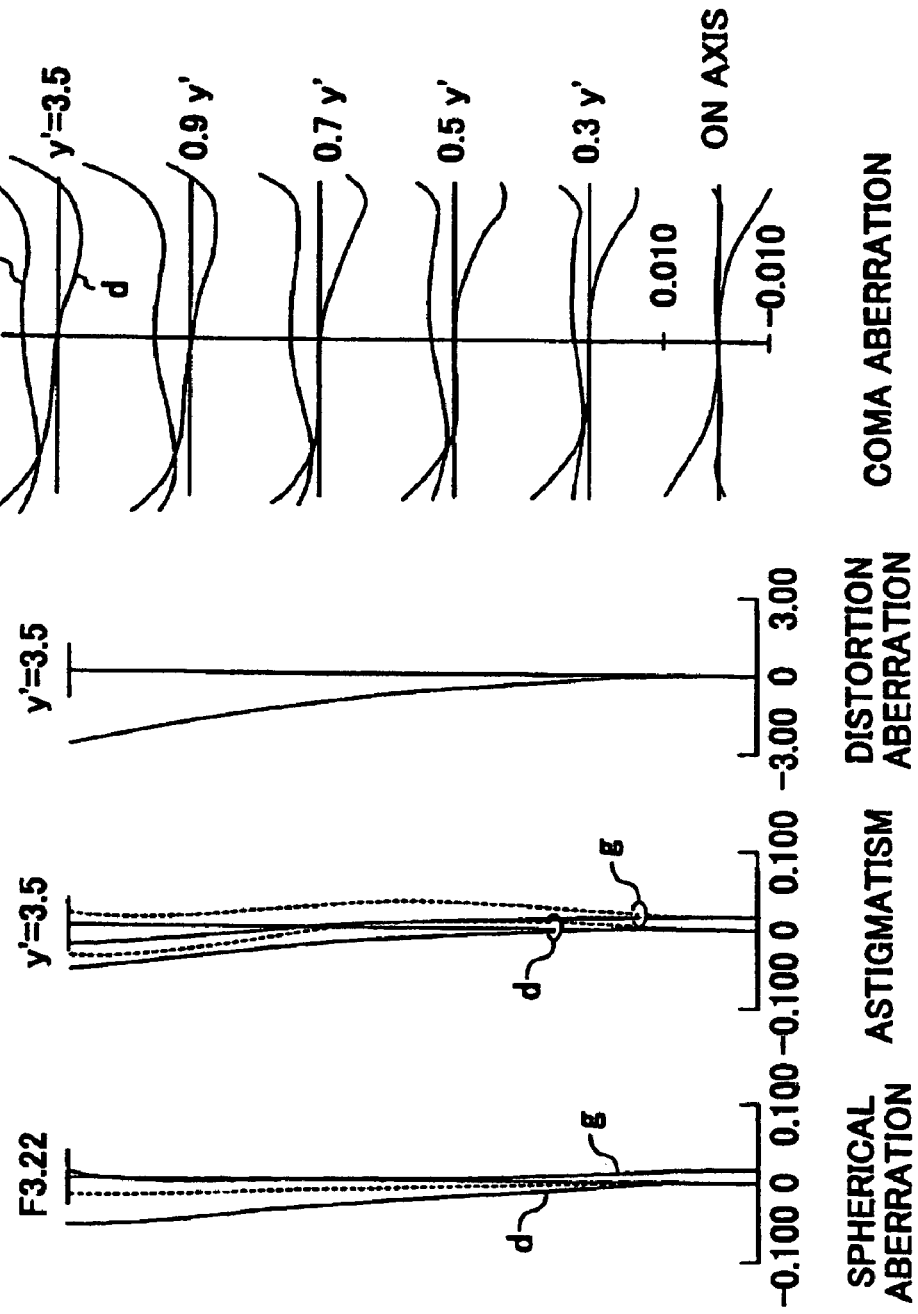
FIG. 41 shows an aberration curve in an intermediate focal length of zoom lens of the embodiment 9.
Figure 42:
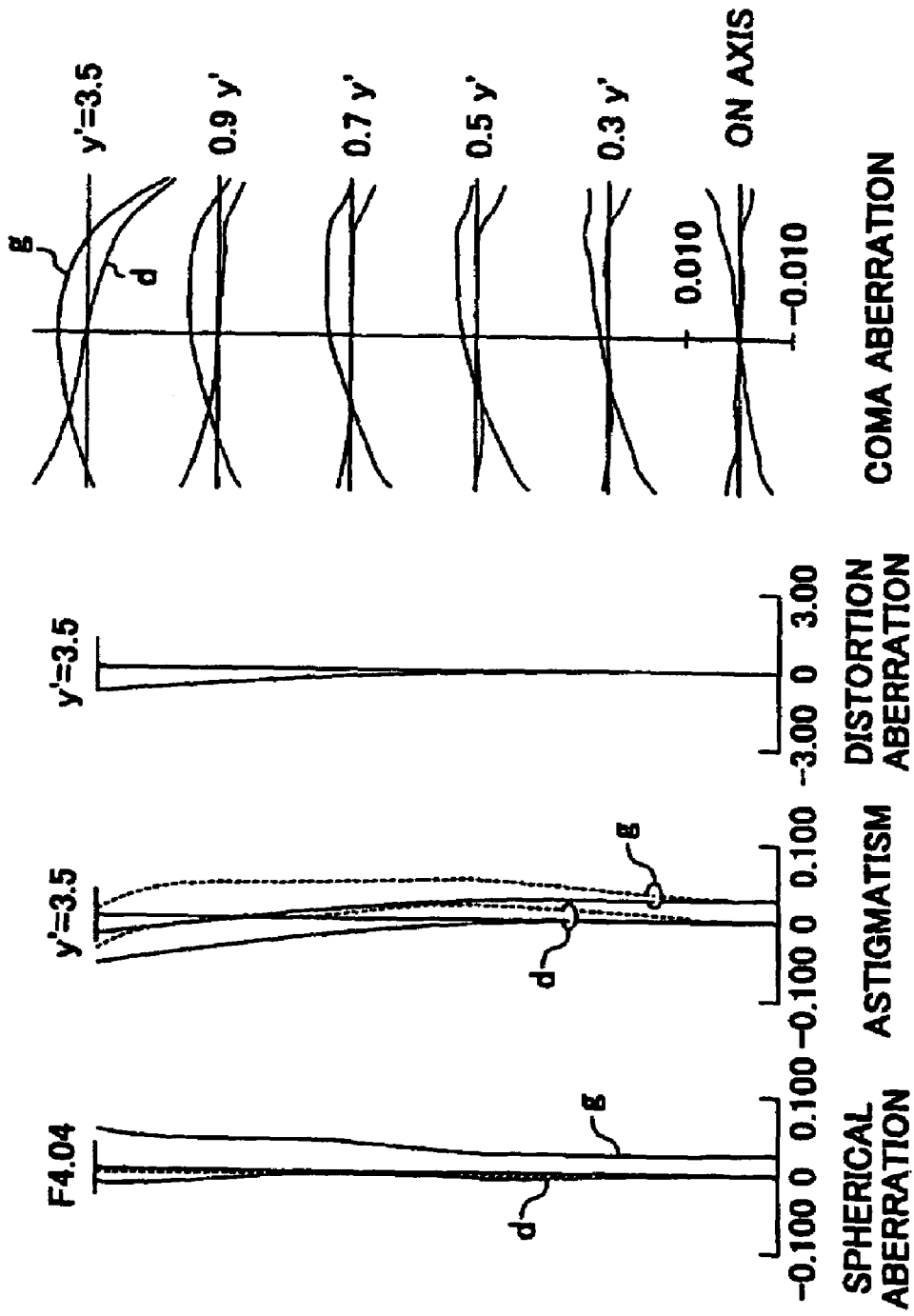
FIG. 42 shows an aberration curve in a long focus end of zoom lens of the embodiment 9.

Aberration curve graphs in the short focus end, the intermediate focal length and the long focus end according to the embodiment 8 are sequentially shown in FIGS. 37 to 39. Aberration curve graphs in the short focus end, the intermediate focal length and the long focus end according to the embodiment 9 are sequentially shown in FIGS. 40 to 42.

Figure 43:
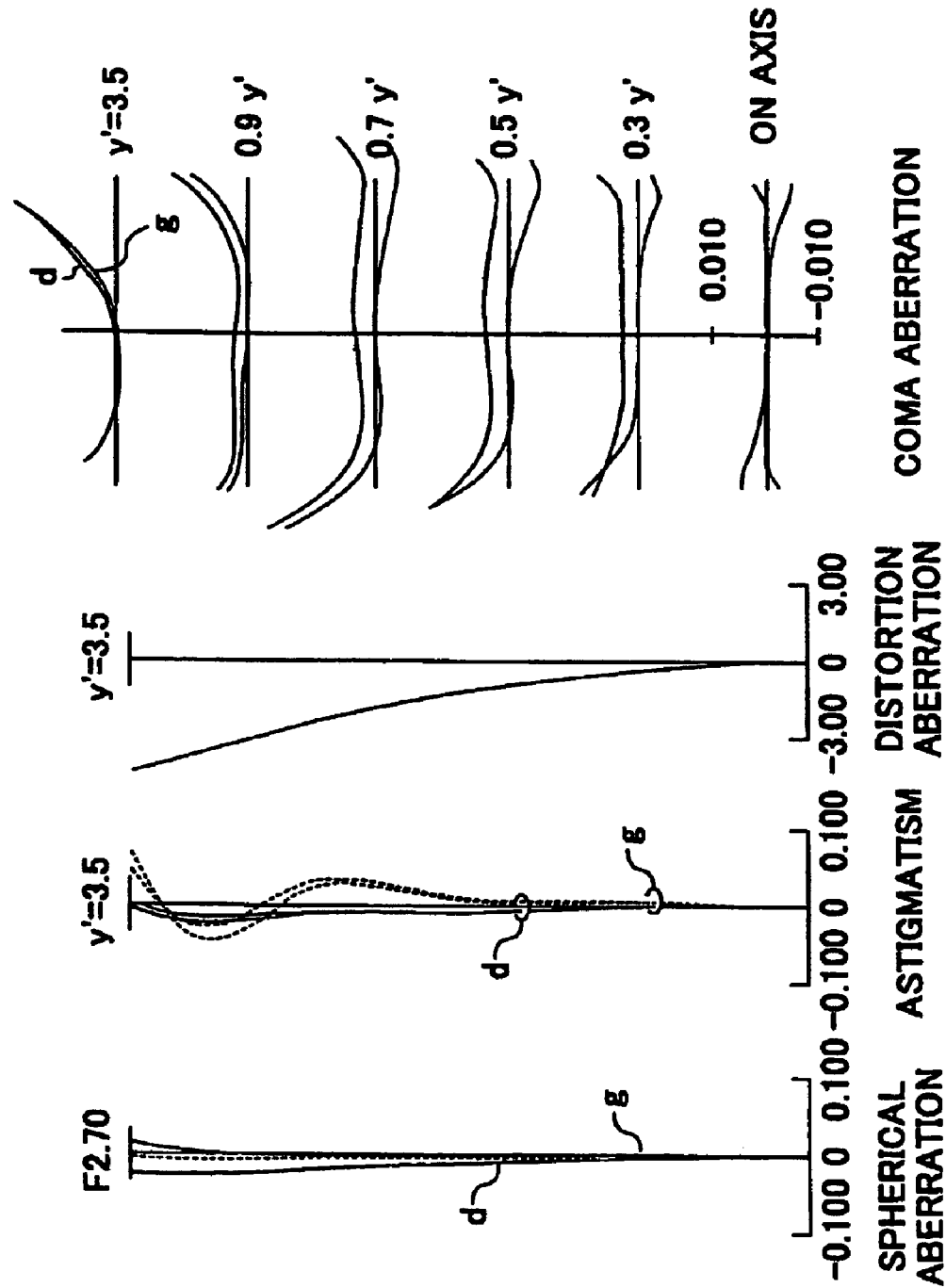
FIG. 43 shows an aberration curve in a short focus end of zoom lens of the embodiment 10.
Figure 44:
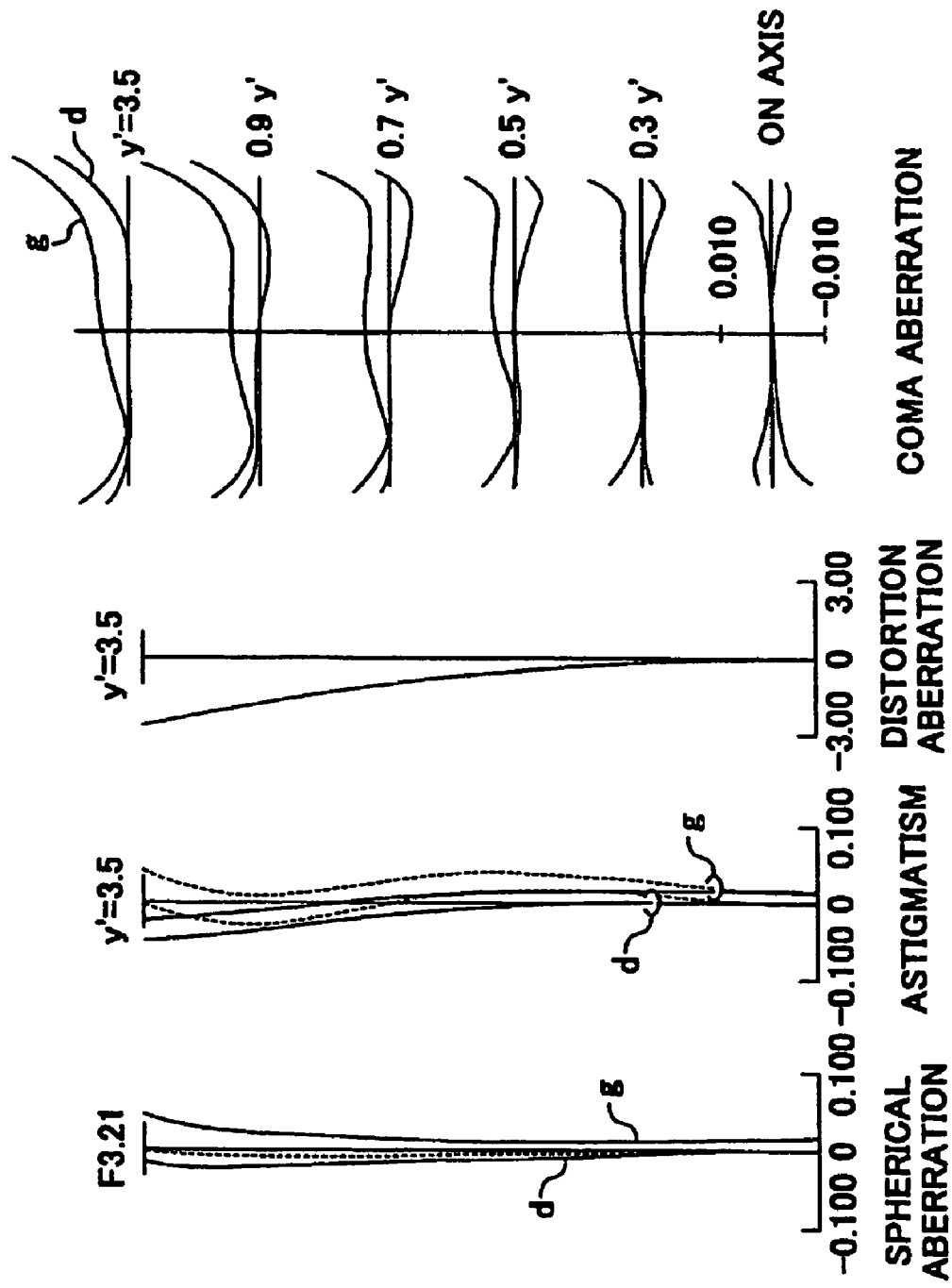
FIG. 44 shows an aberration curve in an intermediate focal length of zoom lens of the embodiment 10.
Figure 45:
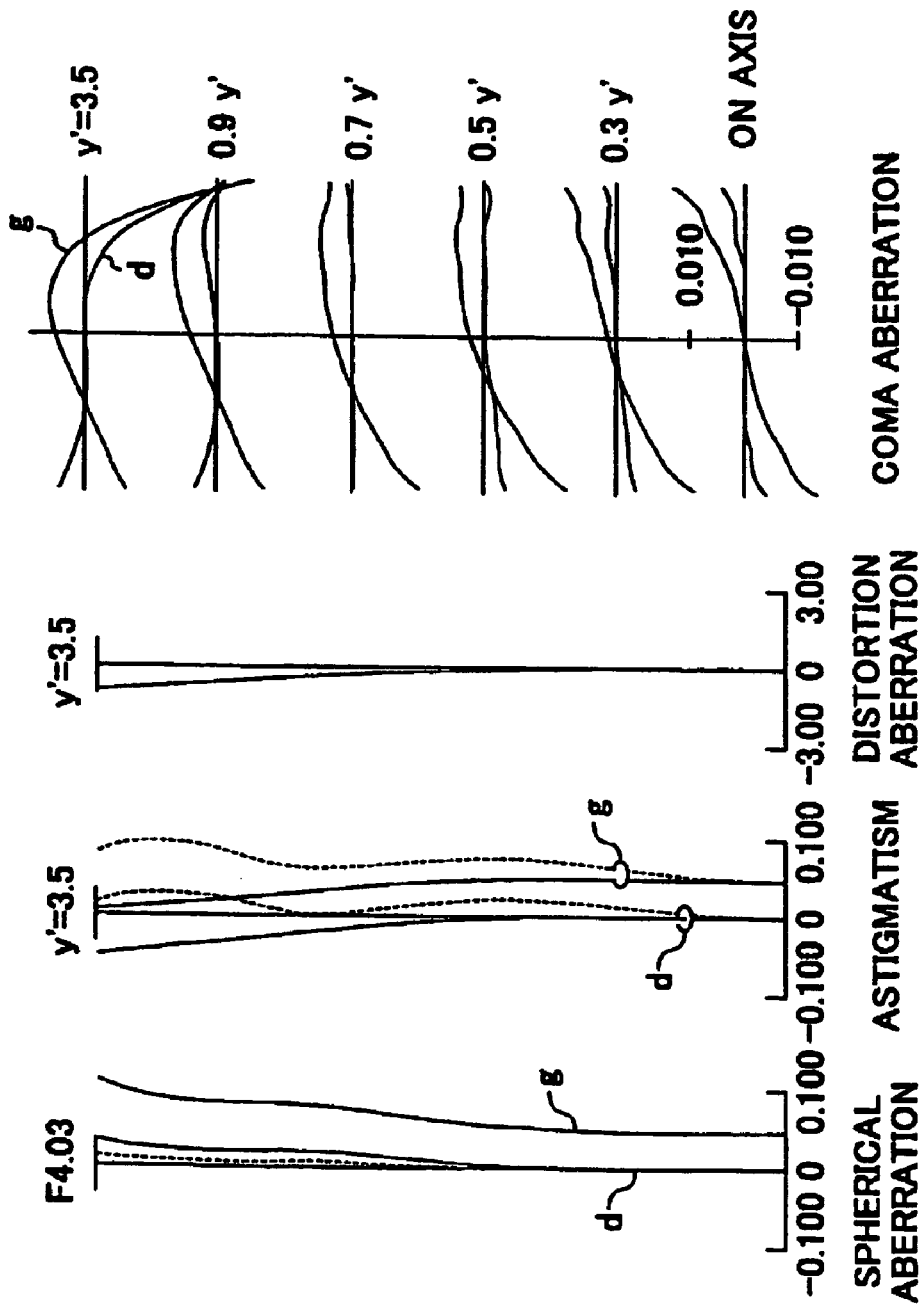
FIG. 45 shows an aberration curve in a long focus end of zoom lens of the embodiment 10.
Figure 46:
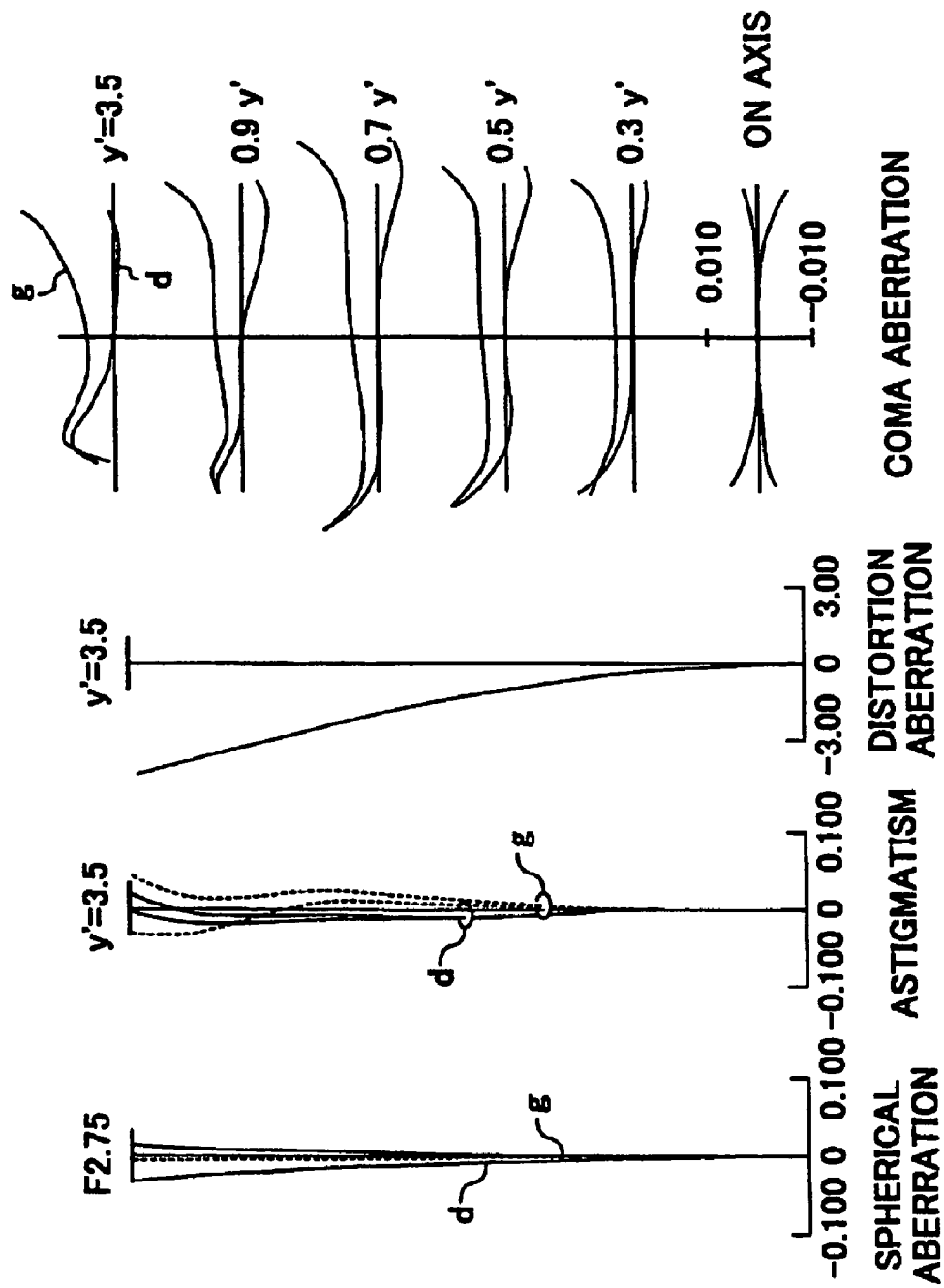
FIG. 46 shows an aberration curve in a short focus end of zoom lens of the embodiment 11.
Figure 47:
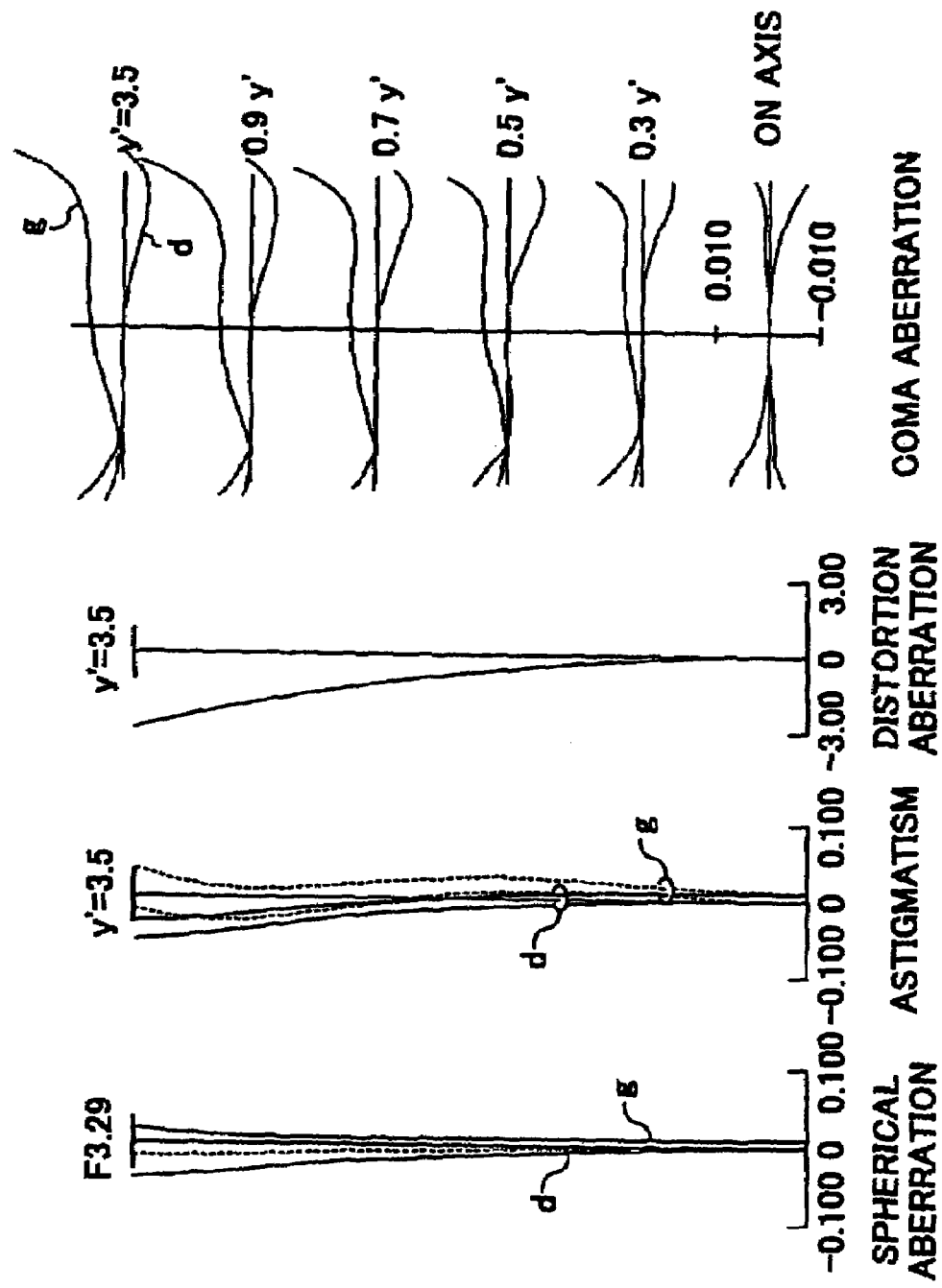
FIG. 47 shows an aberration curve in an intermediate focal length of zoom lens of the embodiment 11.
Figure 48:
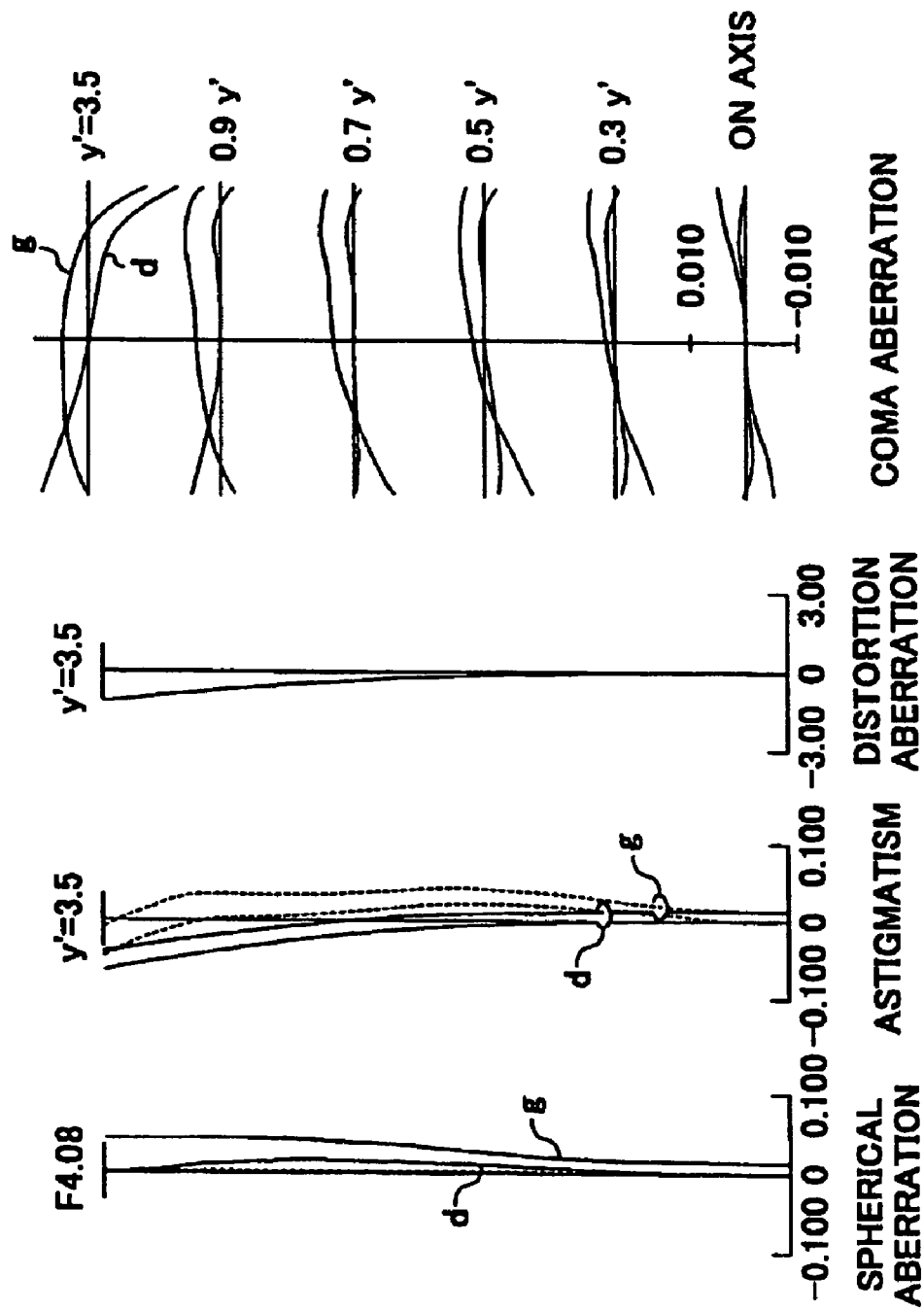
FIG. 48 shows an aberration curve in a long focus end of zoom lens of the embodiment 11.

Aberration curve graphs in the short focus end, the intermediate focal length and the long focus end according to the embodiment 10 are sequentially shown in FIG. 43 to 45. Aberration curve graphs in the short focus end, the intermediate focal length and the long focus end according to the embodiment 11 are sequentially shown in FIGS. 46 to 48.

Figure 49:
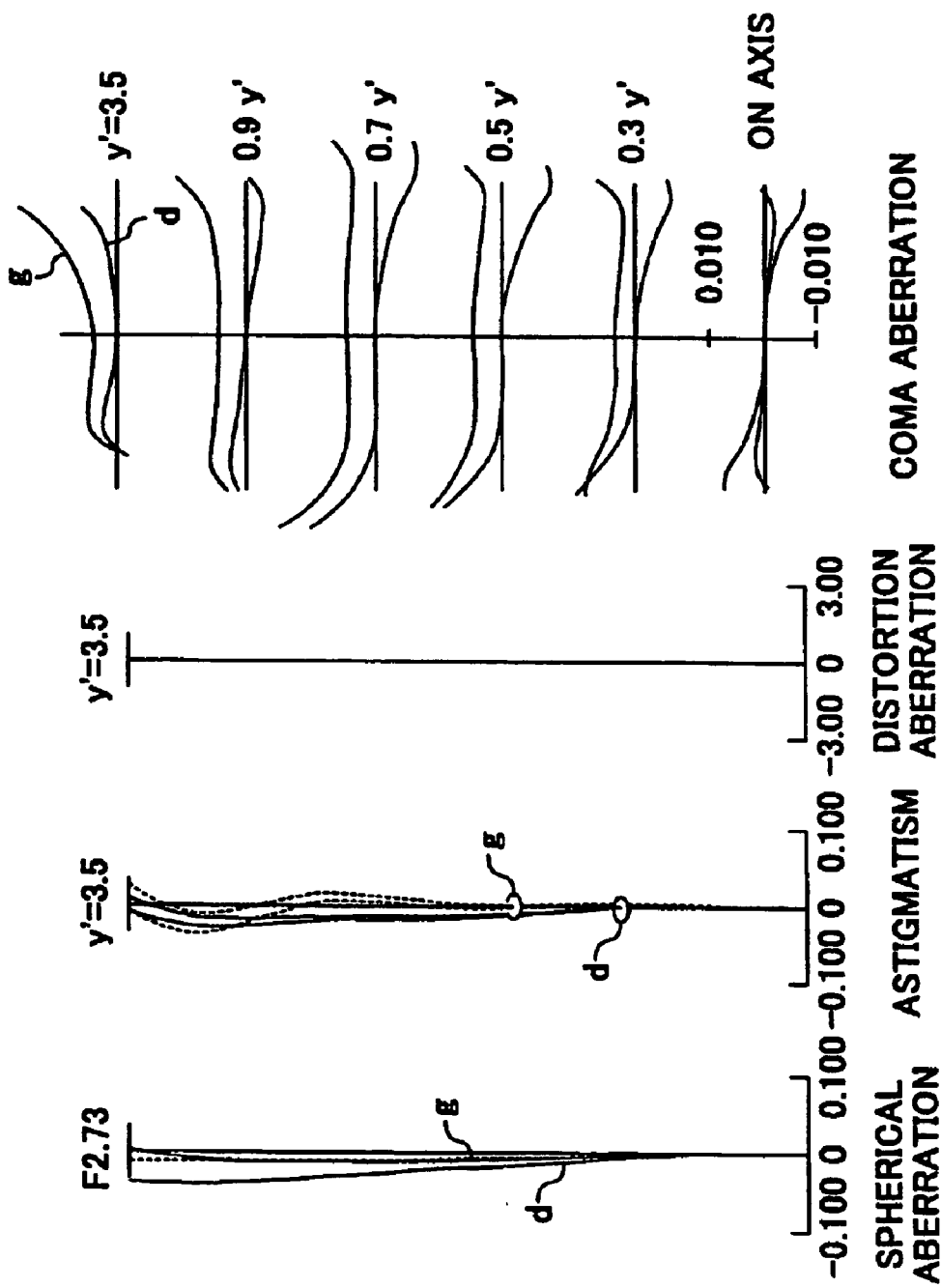
FIG. 49 shows an aberration curve in a short focus end of zoom lens of the embodiment 12.
Figure 50:
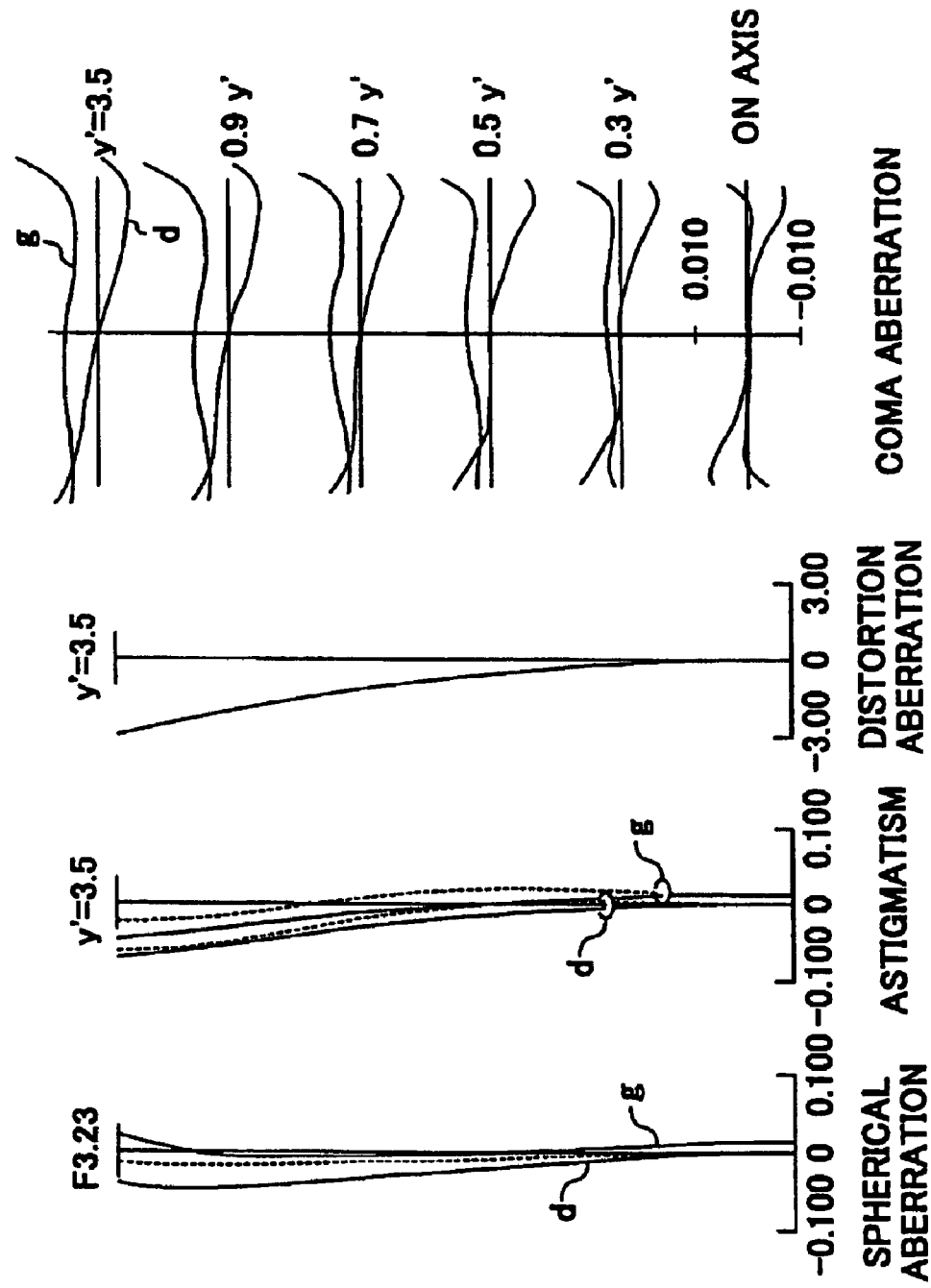
FIG. 50 shows an aberration curve in an intermediate focal length of zoom lens of the embodiment 12.
Figure 51:
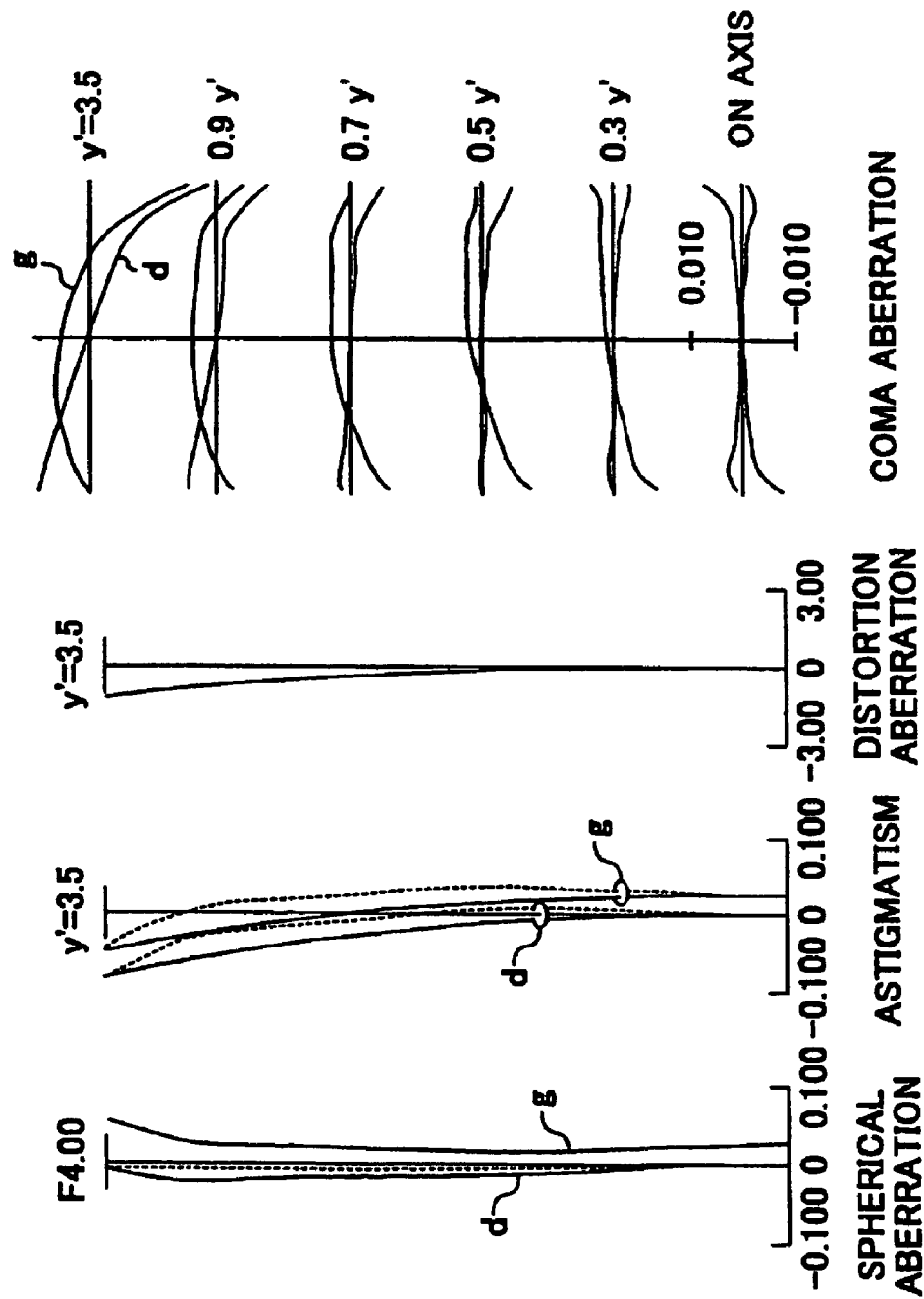
FIG. 51 shows an aberration curve in a long focus end of zoom lens of the embodiment 12.
Figure 52:
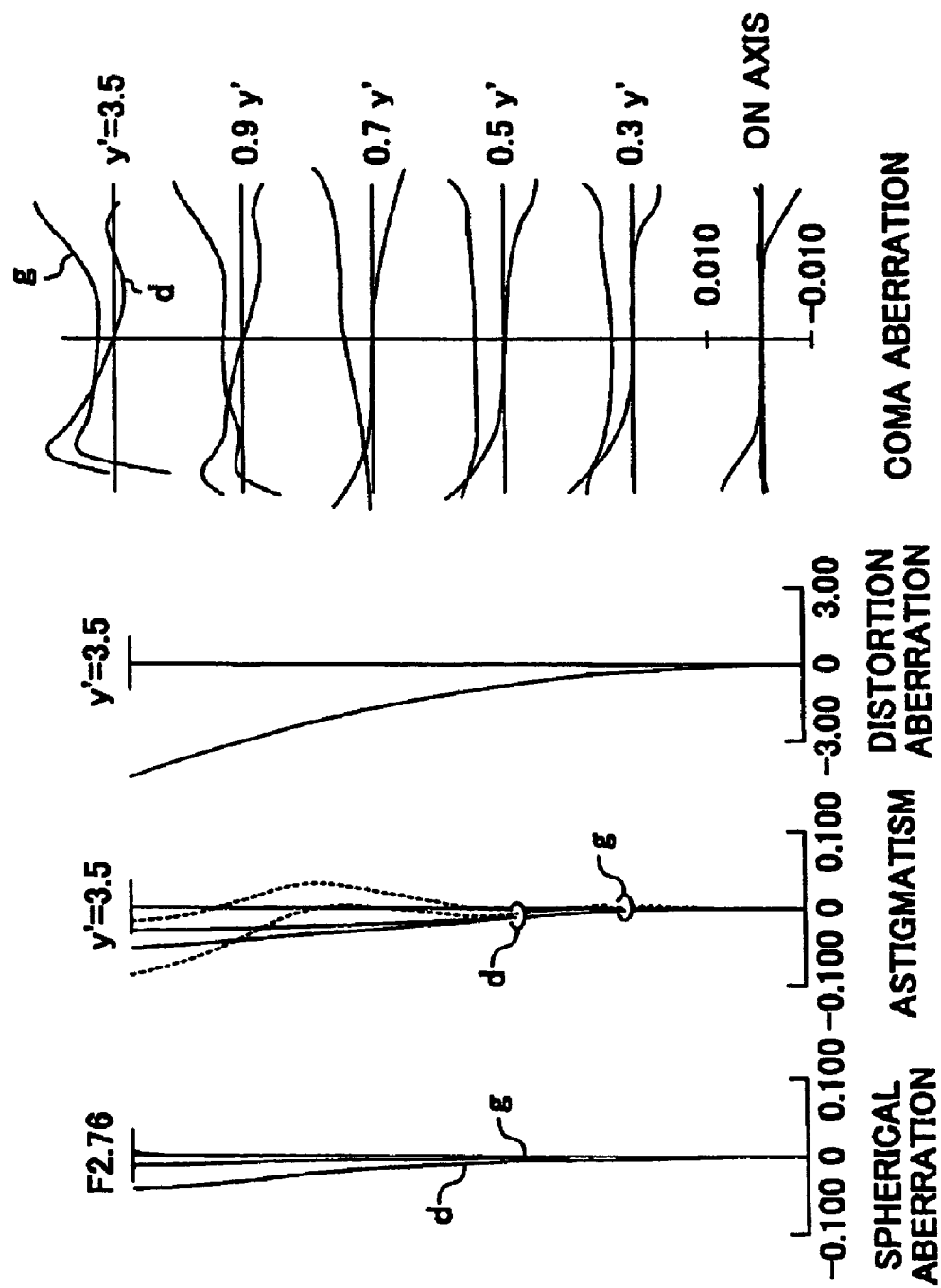
FIG. 52 shows an aberration curve in a short focus end of zoom lens of the embodiment 13.
Figure 53:
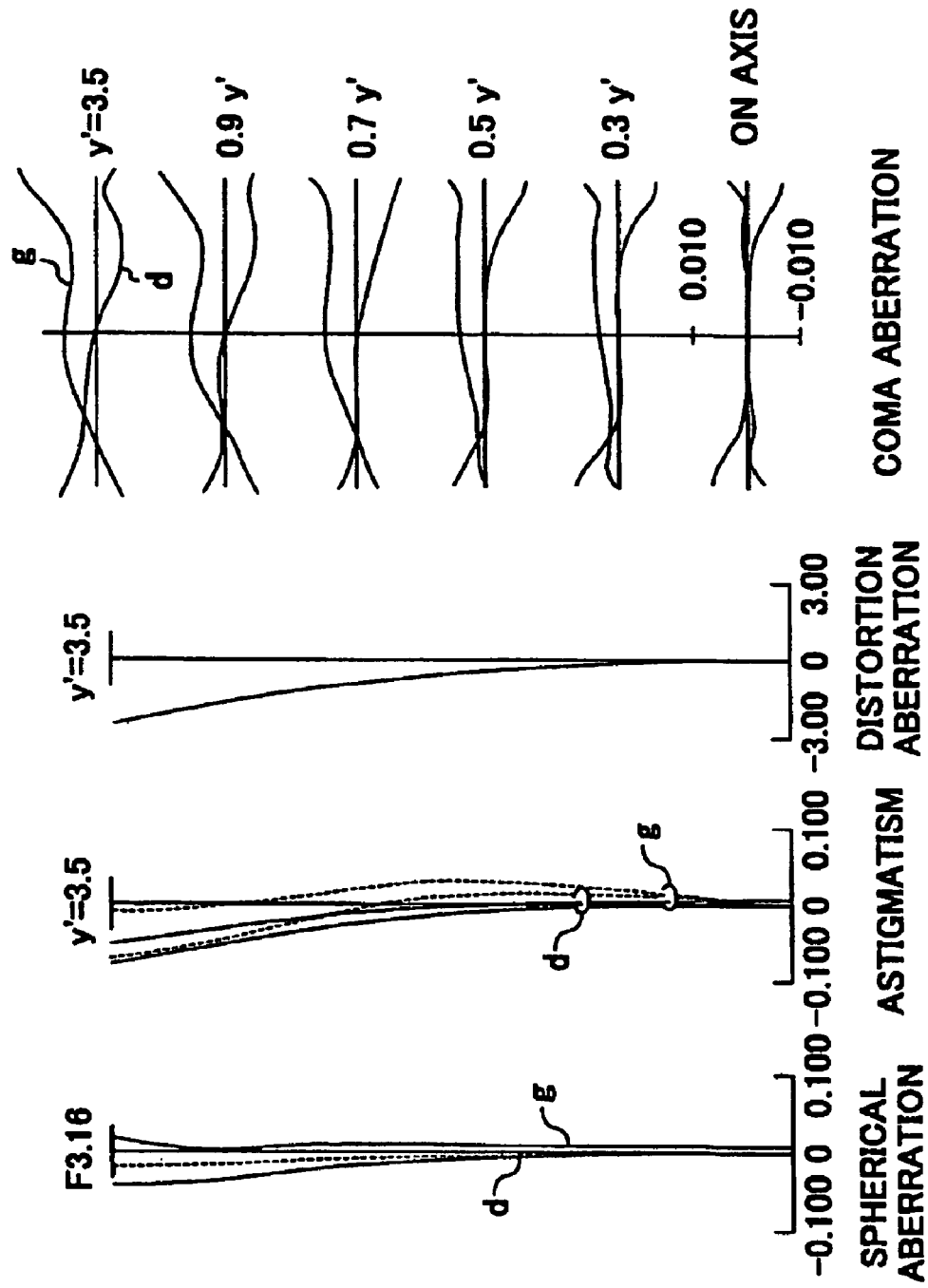
FIG. 53 shows an aberration curve in an intermediate focal length of zoom lens of the embodiment 13.
Figure 54:
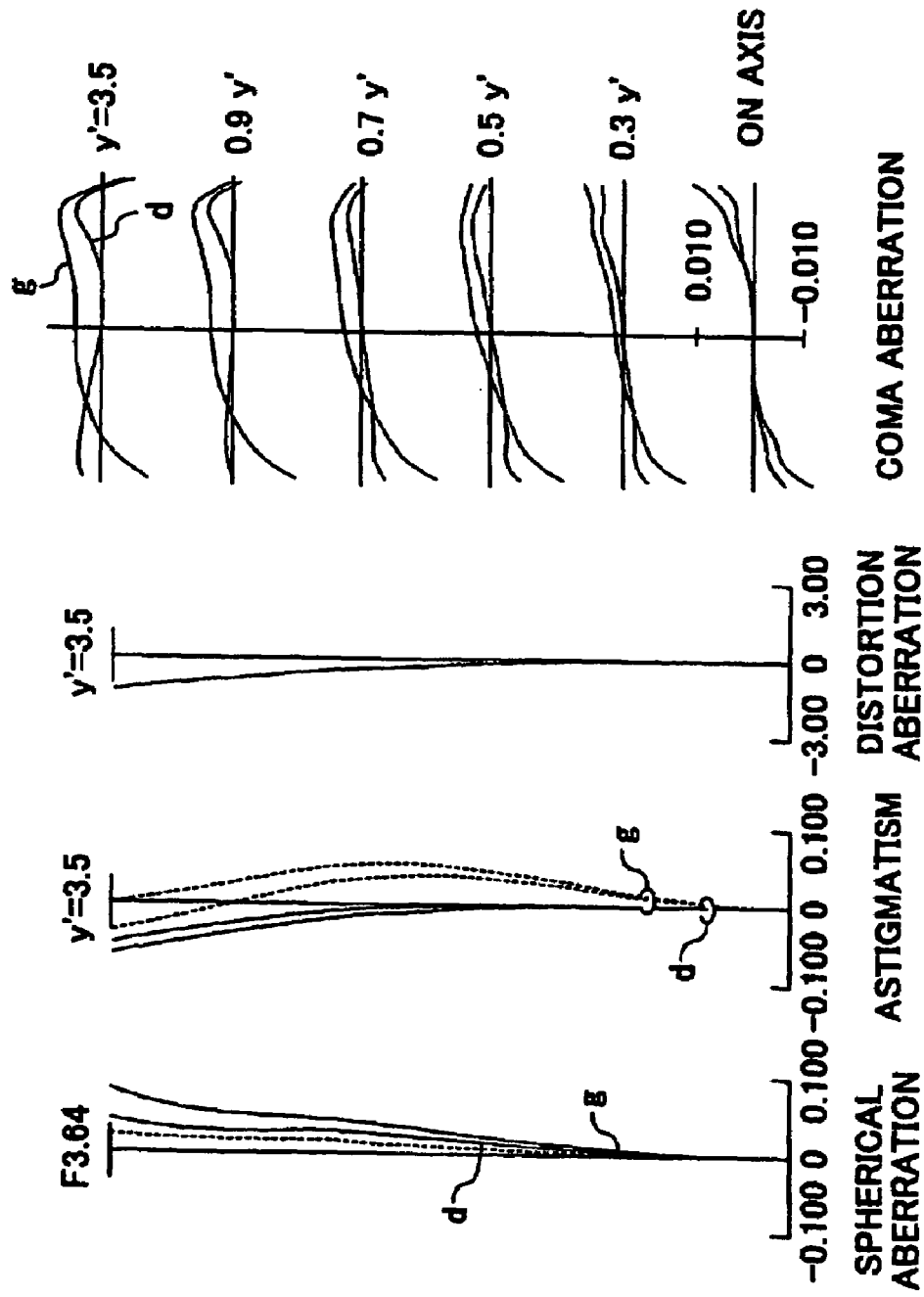
FIG. 54 shows an aberration curve in a long focus end of zoom lens of the embodiment 13.

Aberration curve graphs in the short focus end, the intermediate focal length and the long focus end according to the embodiment 12 are sequentially shown in FIGS. 49 to 51. Aberration curve graphs in the short focus end, the intermediate focal length and the long focus end according to the embodiment 13 are sequentially shown in FIGS. 52 to 54.

In the respective embodiments, aberrations in the short focus end, the intermediate focal length and the long focus end are favorably corrected, so that performance becomes good.

The zoom lens in the embodiments 6 to 10 and embodiment 13 out of the embodiments 6 to 13 comprises a first group G1 having a negative focal length, a second group G2 having a positive focal length and a third group G3 having a positive focal length in turn from object side and also comprises the iris S for being moved integrally with the second group G2 on object side of the second group G2, wherein in variation of magnification from the short focus end to the long focus end, the second group G2 moves monotonously from image side to object side and the first group G1 moves to correct variation in position of the image surface according to the variation of magnification, wherein as a variable magnification group consisting of the second group G2 for varying substantially magnification, three elements of a positive lens of which a surface having a large curvature faces the object side, a negative lens of which a surface having a large curvature faces the image side and a positive lens, are arranged in turn from the object side, and wherein a surface arranged on most object side and a surface arranged on most image side are aspherical surfaces (claim 10).

The second group G2 of the zoom lens in the embodiments 6 to 10 and embodiment 13 satisfies the conditional relationship:

$$1.0 < (L_{G2}/Y') < 2.5, \quad (1)$$

where $L_{G2}$ is a thickness in the optical axis direction and Y' is the maximum height of image (claim 11), and when radiuses of curvature on image side and the object side of the positive lens arranged on most image side are supposed as $R_{31}$ and $R_{32}$, respectively, these satisfy the conditional relationship:

$$-0.4 < (R_{31}+R_{32})/(R_{31}-R_{32}) < 0.0 (\text{claim } 12). \quad (2)$$

In the second group G2 of the zoom lens in the embodiment 6, the positive lens (fourth lens) on most object side and the negative lens (fifth lens) next to the positive lens are cemented (claim 13), and in the second group G2 of the zoom lens in the embodiments 7 to 10 and embodiment 13, three elements of lenses are separate lenses from each other (claim 14).

In the embodiments 11 and 12, the zoom lens includes, a first group G1 having a negative focal length, a second group G2 having a positive focal length and a third group G3 having a positive focal length in turn from object side, and includes an iris S for being moved integrally with the second group, in which at the time of variation of magnification from a short focus end to a long focus end, said second group G2 moves monotonously from image side to object side and said first group G1 moves to correct variation in position of an image surface accompanying the variation of magnification, wherein the variable magnification group constructed as the second group G2 for substantially varying magnification, a surface on most object side and a surface on most image side are aspherical surfaces, and when a thickness in a direction of optical axis is $L_{G2}$ and maximum height of image is Y', following relationship is satisfied:

$$1.0 < (L_{G2}/Y') < 2.5 \text{(claim 15)}. \quad (1)$$

The second group G2 consists of four elements of a positive lens (fourth lens) of which a surface having a large curvature faces object, a negative lens (fifth lens) of which a surface having a large curvature faces image, a positive lens (sixth lens) and a positive lens (seventh lens) in turn from object side (claim 7), and in embodiment 11, is integrally constructed by joining a positive lens (fourth lens) on most object side and a negative lens (fifth lens) next to the positive lens (claim 17). Therefore, each zoom lens according to embodiments 6 to 13 includes a first group G1 having a negative focal length, a second group G2 having a positive focal length and a third group G3 having a positive focal length in turn from object side and includes an iris S for being moved integrally with the second group G2, in which at the time of variation of magnification from a short focus end to a long focus end, said second group G2 moves monotonously from image side to object side and said first group G1 moves to correct variation in position of an image surface accompanying the variation of magnification, the variable magnification group according to any of claims 10 to 17 is employed as the second group G2 (claim 18).

Also, in the zoom lens according to the embodiments 6 to 13, the first group G1 consists of at least one element of negative lens of which a surface having large curvature faces image and at least one element of positive lens of which a surface having large curvature faces object in turn from object side, and a surface on most image side in said at least one element of negative lens is an aspherical surface (claim 19).

In the zoom lens according to the embodiments 6 to 12, the first group G1 consists of three elements of a negative meniscus lens (first lens) of which a convex surface faces object, a negative lens (second lens) of which a surface having large curvature faces image and a positive lens (third lens) of which a surface having large curvature faces object in turn from object side, and a surface (fourth surface) on image side in the negative lens of which the surface having large curvature faces image is an aspherical surface (claim 20). When a focal length of the negative meniscus lens (first lens) on most object side in the first group G1 is $f_{L1}$ and a focal length of the negative lens (second lens) arranged second from object side in the first group G1 is $f_{L2}$, following relationship is satisfied, $$0.7 < (f_{L1}/f_{L2}) < 2.0 \text{(claim 21)}. \quad (3)$$

The first group G1 of the zoom lens according to the embodiment 13 consists of two elements of a negative meniscus lens (first lens) of which a convex surface faces object and a positive lens (second lens) of which a surface having large curvature faces object in turn from object side, and a surface (second surface) on image side in the negative meniscus lens is an aspherical surface (claim 22).

In the respective zoom lenses according to the embodiments 6 to 18, the third group G3 consists of a positive lens of which a surface having large curvature faces object and has at least one aspherical surface (a surface on object side) (claim 28), and in the respective zoom lenses according to the embodiments 6 to 13, the element number of lenses constructing the whole system is eight or less (seven elements in the embodiments 6 to 10, eight elements in embodiments 11 and 12, six elements in the embodiment 13) (claim 24).

The zoom lenses according to the embodiments 6 to 13, as in the embodiments 1 to 5, can be applied to a camera unit as a portable information terminal unit shown in FIGS. 21 and 22.

(Embodiment 14 to 19)

Figure 55:
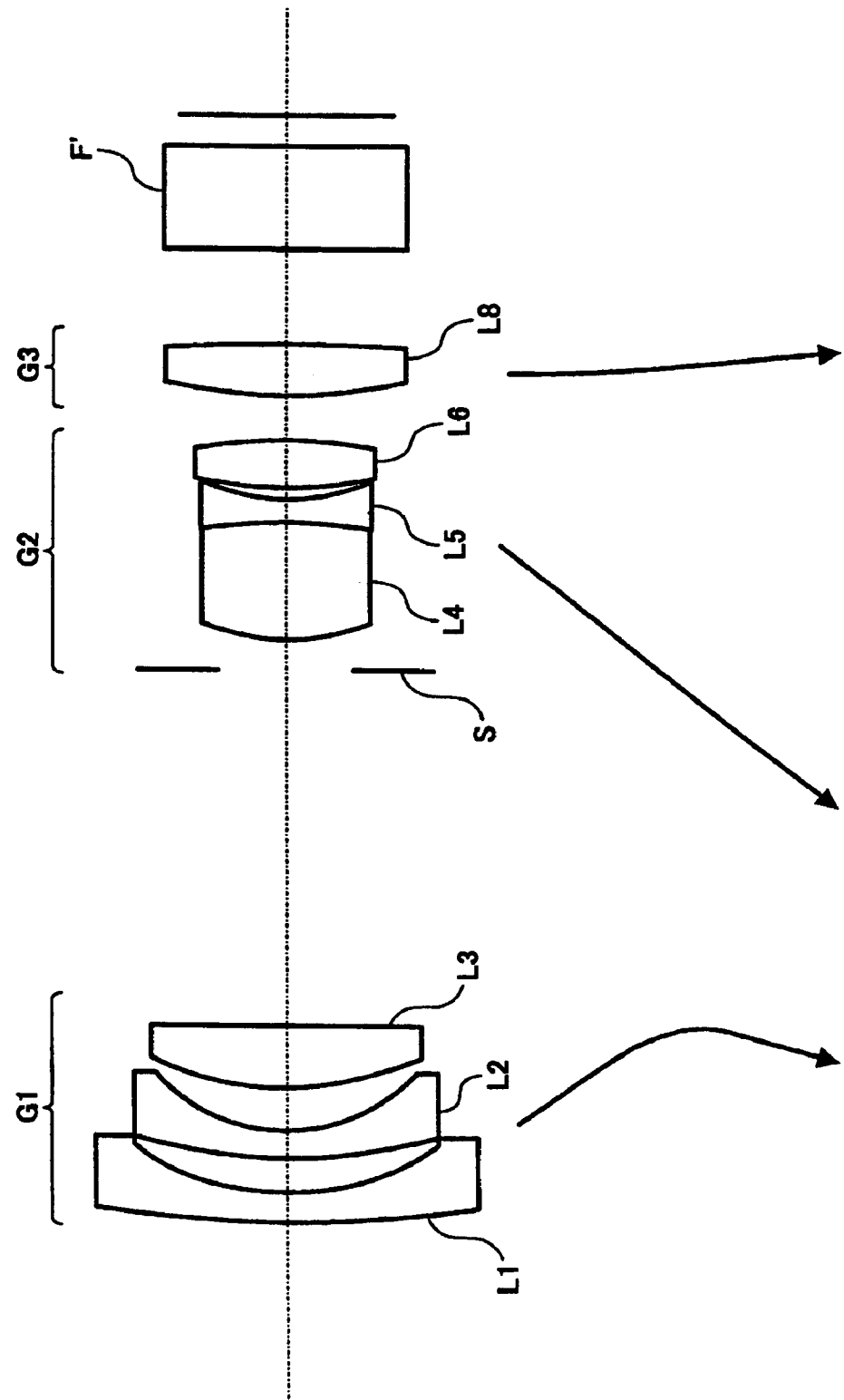
FIG. 55 is a cross sectional view showing a construction of zoom lens of a numerical embodiment 14 of present invention.
Figure 56:
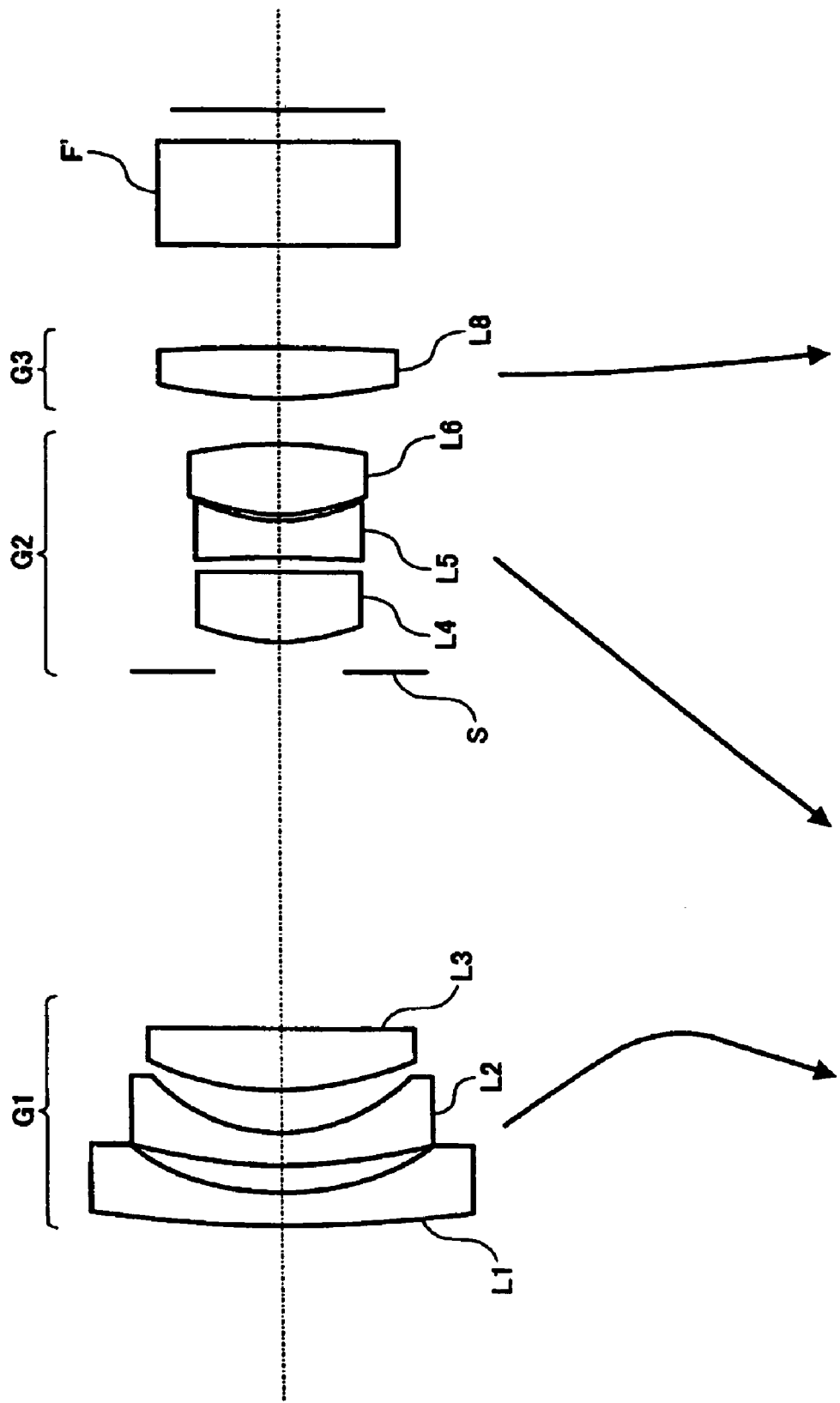
FIG. 56 is a cross-sectional view showing a construction of zoom lens of a numerical embodiment 15 of the present invention.
Figure 57:
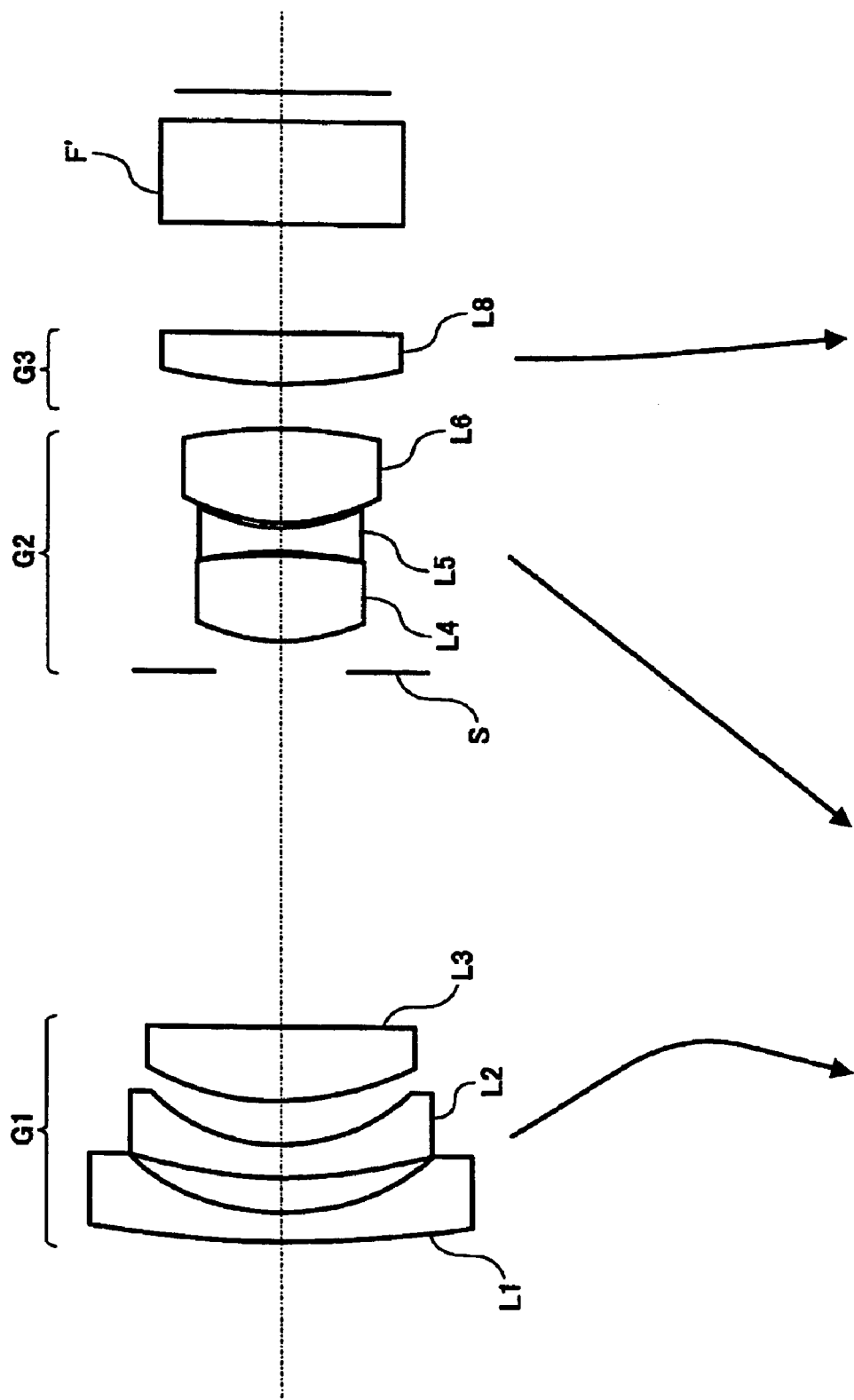
FIG. 57 is a cross-sectional view showing a construction of zoom lens of a numerical embodiment 16 of the present invention.
Figure 58:
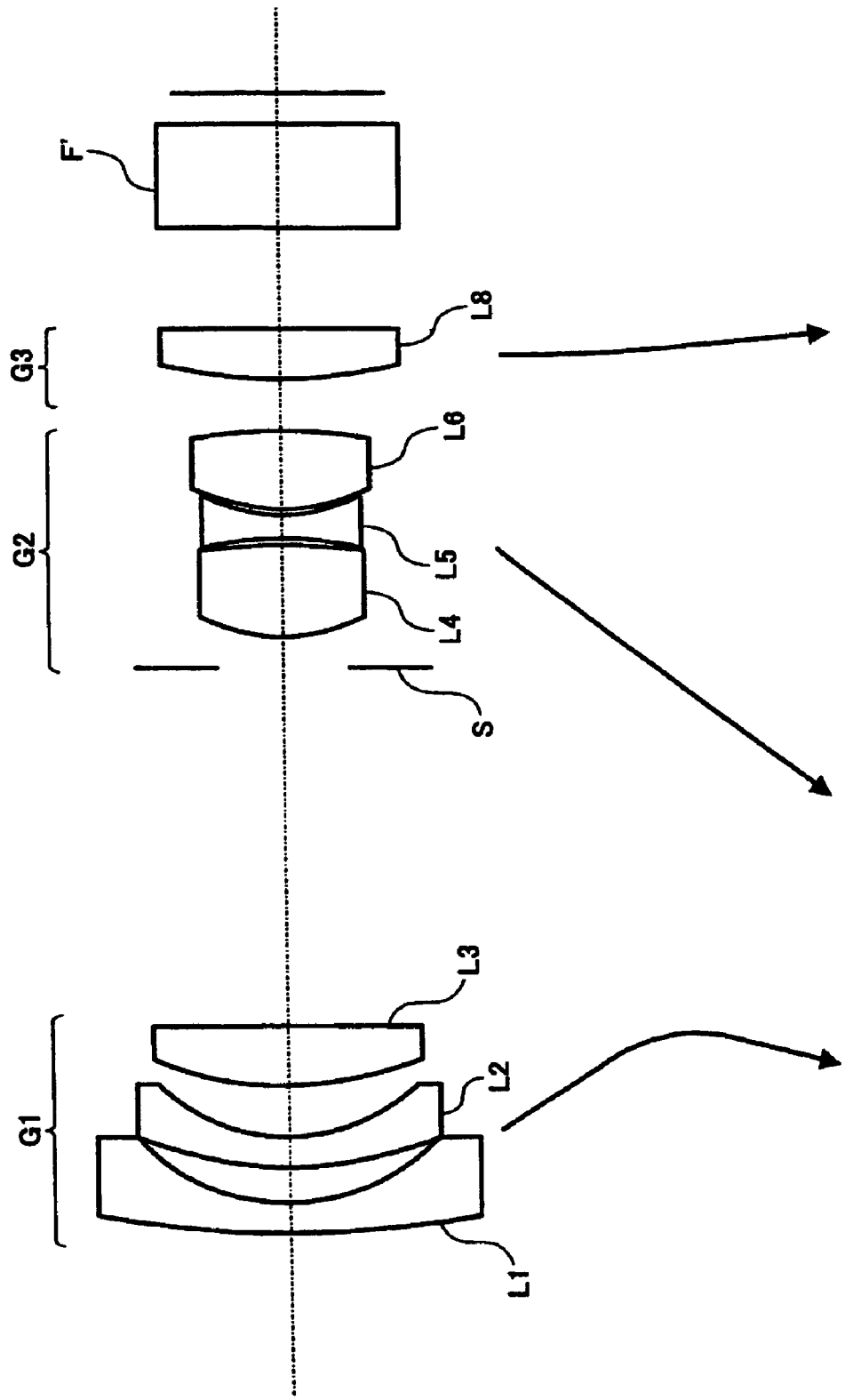
FIG. 58 is a cross-sectional view showing a construction of zoom lens of a numerical embodiment 17 of the present invention.
Figure 59:
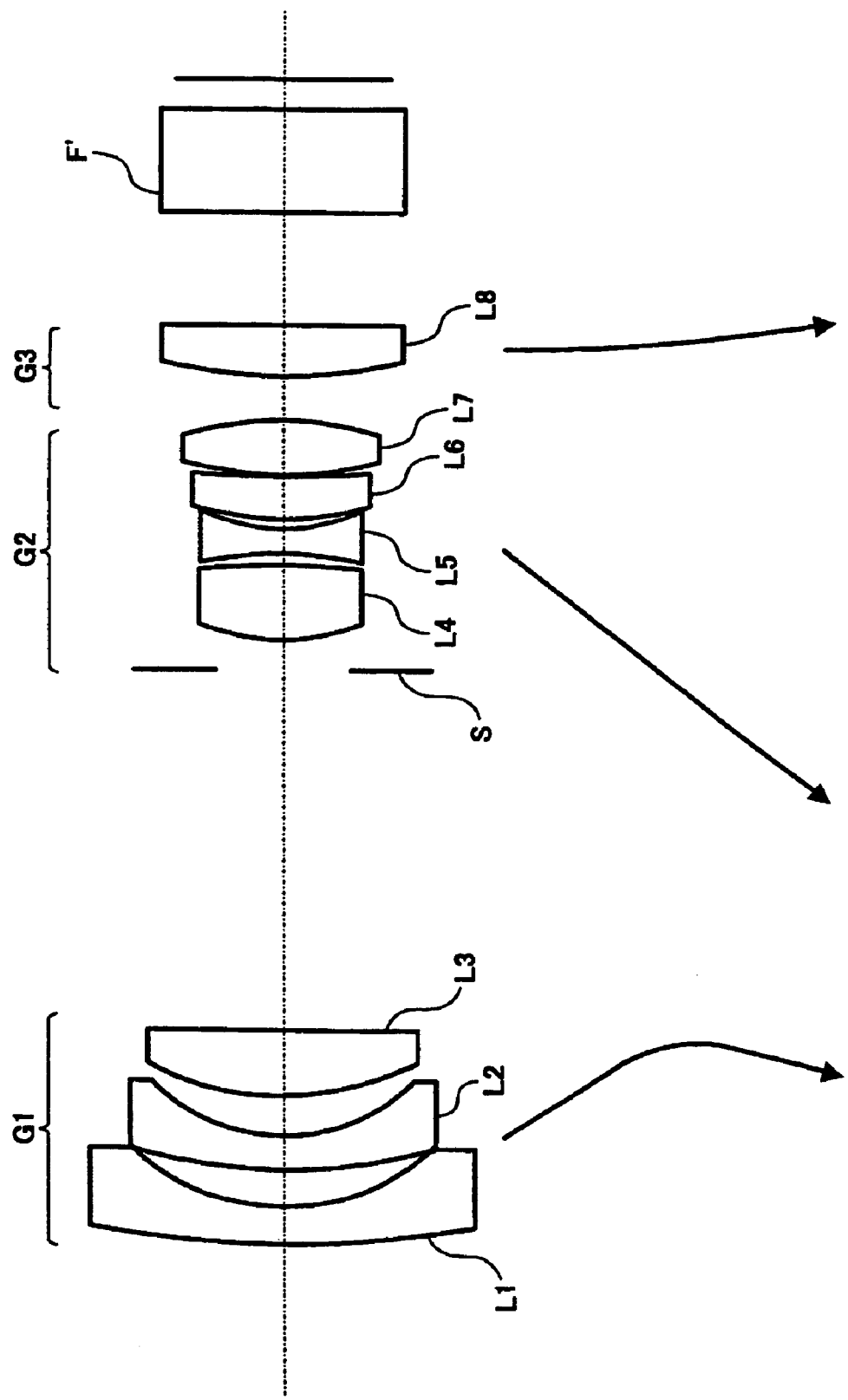
FIG. 59 is a cross-sectional view showing a construction of zoom lens of a numerical embodiment 18 of the present invention.
Figure 60:
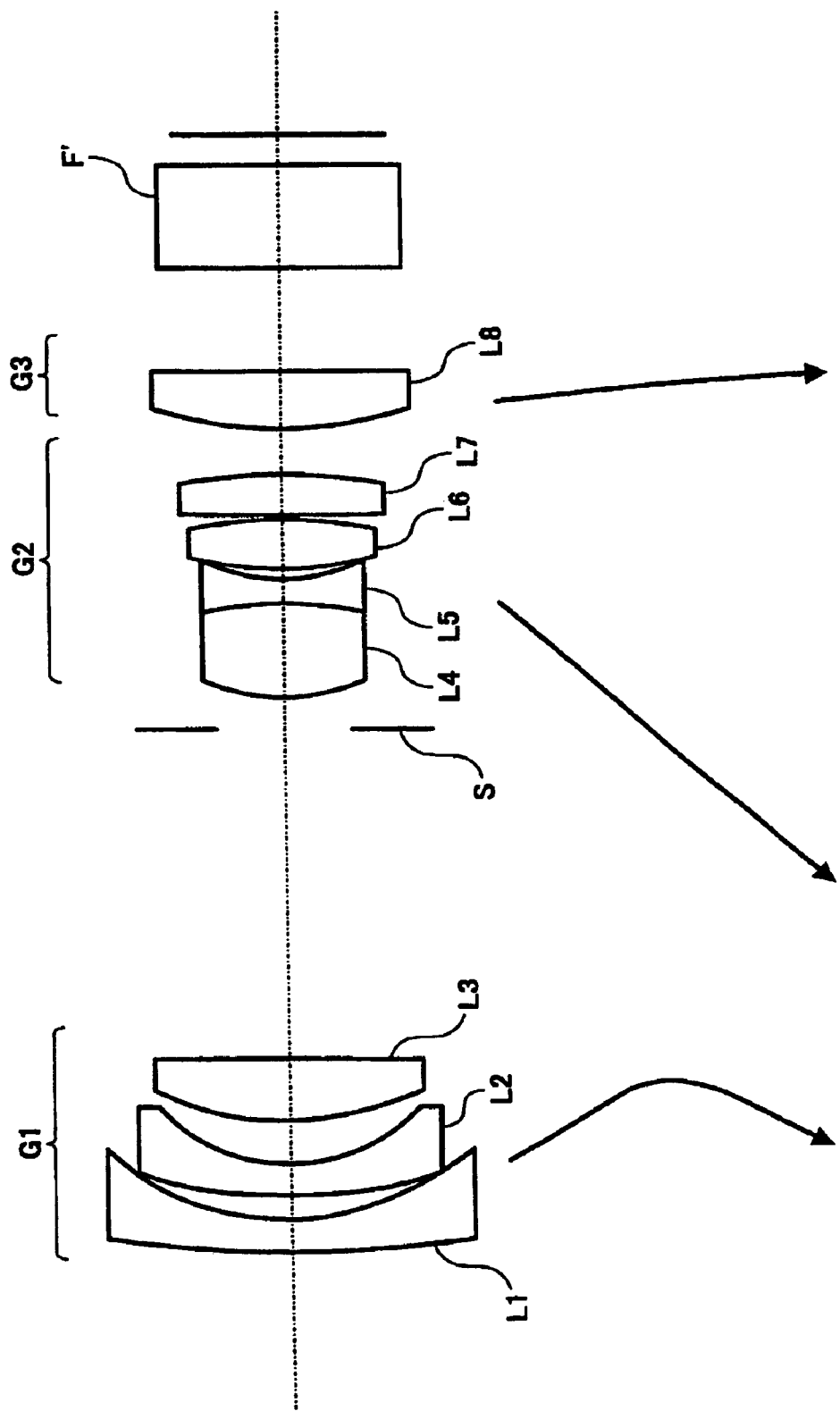
FIG. 60 is a cross-sectional view showing a construction of zoom lens of a numerical embodiment 19 of the present invention.

FIG. 55 is a cross-sectional view showing construction of zoom lens according to a numerical embodiment 14 of the present invention, FIG. 56 is a cross-sectional view showing construction of zoom lens according to a numerical embodiment 15 of the present invention, FIG. 57 is a cross-sectional view showing construction of zoom lens according to a numerical embodiment 16 of the present invention, FIG. 58 is a cross-sectional view showing construction of zoom lens according to a numerical embodiment 17 of the present invention, FIG. 59 is a cross-sectional view showing construction of zoom lens according to a numerical embodiment 18 of the present invention and FIG. 60 is a cross-sectional view showing construction of zoom lens according to a numerical embodiment 19 of the present invention.

The zoom lens according to the numerical embodiments 14 to 19 of the present invention has a first group G1 having a negative focal length, a second group G2 having a positive focal length and a third group G3 having a positive focal length in turn from object side, and has an iris S to be moved integrally with the second group G2 on object side of the second group G2, in which at the time of variation of magnification from a sort focus end to a long focus end, the second group G2 moves monotonously from an image side to the object side and the first group G1 moves to correct variation in position of an image surface accompanying the variation of magnification, and moreover, the zoom lens has following features.

In the zoom lens according to the numerical embodiments 14 to 19, the first group G1 consists of three elements of a negative meniscus lens L1 of which a convex surface faces the object side, a negative meniscus lens L2 of which a convex surface faces the object side and a positive lens L3 of which a surface having a large curvature faces the object side, a surface on the image in the negative meniscus lens L2 of the first group G1 is an aspherical surface, and when $R_6$ is a radius of curvature of a surface on the image in the positive lens L3 of the first group G1 and Y' is a maximum height of image, these satisfy following conditional relationship.

$$-0.05 < (Y'/R_6) < 0.05$$

In this conditional relationship, specifically in a case of $(Y'/R_6)=0$ as in the numerical embodiments 16, 18 and 19, that is, when a surface on the image in the positive lens L3 of the first group G1, there is an advantage that standard measure at a plane side is not required and thus, it is not required to give curvature to a grinder for recess process. Also, by making plane, since reference light of a general interferometer becomes a plane wave, measurement of surface accuracy is facilitated.

The zoom lens according to the numerical embodiments 14 to 19 is characterized in that when $f_{L3}$ is a focal length of the positive lens L3 of the first group G1 and $f_{G1}$ is a focal length of the first group G1, following relationship is satisfied.

$$-1.5 < (f_{L3}/f_{G1}) < -1.0$$

The zoom lens according to the numerical embodiments 14 to 19 is characterized in that a surface on the image in the second negative meniscus lens L2 of the first group G1 is an aspherical surface and when $f_{L1}$ is a focal length of the negative meniscus lens L1 on most object side and $f_{L2}$ is a focal length of the second negative meniscus lens L2 of the first group G1, the following relationship is satisfied.

$$0.7 < (f_{L1}/f_{L2}) < 2.0$$

The zoom lens according to the numerical embodiments 1 to 19 is characterized in that a relative eccentricity between the negative lenses L1, L2 and the positive lens L3 in the first group G1 is controllable. Also, it is characterized in that the positive lens L3 is fixed and the negative lenses L1, L2 are moved in a direction perpendicular to the optical axis, so that the control of relative eccentricity between the negative lenses L1, L2 and the positive lens L3 in the first group G1 are performed.

Now, specific numerical embodiments of the zoom lens according to the present invention will be described. The aberration in the respective embodiments is corrected sufficiently and can correspond to a light-receiving device having 2,000,000 to 3,000,000 pixels. By constructing the zoom lens like the present invention, it is apparent from embodiments that sufficient miniaturization can be accomplished and at the same time, vary excellent performance of creating image can be insured.

[Numerical embodiment 14]
f = 4.33–10.28, F = 2.73–4.10, ω = 40.29–18.97

| Surface Nos. | R | D | Nd | vd | Remarks |
|---|---|---|---|---|---|
| 01 | 40.685 | 1.00 | 1.77250 | 49.62 | first lens: G1 |
| 02 | 7.403 | 0.95 | | | |
| 03 | 14.152 | 1.00 | 1.74330 | 49.33 | second lens: G1 |
| 04* | 4.479 | 1.41 | | | |
| 05 | 8.729 | 2.01 | 1.72825 | 28.32 | third lens: G1 |
| 06 | ∞ | variable (A) | | | |
| 07 | iris | 1.00 | | | |
| 08* | 5.652 | 3.87 | 1.74400 | 44.90 | fourth lens: G2 |
| 09 | −14.306 | 0.80 | 1.80518 | 25.46 | fifth lens: G2 |
| 10 | 5.615 | 0.35 | | | |
| 11 | 11.620 | 1.55 | 1.63854 | 55.45 | sixth lens: G2 |
| 12* | −13.784 | variable (B) | | | |
| 13* | 13.554 | 1.65 | 1.48749 | 70.44 | seventh lens: G3 |
| 14 | −98.025 | variable (C) | | | |
| 15 | ∞ | 3.25 | 1.51680 | 64.20 | various filters |
| 16 | ∞ | | | | |

Aspherical surface coefficient of the fourth surface:

$K = 0.0, A_4 = -1.37618 \times 10^{-3}, A_6 = -5.03401 \times 10^{-5},$
$A_8 = 1.57384 \times 10^{-6}, A_{10} = -2.30976 \times 10^{-7},$
$A_{12} = -3.26464 \times 10^{-9}, A_{14} = 4.00882 \times 10^{-10},$
$A_{16} = -1.97709 \times 10^{-11}, A_{18} = -1.97909 \times 10^{-12}$ Aspherical surface coefficient of the eighth surface:

$K = 0.0, A_4 = -3.10301 \times 10^{-4}, A_6 = -9.60865 \times 10^{-6},$
$A_8 = 1.38603 \times 10^{-6}, A_{10} = -1.17724 \times 10^{-7}$ Aspherical surface coefficient of the twelfth surface:

$K = 0.0, A_4 = 4.87200 \times 10^{-4}, A_6 = 4.48027 \times 10^{-5},$
$A_8 = -1.67451 \times 10^{-6}, A_{10} = 4.32123 \times 10^{-7}$ Aspherical surface coefficient of the thirteenth surface:

$K = 0.0, A_4 = -2.44272 \times 10^{-4}, A_6 = 2.13490 \times 10^{-5},$
$A_8 = -1.60140 \times 10^{-6}, A_{10} = 5.24693 \times 10^{-8}$ Variable gap

| | Short focus end f = 4.33 | Intermediate focal length f = 6.64 | Long focus end f = 10.28 |
|---|---|---|---|
| A | 11.640 | 5.480 | 1.400 |
| B | 1.440 | 4.890 | 10.180 |
| C | 3.096 | 2.892 | 2.559 |

Numerical values in the conditional relationships
$(Y'/R_5) = 0.0$
$(f_{L3}/f_{G1}) = -1.12$
$(f_{L1}/f_{L2}) = 1.29$

[Numerical embodiment 15]
f = 4.33–10.28, F = 2.67–4.03, ω = 40.31–18.96

| Surface Nos. | R | D | Nd | vd | Remarks |
|---|---|---|---|---|---|
| 01 | 52.287 | 1.00 | 1.77250 | 49.62 | first lens: G1 |
| 02 | 7.548 | 0.90 | | | |
| 03 | 14.553 | 1.00 | 1.74330 | 49.33 | second lens: G1 |
| 04* | 4.429 | 1.45 | | | |
| 05 | 9.086 | 2.11 | 1.72825 | 28.32 | third lens: G1 |
| 06 | −123.655 | variable (A) | | | |
| 07 | iris | 1.00 | | | |
| 08* | 5.316 | 2.25 | 1.74400 | 44.90 | fourth lens: G2 |
| 09 | −545.787 | 0.47 | | | |
| 10 | −38.991 | 1.18 | 1.80518 | 25.46 | fifth lens: G2 |
| 11 | 4.987 | 0.19 | | | |
| 12 | 6.737 | 2.27 | 1.51680 | 64.20 | sixth lens: G2 |
| 13* | −11.295 | variable (B) | | | |
| 14* | 13.622 | 1.73 | 1.48749 | 70.44 | seventh lens: G3 |
| 15 | −75.425 | variable (C) | | | |
| 16 | ∞ | 3.25 | 1.51680 | 64.20 | various filters |
| 17 | ∞ | | | | |

Aspherical surface coefficient of the fourth surface:

$K = 0.0, A_4 = -1.52225 \times 10^{-3}, A_6 = -4.90276 \times 10^{-5},$
$A_8 = -3.89047 \times 10^{-7}, A_{10} = 1.40729 \times 10^{-7},$
$A_{12} = -3.52907 \times 10^{-8}, A_{14} = 1.18808 \times 10^{-9},$
$A_{16} = 5.42840 \times 10^{-11}, A_{18} = -3.71221 \times 10^{-12}$ Aspherical surface coefficient of the eighth surface:

$K = 0.0, A_4 = -2.57172 \times 10^{-4}, A_6 = -1.36917 \times 10^{-5},$
$A_8 = 2.21542 \times 10^{-6}, A_{10} = -1.81900 \times 10^{-7}$ Aspherical surface coefficient of the thirteenth surface:

$K = 0.0, A_4 = 8.29889 \times 10^{-4}, A_6 = 4.54452 \times 10^{-5},$
$A_8 = -2.92852 \times 10^{-7}, A_{10} = 3.36336 \times 10^{-7}$ Aspherical surface coefficient of the fourteenth surface:

$K = 0.0, A_4 = -2.39053 \times 10^{-4}, A_6 = 2.27231 \times 10^{-5},$
$A_8 = -1.86944 \times 10^{-6}, A_{10} = 6.13185 \times 10^{-8}$ Variable gap

| | Short focus end f = 4.33 | Intermediate focal length f = 6.64 | Long focus end f = 10.28 |
|---|---|---|---|
| A | 11.600 | 5.420 | 1.380 |
| B | 1.440 | 5.040 | 10.700 |
| C | 3.191 | 2.996 | 2.556 |

Numerical values in the conditional relationships
$(Y'/R_6) = 0.0283$
$(f_{L3}/f_{G1}) = -1.09$
$(f_{L1}/f_{L2}) = 1.29$

[Numerical embodiment 16]
f = 4.33–10.30, F = 2.71–4.04, ω = 40.29–18.95

| Surface Nos. | R | D | Nd | vd | Remarks |
|---|---|---|---|---|---|
| 01 | 29.129 | 1.00 | 1.77250 | 49.62 | first lens: G1 |
| 02 | 6.828 | 1.16 | | | |
| 03 | 16.225 | 1.00 | 1.74330 | 49.33 | second lens: G1 |
| 04* | 4.651 | 1.47 | | | |
| 05 | 9.174 | 2.39 | 1.74077 | 27.76 | third lens: G1 |
| 06 | ∞ | variable (A) | | | |
| 07 | iris | 1.00 | | | |
| 08* | 5.233 | 2.76 | 1.72342 | 37.99 | fourth lens: G2 |
| 09 | −19.253 | 0.16 | | | |
| 10 | −13.695 | 0.80 | 1.80518 | 25.46 | fifth lens: G2 |
| 11 | 4.961 | 0.18 | | | |
| 12 | 6.324 | 2.98 | 1.51680 | 64.20 | sixth lens: G2 |
| 13* | −10.432 | variable (B) | | | |
| 14* | 13.397 | 1.60 | 1.48749 | 70.44 | seventh lens: G3 |

-continued

| 15 | 153.379 variable (C) | | | |
| 16 | ∞ | 3.25 | 1.51680 | 64.20 | various filters |
| 17 | ∞ | | | |

Aspherical surface coefficient of the fourth surface:

$K = 0.0$, $A_4 = -1.27929 \times 10^{-3}$, $A_6 = -4.75375 \times 10^{-5}$,
$A_8 = 1.78640 \times 10^{-6}$, $A_{10} = -2.09707 \times 10^{-7}$,
$A_{12} = -3.99557 \times 10^{-9}$, $A_6 = 8.29203 \times 10^{-10}$,
$A_8 = -2.46067 \times 10^{-11}$, $A_{10} = -3.28212 \times 10^{-18}$ Aspherical surface coefficient of the eighth surface:

$K = 0.0$, $A_4 = -2.23927 \times 10^{-4}$, $A_6 = -9.69866 \times 10^{-6}$,
$A_8 = 1.89347 \times 10^{-6}$, $A_{10} = -1.43145 \times 10^{-7}$ Aspherical surface coefficient of the thirteenth surface:

$K = 0.0$, $A_4 = 8.10959 \times 10^{-4}$, $A_6 = 4.46654 \times 10^{-5}$,
$A_8 = -1.33415 \times 10^{-6}$, $A_{10} = 3.10407 \times 10^{-7}$ Aspherical surface coefficient of the fourteenth surface:

$K = 0.0$, $A_4 = -2.22347 \times 10^{-4}$, $A_6 = 2.09486 \times 10^{-5}$,
$A_8 = -1.79477 \times 10^{-6}$, $A_{10} = 6.32978 \times 10^{-8}$ Variable gap

| | Short focus end f = 4.33 | Intermediate focal length f = 6.64 | Long focus end f = 10.30 |
|---|---|---|---|
| A | 11.700 | 5.410 | 1.300 |
| B | 1.450 | 5.040 | 10.740 |
| C | 3.520 | 3.254 | 2.651 |

Numerical values in the conditional relationships
$(Y'/R_6) = 0.0$
$(f_{L3}/f_{G1}) = -1.21$
$(f_{L1}/f_{L2}) = 1.29$

[Numerical embodiment 17]
$f = 4.33–10.28$, $F = 2.70–4.03$, $\omega = 40.29–18.97$

| Surface Nos. | R | D | Nd | νd | Remarks |
|---|---|---|---|---|---|
| 01 | 26.338 | 1.00 | 1.77250 | 49.62 | first lens: G1 |
| 02 | 5.957 | 1.15 | | | |
| 03 | 11.354 | 1.00 | 1.74330 | 49.33 | second lens: G1 |
| 04* | 4.800 | 1.68 | | | |
| 05 | 9.326 | 1.89 | 1.74077 | 27.76 | third lens: G1 |
| 06 | 76.543 | variable (A) | | | |
| 07 | iris | 1.00 | | | |
| 08* | 5.240 | 2.97 | 1.72342 | 37.99 | fourth lens: G2 |
| 09 | −17.637 | 0.20 | | | |
| 10 | −11.727 | 0.81 | 1.80518 | 25.46 | fifth lens: G2 |
| 11 | 5.109 | 0.17 | | | |
| 12 | 6.368 | 2.50 | 1.51680 | 64.20 | sixth lens: G2 |
| 13* | −10.112 | variable (B) | | | |
| 14* | 13.474 | 1.60 | 1.48749 | 70.44 | seventh lens: G3 |
| 15 | 164.596 | variable (C) | | | |
| 16 | ∞ | 3.25 | 1.51680 | 64.20 | various filters |
| 17 | ∞ | | | | |

Aspherical surface coefficient of the fourth surface:

$K = 0.0$, $A_4 = -1.18340 \times 10^{-3}$, $A_6 = -5.15513 \times 10^{-5}$,
$A- = 2.55275 \times 10^{-6}$, $A_{10} = -2.44284 \times 10^{-7}$,
$A_{12} = -3.45686 \times 10^{-9}$, $A_{14} = 1.00396 \times 10^{-9}$,
$A_{16} = -4.09624 \times 10^{-11}$, $A_{18} = 2.60442 \times 10^{-13}$ Aspherical surface coefficient of the eighth surface:

$K = 0.0$, $A_4 = -2.06641 \times 10^{-4}$, $A_6 = -6.64406 \times 10^{-6}$,
$A_8 = 1.79604 \times 10^{-6}$, $A_{10} = -1.27500 \times 10^{-7}$ Aspherical surface coefficient of the thirteenth surface:

$K = 0.0$, $A_4 = 1.00672 \times 10^{-3}$, $A_6 = 5.577600 \times 10^{-5}$,
$A_8 = -1.35110 \times 10^{-6}$, $A_{10} = 4.73799 \times 10^{-7}$ Aspherical surface coefficient of the fourteenth surface:

$K = 0.0$, $A4 = -2.40787 \times 10^{-4}$, $A_6 = 3.74236 \times 10^{-5}$,
$A_8 = -3.77197 \times 10^{-6}$, $A_{10} = 1.38975 \times 10^{-7}$ Variable gap

| | Short focus end f = 4.33 | Intermediate focal length f = 6.64 | Long focus end f = 10.28 |
|---|---|---|---|
| A | 11.840 | 5.630 | 1.530 |
| B | 1.660 | 5.160 | 10.570 |
| C | 3.306 | 3.072 | 2.665 |

Numerical values in the conditional relationships
$(Y'/R_6) = 0.0457$
$(f_{L3}/f_{G1}) = -1.40$
$(f_{L1}/f_{L2}) = 0.851$

[Numerical embodiment 18]
$f = 4.33–10.18$, $F = 2.73–4.00$, $\omega = 40.30–19.19$

| Surface Nos. | R | D | Nd | νd | Remarks |
|---|---|---|---|---|---|
| 01 | 29.593 | 1.25 | 1.77250 | 49.62 | first lens: G1 |
| 02 | 7.058 | 1.20 | | | |
| 03 | 17.247 | 1.00 | 1.74330 | 49.33 | second lens: G1 |
| 04* | 4.563 | 1.30 | | | |
| 05 | 8.485 | 2.16 | 1.72825 | 28.32 | third lens: G1 |
| 06 | ∞ | variable (A) | | | |
| 07 | iris | 1.00 | | | |
| 08* | 5.283 | 2.61 | 1.72342 | 37.99 | fourth lens: G2 |
| 09 | −20.081 | 0.29 | | | |
| 10 | −12.075 | 0.81 | 1.80518 | 25.46 | fifth lens: G2 |
| 11 | 5.253 | 0.31 | | | |
| 12 | 8.812 | 1.35 | 1.58913 | 61.25 | sixth lens: G2 |
| 13 | 20.251 | 0.10 | | | |
| 14 | 12.502 | 1.73 | 1.48749 | 70.44 | seventh lens: G3 |
| 15* | −8.992 | variable (B) | | | |
| 16* | 13.337 | 1.65 | 1.48749 | 70.44 | eighth lens: G3 |
| 17 | 463.779 | variable (C) | | | |
| 18 | ∞ | 3.25 | 1.51680 | 64.20 | various filters |
| 19 | ∞ | | | | |

Aspherical surface coefficient of the fourth surface:

$K = 0.0$, $A_4 = -1.29720 \times 10^{-3}$, $A_6 = -5.09824 \times 10^{-5}$,
$A_8 = 1.81023 \times 10^{-6}$, $A_{10} = -2.10769 \times 10^{-7}$,
$A_{12} = -4.76553 \times 10^{-9}$, $A_{14} = 8.28677 \times 10^{-10}$,
$A_{16} = -2.46190 \times 10^{-11}$, $A_{18} = -4.19978 \times 10^{-13}$ Aspherical surface coefficient of the eighth surface:

$K = 0.0$, $A_4 = -1.98718 \times 10^{-4}$, $A_6 = -9.47779 \times 10^{-6}$,
$A_8 = 2.05528 \times 10^{-6}$, $A_{10} = -1.77908 \times 10^{-7}$ Aspherical surface coefficient of the fifteenth surface:

$K = 0.0$, $A_4 = 5.86592 \times 10^{-4}$, $A_6 = 3.85335 \times 10^{-5}$,
$A_8 = -2.22078 \times 10^{-6}$, $A_{10} = 1.73297 \times 10^{-7}$ Aspherical surface coefficient of the sixteenth surface:

$K = 0.0$, $A_4 = -1.97840 \times 10^{-4}$, $A_6 = 1.55183 \times 10^{-5}$,
$A_8 = -1.27195 \times 10^{-6}$, $A_{10} = 4.39912 \times 10^{-8}$ Variable gap

| | Short focus end f = 4.33 | Intermediate focal length f = 6.63 | Long focus end f = 10.18 |
|---|---|---|---|
| A | 11.860 | 5.530 | 1.400 |
| B | 1.450 | 5.230 | 10.810 |
| C | 3.570 | 3.241 | 2.731 |

Numerical values in the conditional relationships
$(Y'/R_6) = 0.0$
$(f_{L3}/f_{G1}) = -1.12$
$(f_{L1}/f_{L2}) = 1.42$

[Numerical embodiment 19]
$f = 4.33–10.19$, $F = 2.67–4.01$, $\omega = 40.70–19.11$

| Surface Nos. | R | D | Nd | νd | Remarks |
|---|---|---|---|---|---|
| 01 | 53.342 | 1.03 | 1.77250 | 49.62 | first lens: G1 |
| 02 | 8.037 | 0.73 | | | |
| 03 | 13.775 | 1.00 | 1.74330 | 49.33 | second lens: G1 |
| 04* | 4.214 | 1.45 | | | |
| 05 | 8.951 | 1.99 | 1.74077 | 27.76 | third lens: G1 |

-continued

| | | | | | |
|---|---|---|---|---|---|
| 06 | ∞ | variable (A) | | | |
| 07 | | iris 1.00 | | | |
| 08* | 5.685 | 3.04 | 1.80610 | 33.27 | fourth lens: G2 |
| 09 | −12.982 | 0.80 | 1.84666 | 23.78 | fifth lens: G2 |
| 10 | 5.150 | 0.35 | | | |
| 11 | 12.099 | 1.66 | 1.49700 | 81.61 | sixth lens: G2 |
| 12 | −12.099 | 0.12 | | | |
| 13 | −71.229 | 1.30 | 1.49700 | 81.61 | seventh lens: G3 |
| 14 | −14.821 | variable (B) | | | |
| 15* | 10.924 | 1.81 | 1.49700 | 81.61 | eighth lens: G3 |
| 16 | 273.119 | variable (C) | | | |
| 17 | ∞ | 3.25 | 1.51680 | 64.20 | various filters |
| 18 | ∞ | | | | |

Aspherical surface coefficient of the fourth surface:

$K = 0.0$, $A_4 = -1.78480 \times 10^{-3}$, $A_5 = -2.57794 \times 10^{-5}$,
$A_8 = -1.85124 \times 10^{-6}$, $A_{10} = 2.70432 \times 10^{-6}$,
$A_{12} = -2.20540 \times 10^{-7}$, $A_{14} = 4.63624 \times 10^{-9}$,
$A_{16} = 3.18005 \times 10^{-10}$, $A_{18} = -1.58854 \times 10^{-11}$ Aspherical surface coefficient of the eighth surface:

$K = 0.0$, $A_4 = -2.95071 \times 10^{-4}$, $A_6 = -3.13869 \times 10^{-5}$,
$A_8 = 5.35642 \times 10^{-6}$, $A_{10} = -4.09858 \times 10^{-7}$ Aspherical surface coefficient of the fifteenth surface:

$K = 0.0$, $A_4 = -3.31876 \times 10^{-4}$, $A_6 = 2.64955 \times 10^{-6}$,
$A_8 = -1.99490 \times 10^{-6}$, $A_{10} = 5.74717 \times 10^{-8}$ Variable gap

| | Short focus end f = 4.33 | Intermediate focal length f = 6.64 | Long focus end f = 10.19 |
|---|---|---|---|
| A | 11.820 | 5.240 | 1.4000 |
| B | 1.440 | 5.660 | 11.330 |
| C | 3.250 | 2.889 | 2.748 |

Figure 61:
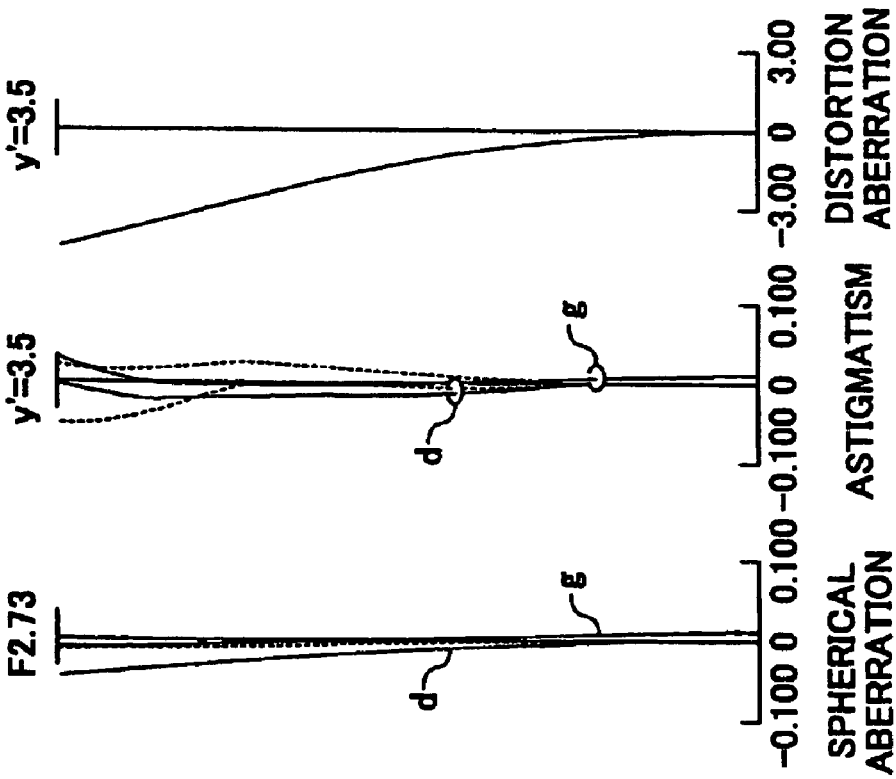
FIG. 61 shows an aberration curve in a short focus end of zoom lens of the numerical embodiment 14 of the present invention.
Figure 62:
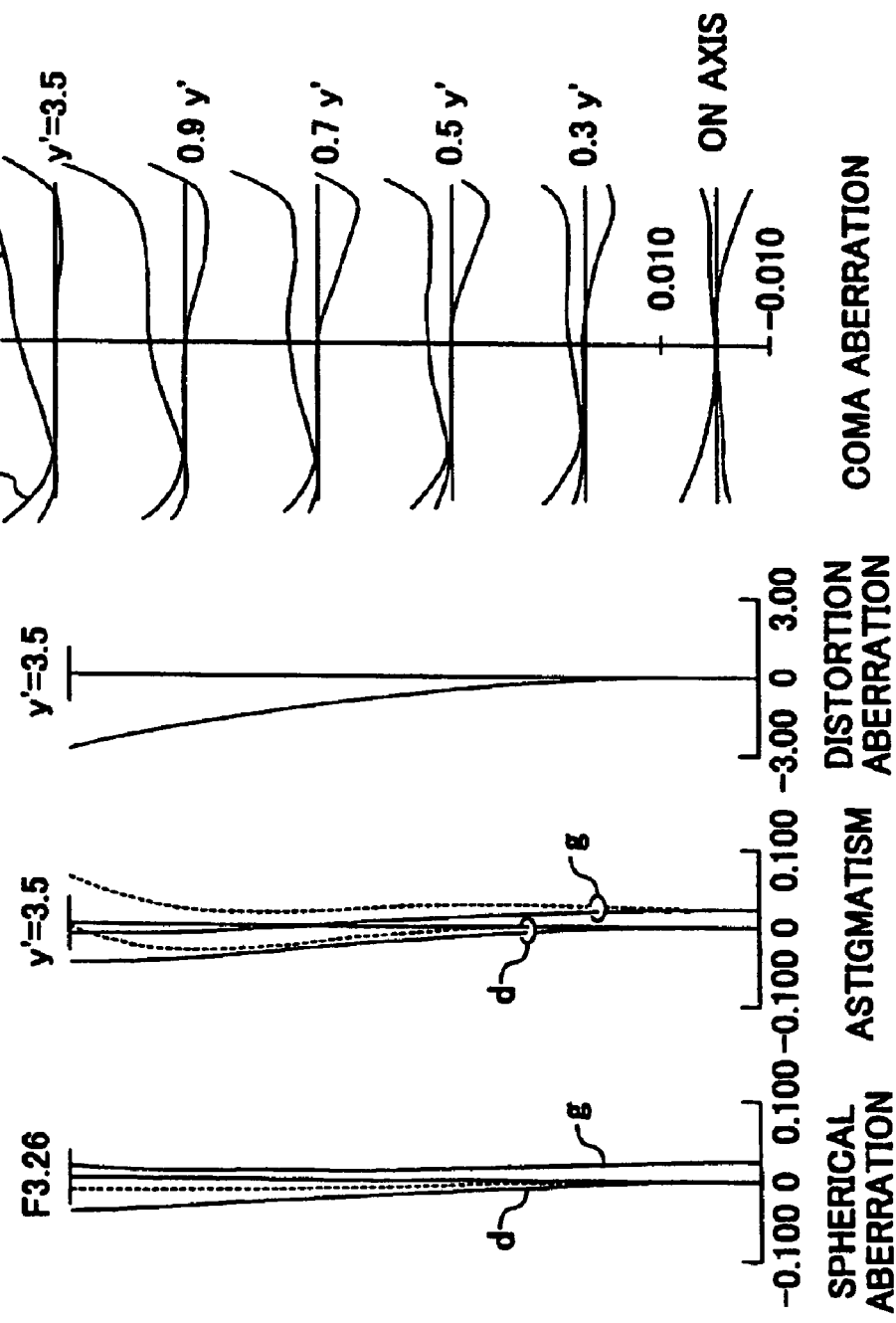
FIG. 62 shows an aberration curve in an intermediate focal length of zoom lens of the numerical embodiment 14 of the present invention.
Figure 63:
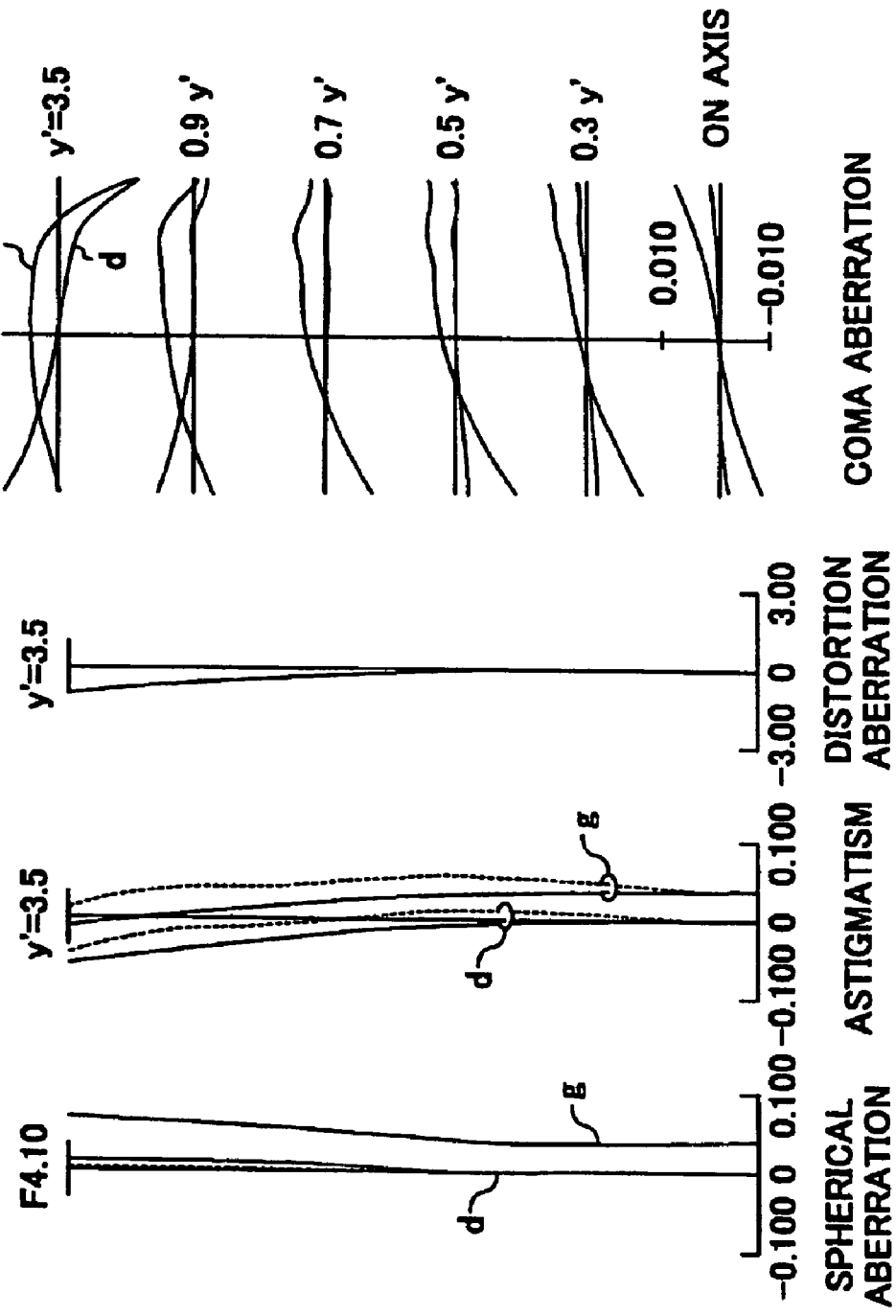
FIG. 63 shows an aberration curve in a long focus end of zoom lens of the embodiment 14 of the present invention.
Figure 64:
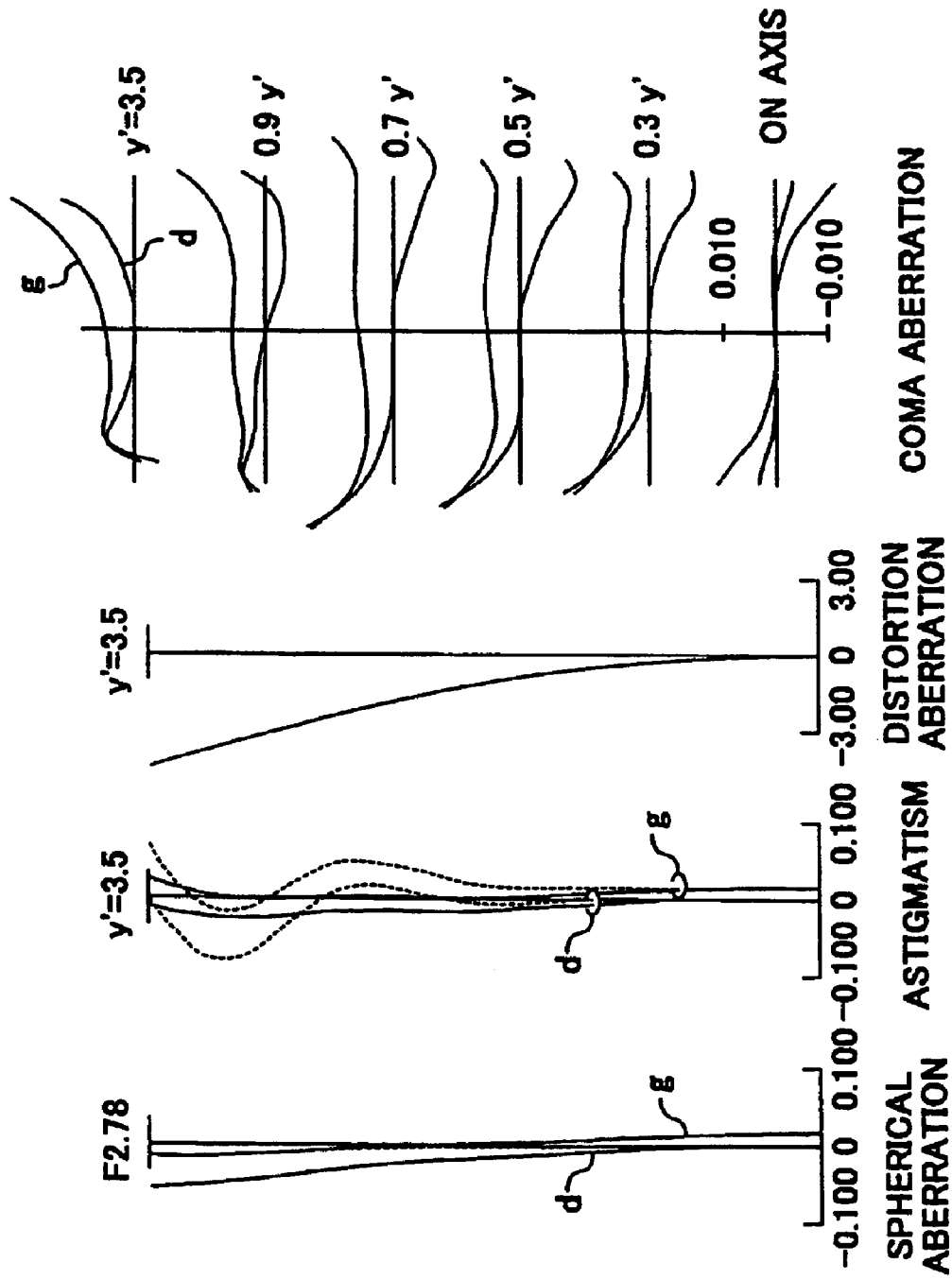
FIG. 64 shows an aberration curve in a short focus end of zoom lens of the numerical embodiment 15 of the present invention.
Figure 66:
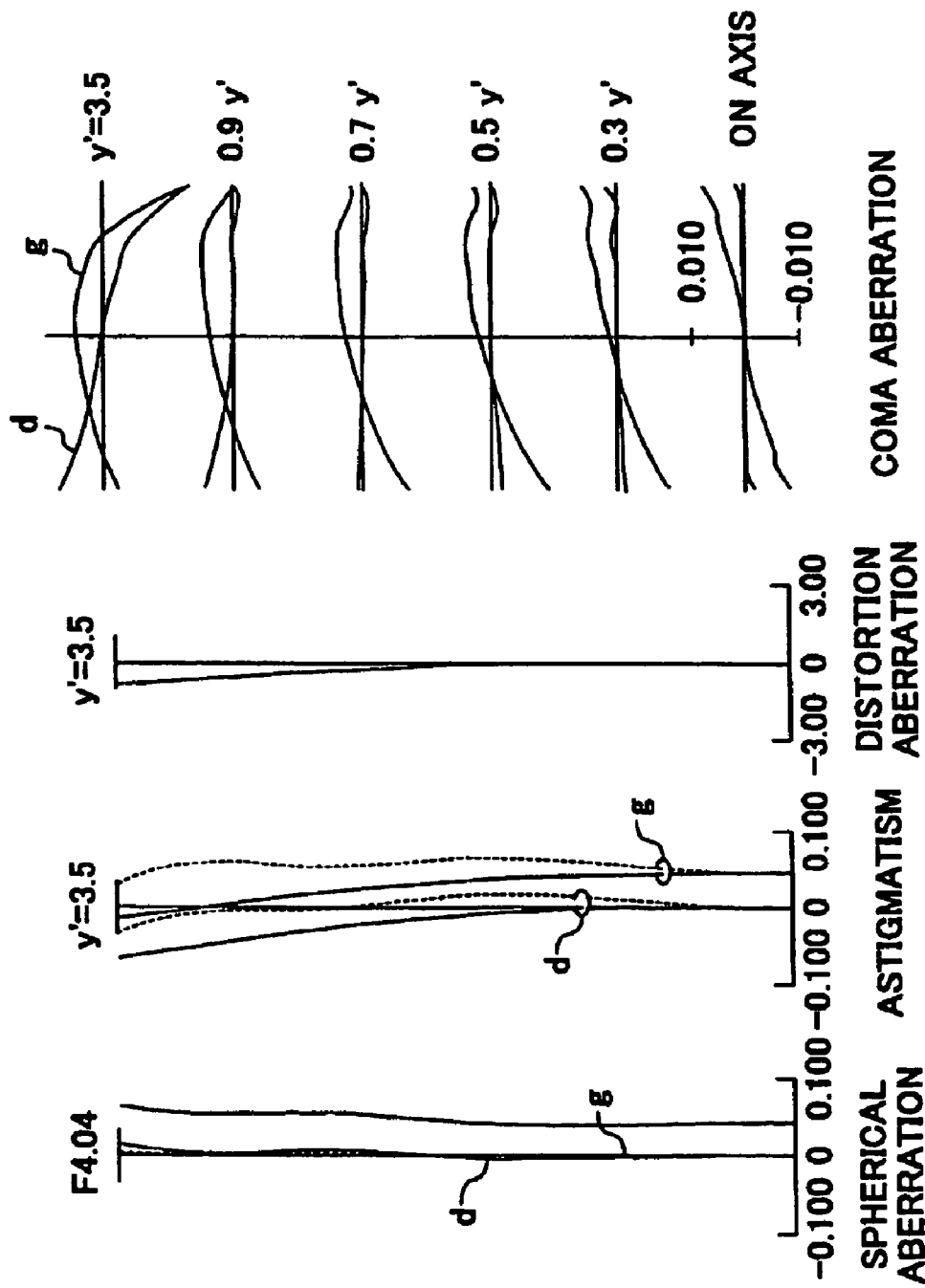
FIG. 66 shows an aberration curve in a long focus end of zoom lens of the embodiment 15 of the present invention.
Figure 67:
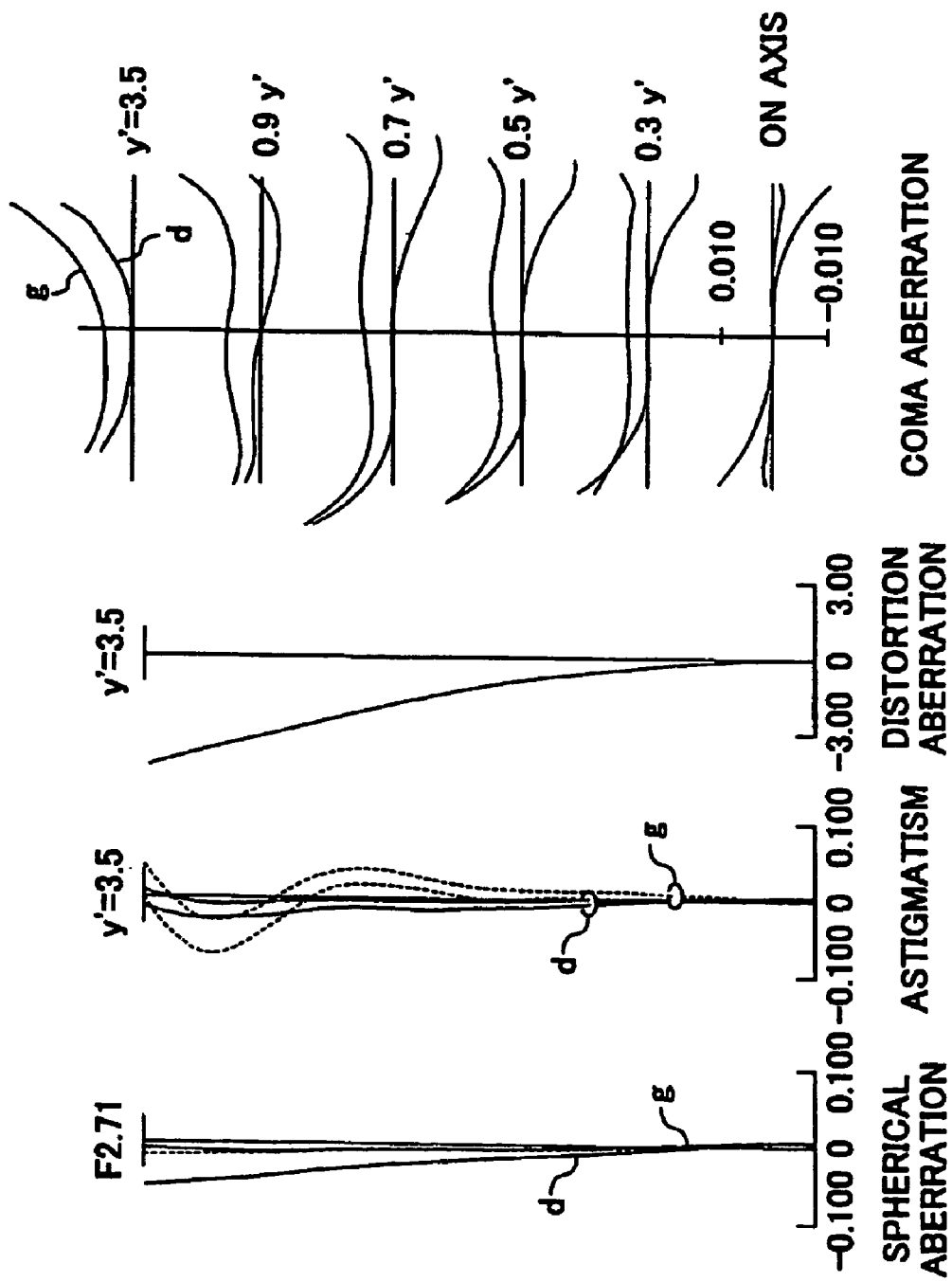
FIG. 67 shows an aberration curve in a short focus end of zoom lens of the numerical embodiment 16 of the present invention.
Figure 68:
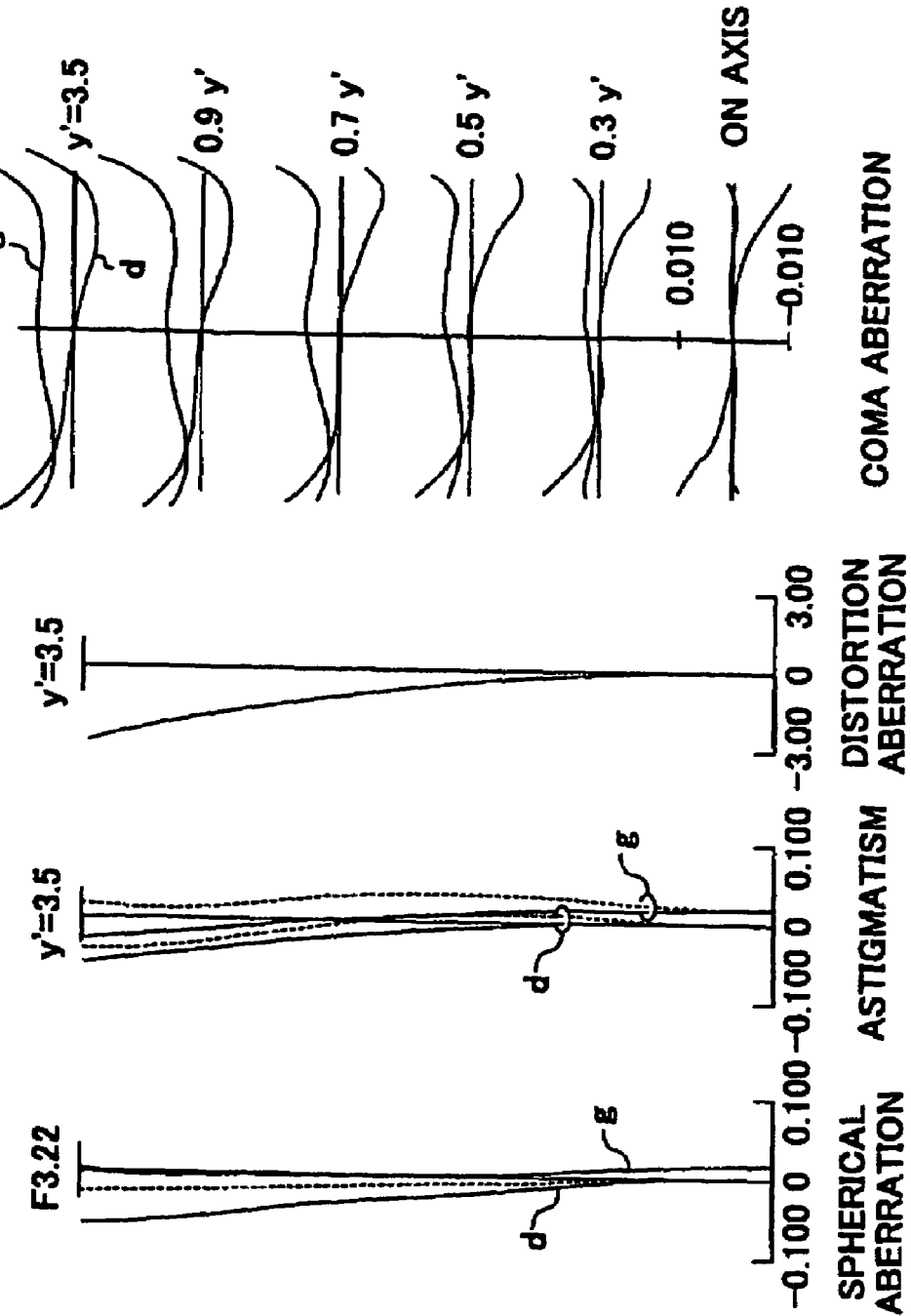
FIG. 68 shows an aberration curve in an intermediate focal length of zoom lens of the numerical embodiment 16 of the present invention.
Figure 69:
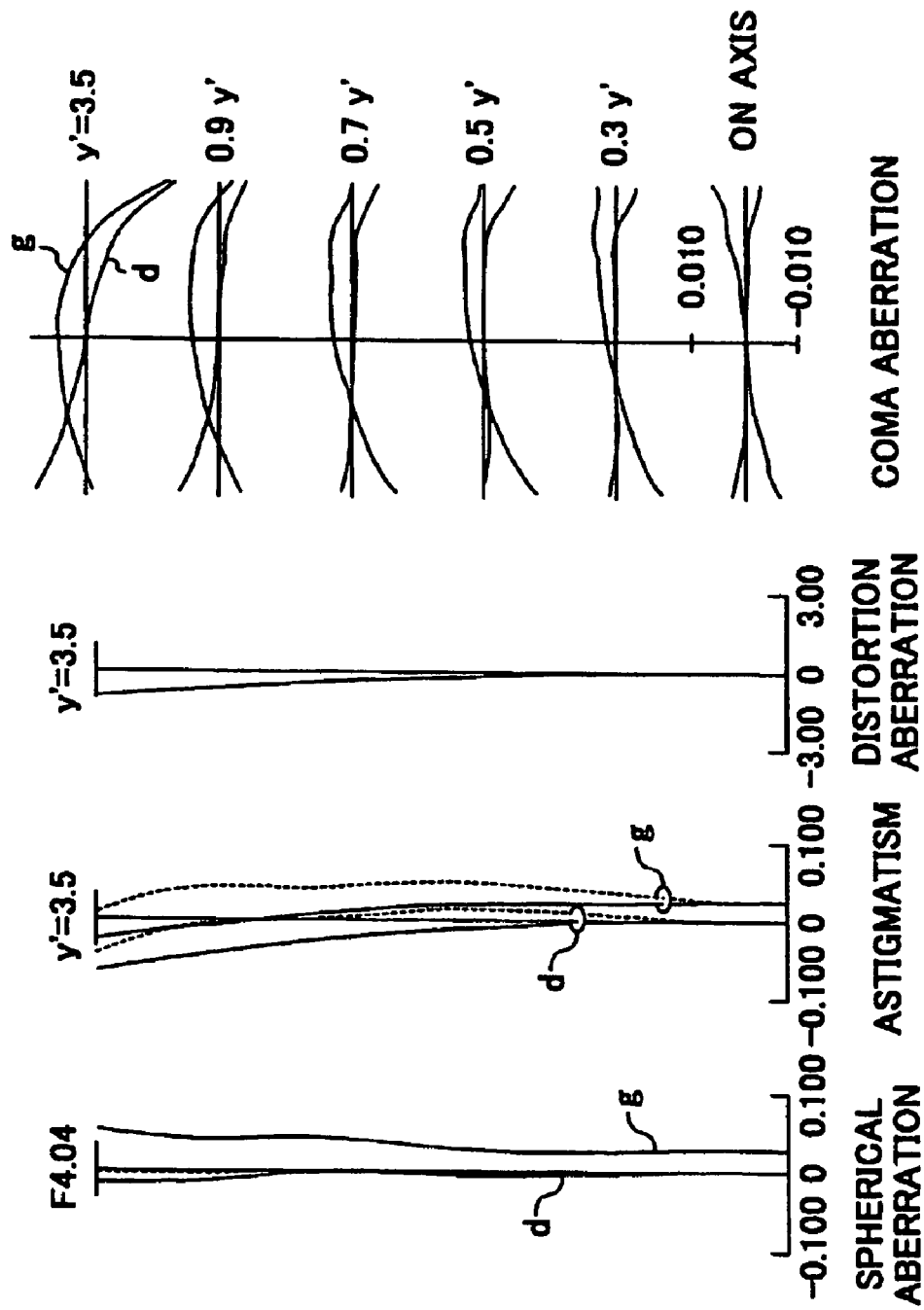
FIG. 69 shows an aberration curve in a long focus end of zoom lens of the embodiment 16 of the present invention.
Figure 70:
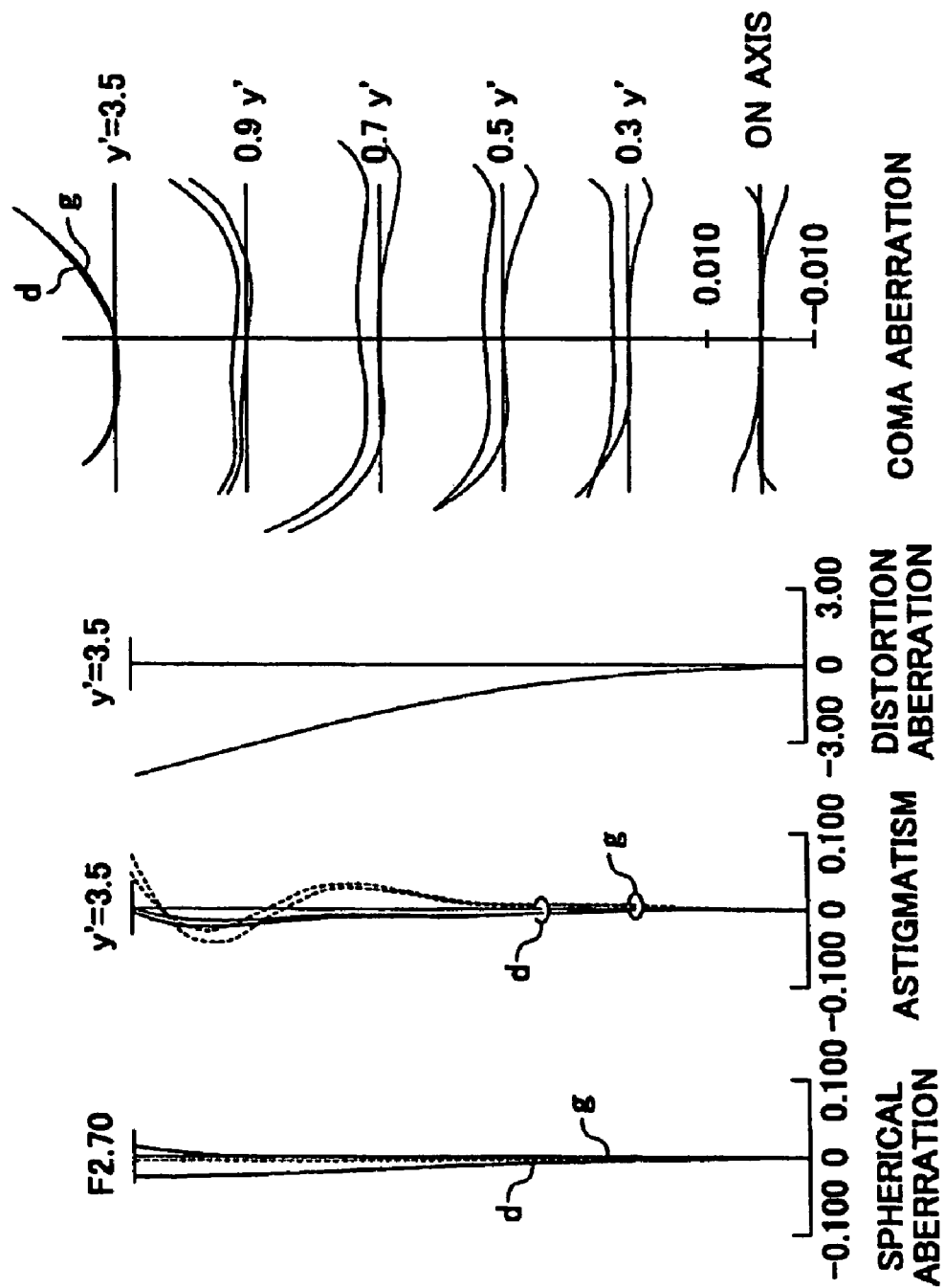
FIG. 70 shows an aberration curve it a short focus end of zoom lens of the numerical embodiment 17 of the present invention.
Figure 71:
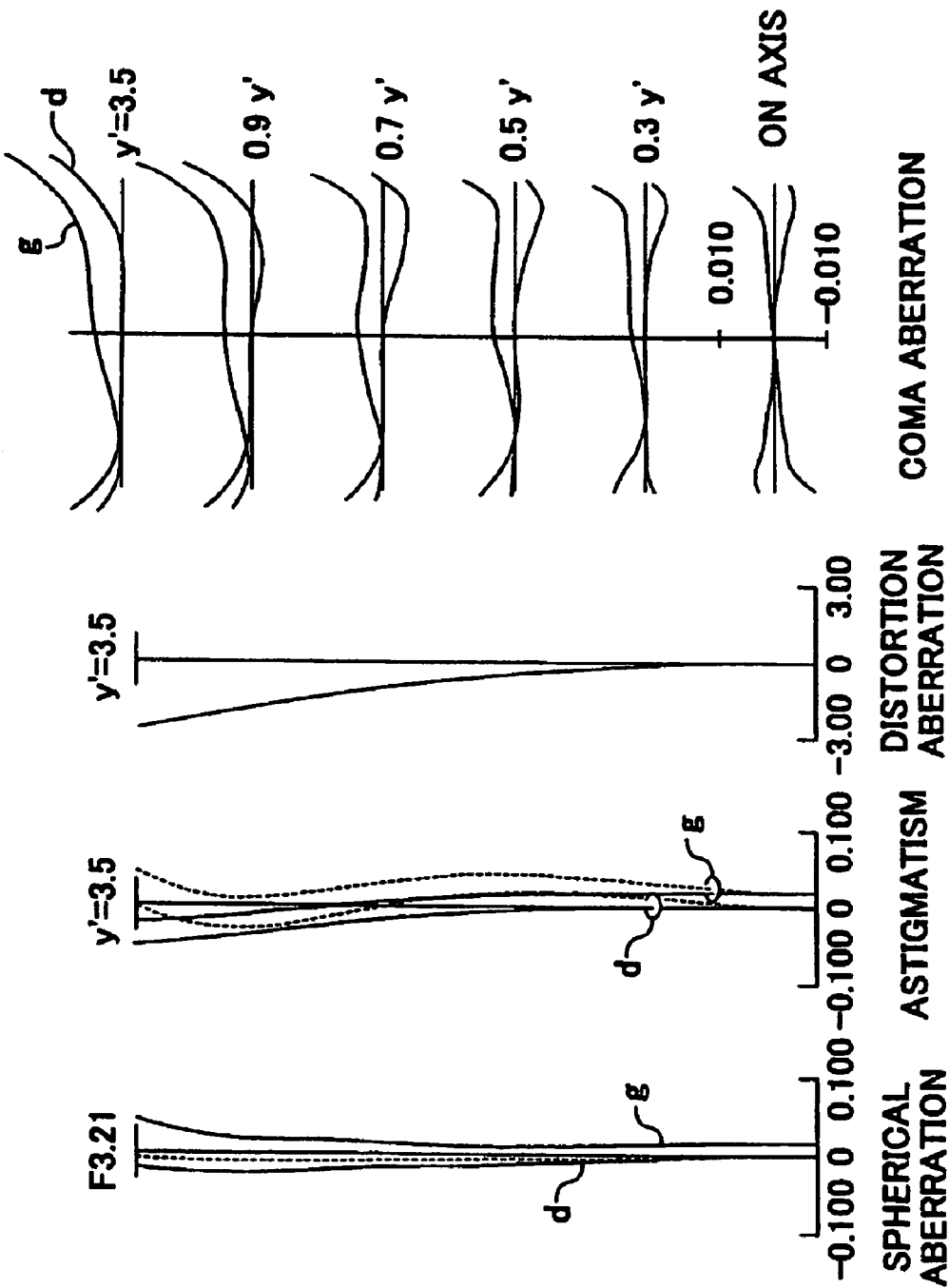
FIG. 71 shows an aberration curve in an intermediate focal length of zoom lens of the numerical embodiment 17 of the present invention.
Figure 72:
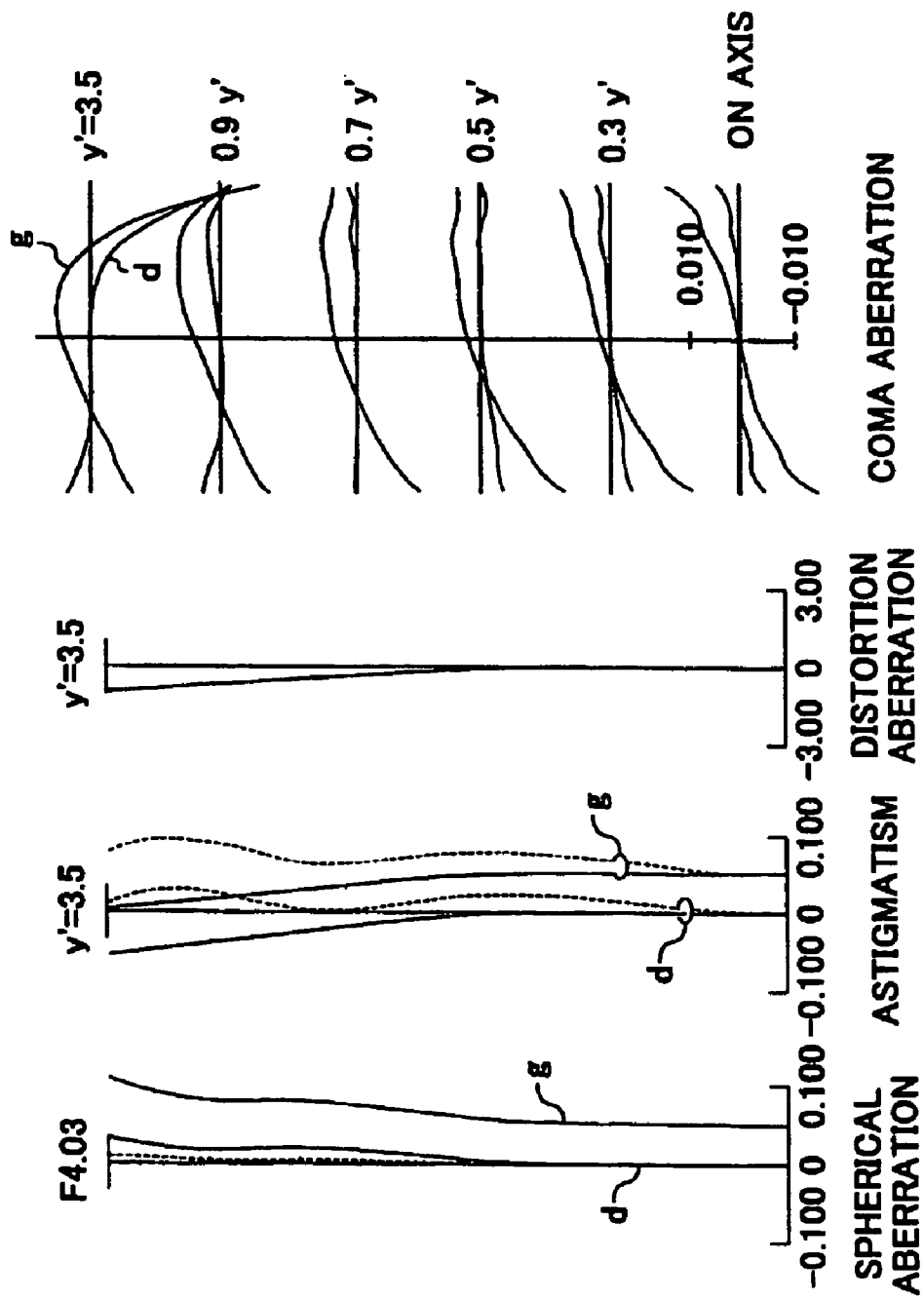
FIG. 72 shows an aberration curve in a long focus end of zoom lens of the embodiment 17 of the present invention.
Figure 73:
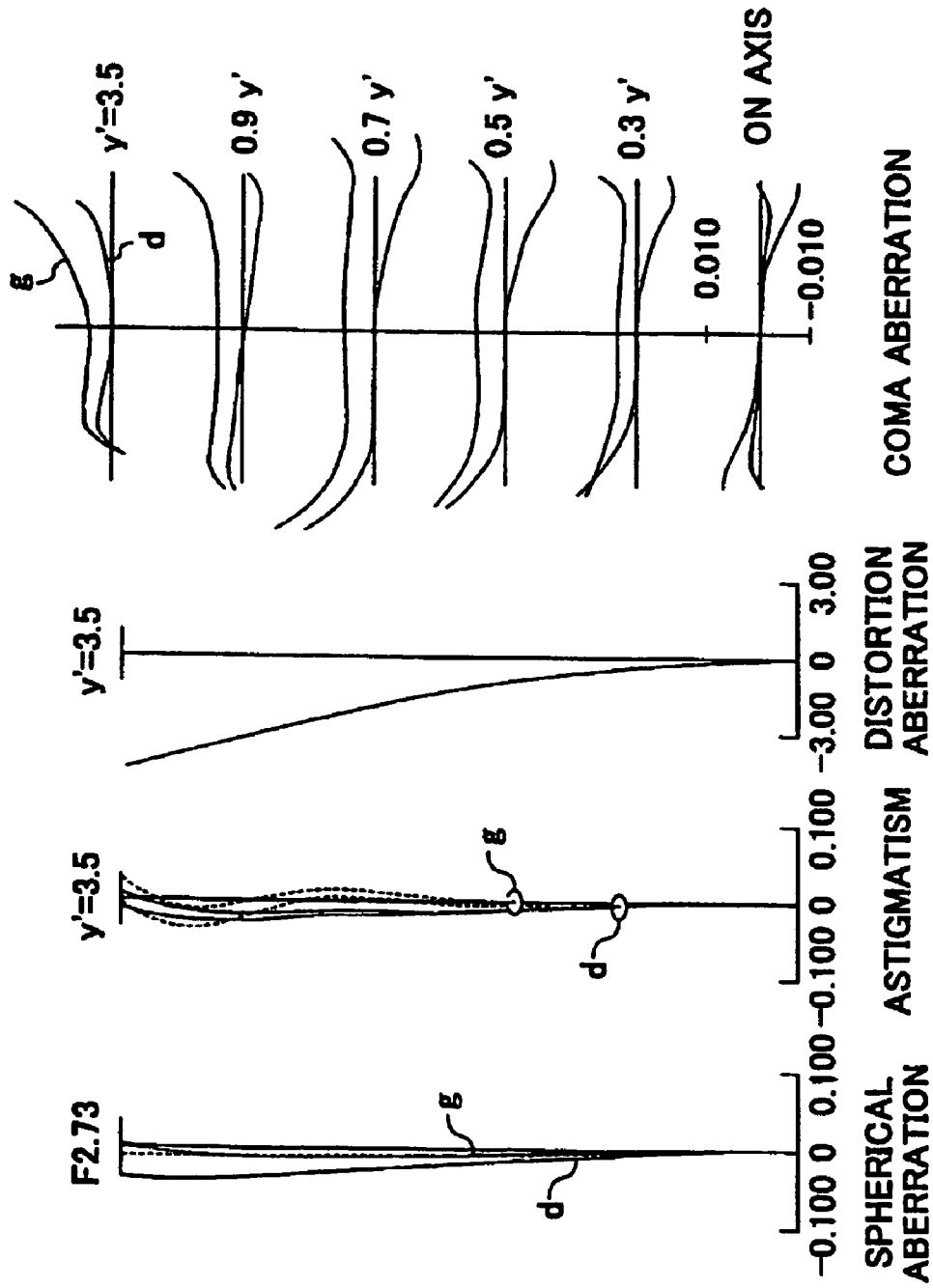
FIG. 73 shows an aberration curve in a short focus end of zoom lens of the numerical embodiment 18 of the present invention.
Figure 74:
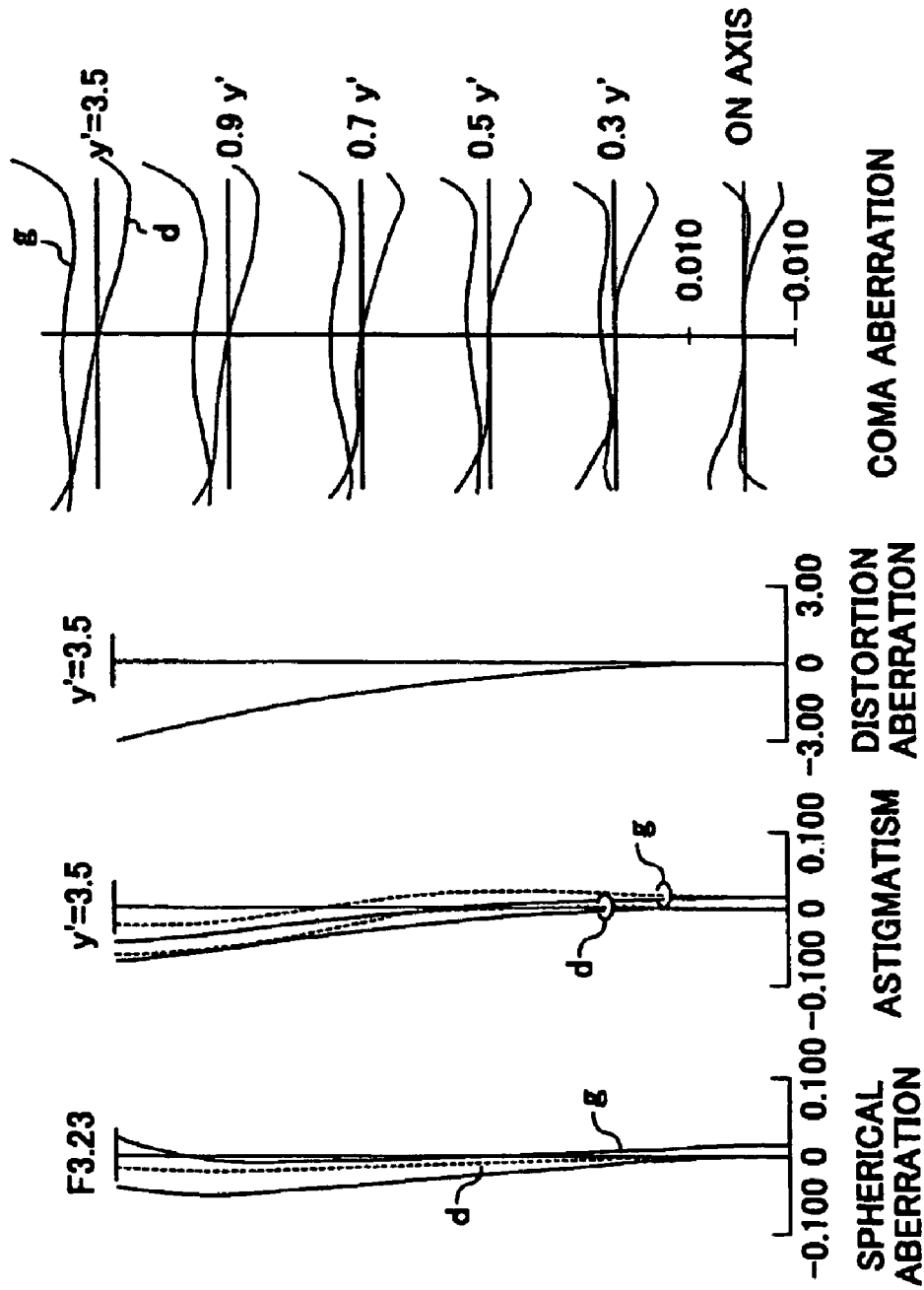
FIG. 74 shows an aberration curve in an intermediate focal length of zoom lens of the numerical embodiment 18 of the present invention.
Figure 75:
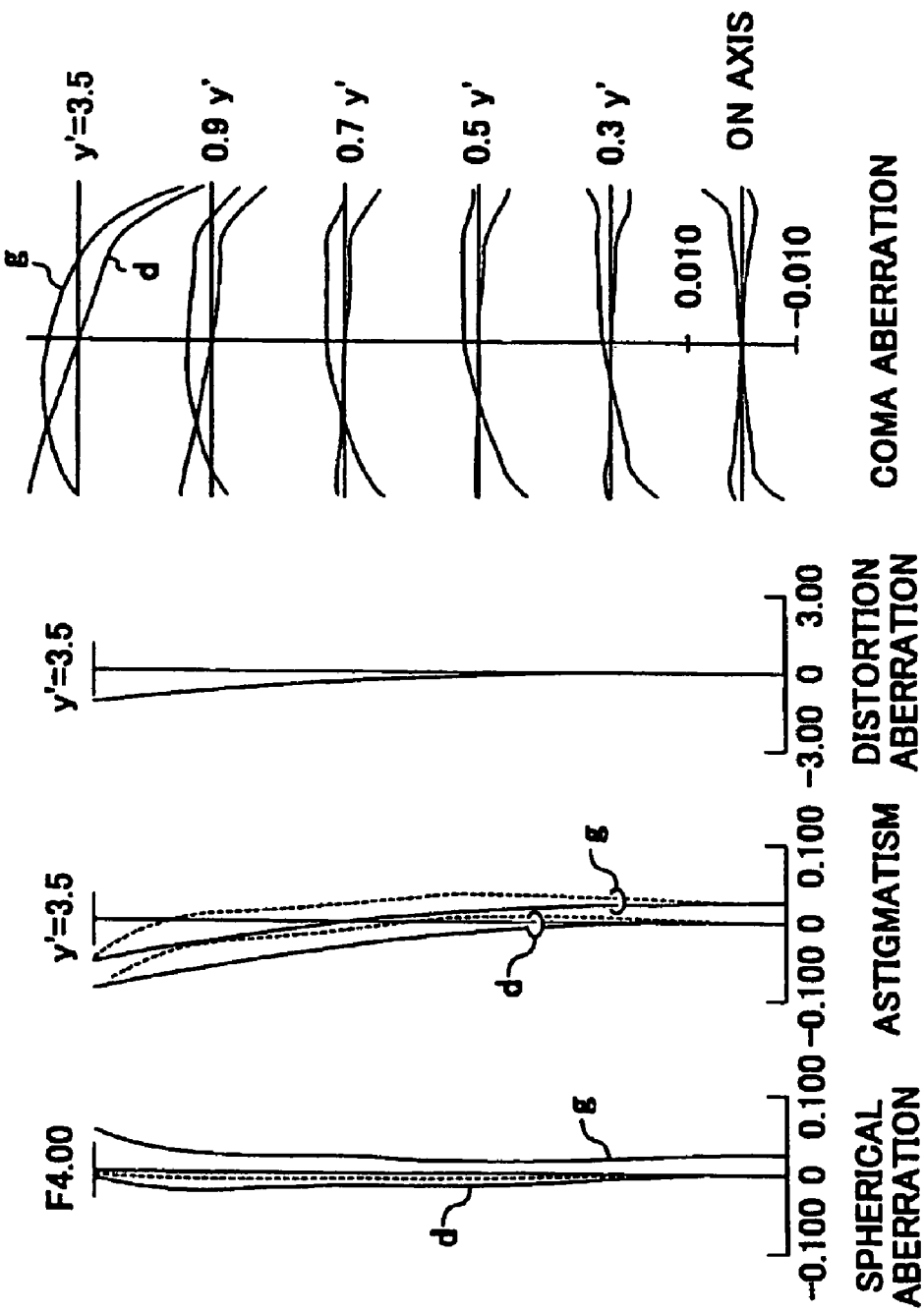
FIG. 75 shows an aberration curve in a long focus end of zoom lens of the embodiment 18 of the present invention.
Figure 76:
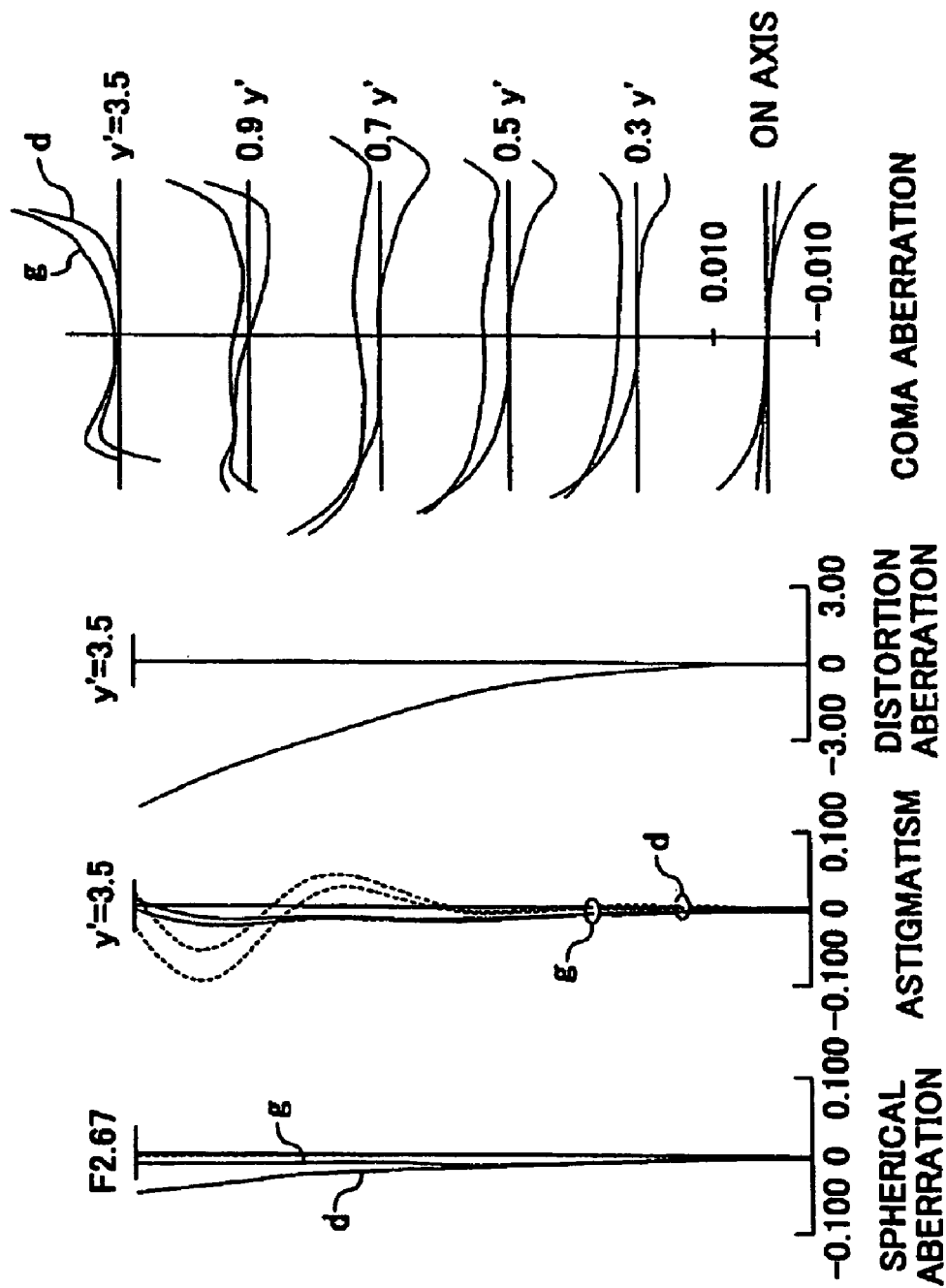
FIG. 76 shows an aberration curve in a short focus end of zoom lens of the numerical embodiment 19 of the present invention.
Figure 77:
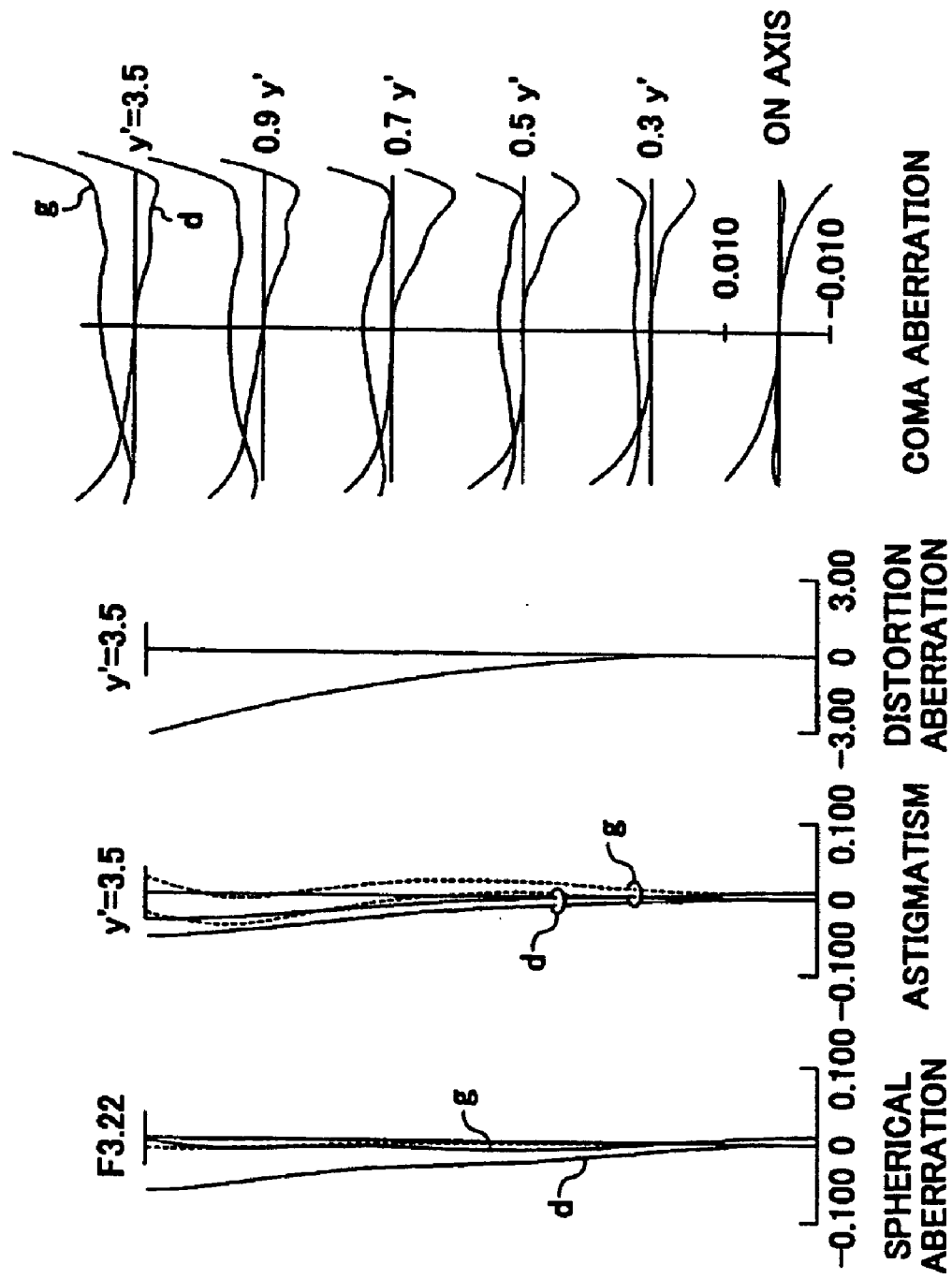
FIG. 77 shows an aberration curve in an intermediate focal length of zoom lens of the numerical embodiment 19 of the present invention.
Figure 78:
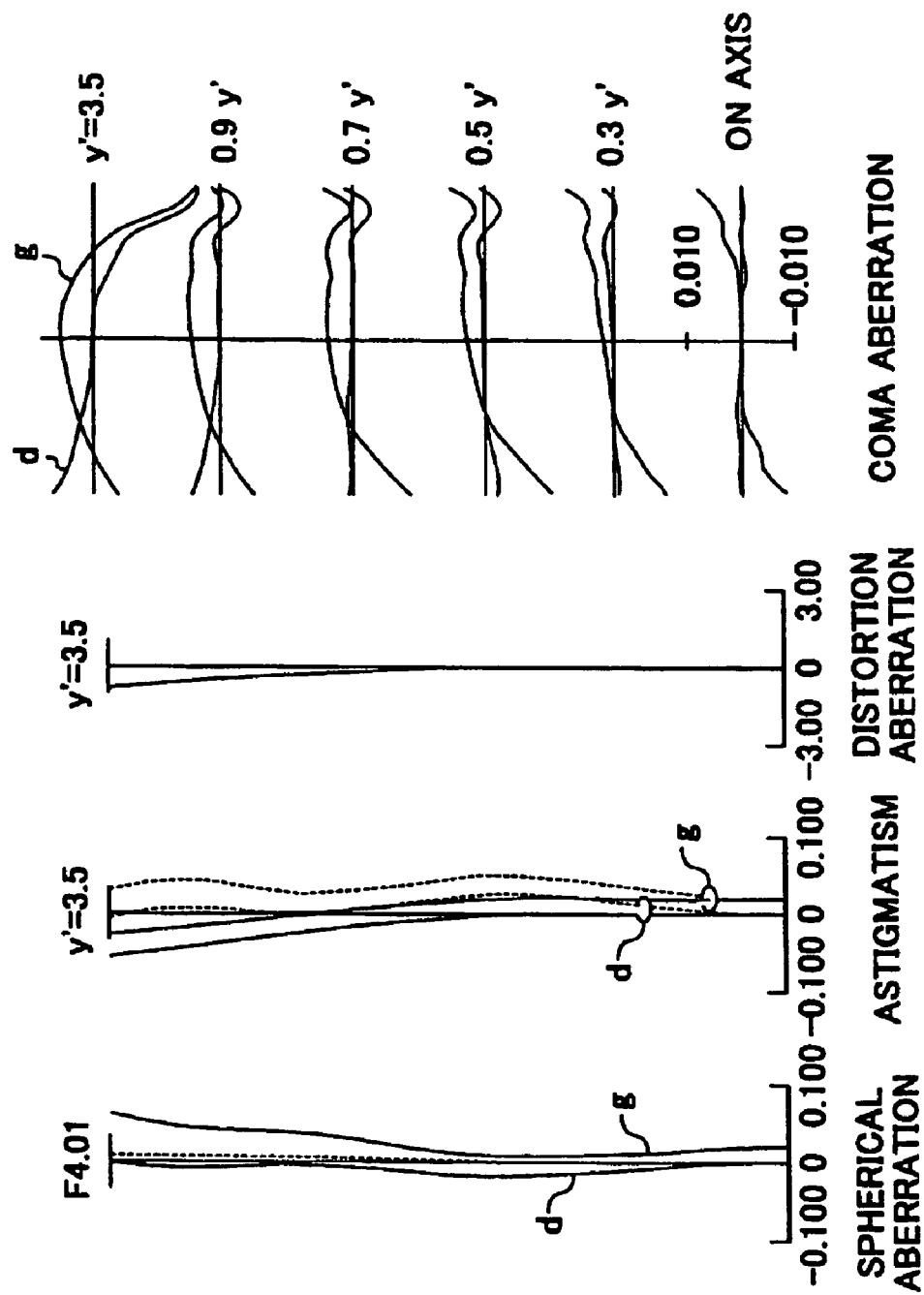
FIG. 78 shows an aberration curve in a long focus end of zoom lens of the embodiment 19 of the present invention.

Numerical values in the conditional relationships
$(Y'/R_6) = 0.0$
$(f_{L3}/f_{G1}) = -1.19$
$(f_{L1}/f_{L2}) = 1.45$ Aberration curve graphs according to the numerical embodiment 14 are sequentially shown in FIGS. 61 to 63. FIG. 61 relates to a short focus end, FIG. 62 relates to an intermediate focal length and FIG. 63 relates to a long focus end. Aberration curve graphs according to the numerical embodiment 15 are sequentially shown in FIGS. 64 to 66. FIG. 64 relates to the a focus end, FIG. 65 relates to an intermediate focal length and FIG. 66 relates to a long focus end. Aberration curve graphs according to the numerical embodiment 16 are sequentially shown in FIGS. 67 to 69. FIG. 67 relates to a short focus end, FIG. 68 relates to an intermediate focal length and FIG. 69 relates to a long focus end. Aberration curve graphs according to the numerical embodiment 17 are sequentially shown in FIGS. 70 to 72. FIG. 70 relates to a short focus end, FIG. 71 relates to an intermediate focal length and FIG. 72 relates to a long focus end. Aberration curve graphs according to the numerical embodiment 18 are sequentially shown in FIGS. 73 to 75. FIG. 73 relates to a short focus end, FIG. 74 relates to an intermediate focal length and FIG. 75 relates to a long focus end. Aberration curve graphs according to the numerical embodiment 19 are sequentially shown in FIGS. 76 to 78. FIG. 76 relates to a short focus end, FIG. 77 relates to an intermediate focal length and FIG. 78 relates to a long focus end. In addition, in the drawings of spherical aberrations of aberration curves of FIGS. 61 to 78, the dotted lines indicate sine conditions. Also, in the drawings of astigmatisms of aberration curves of FIGS. 61 to 78, solid lines indicate sagittal and dotted lines indicate meridional.

These numerical embodiments 14 to 19, as embodiments 1 to 5, can be applied to a camera as a portable information terminal unit shown in FIGS. 21 and 22.

EFFECTS OF THE INVENTION

As described above, according to the invention of claim 1, since a zoom lens which is sufficiently small and high-performance and has definition corresponding to an image sensing device of 2,000,000 to 4,000,000 pixels can be provided, a camera (portable information terminal unit) with small size and high image quality can be realized.

According to the invention of claim 2, since spherical surface aberration, astigmatism and coma aberration can be corrected favorably and thus, the higher-performance zoom lens can be provided, a camera (portable information terminal unit) with higher image quality can be realized.

According to the invention of claim 3, since an aspherical surface is used in a different surface of the second group to improve degree of freedom and provide the high-performance zoom lens, a camera (portable information terminal unit) with high image quality can be realized.

According to the invention of claim 4, since degree of freedom in correction of aberration can be increased by leaps and bounds to provide the high-performance zoom lens in more effective manners, a camera (portable information terminal unit) with small size and high image quality can be realized favorably in cost and performance.

According to the invention of claim 5, since curvature of an image surface can be made small and at the same time, distortion aberration at the short focus end to provide a smaller and high-performance zoom lens, a smaller camera (portable information terminal unit) with high image quality can be realized.

According to the invention of claim 6, since aberration correction ability can be improved and in addition, the small and high-performance zoom lens suitable for large angle of view can be provided, a small-size camera (portable information terminal unit) capable of image-sensing wide range can be realized.

According to the invention of claims 7 and 8, since the zoom lens having stable performance that is less influenced by assembling error can be provided with sufficiently small size and high performance, a higher-performance and low-cost camera (portable information terminal unit) can be realized.

According to the invention of claim 9, since a small-size and light-image-quality camera using as an optical system for image sensing the zoom lens which is sufficiently small and high-performance and has definition corresponding to image sensing device of 2,000,000 to 4,000,000 pixels can be provided, a user can sense image in a high image quality with a camera of which portability is excellent.

According to the invention of claim 10, the variable magnification group in a zoom lens suitable for miniaturization can be realized. Since in the variable magnification group of this invention, thickness in a optical axis direction is decreased effectively, the zoom lens can be compacted and measurements can be effectively made small in receiving in a collapsible mount style camera unit.

The zoom lens according to the invention of claim 11 can maintain high performance required for sensing digital image and in addition, miniaturization thereof can be contrived.

The zoom lens according to the invention of claim 13 can decrease assembling error of lenses.

According to the invention of claims 16 and 17, lenses of the second group consist of four elements, so that high-performance and miniaturization can be contrived.

According to the invention of claim 19, curvature of an image surface can be made small.

According to the invention of claim 21, influence on image side forming performance due to formation of an error of aspherical surface can be made small, so that effect of the aspherical surface can be displayed effectively.

According to the invention of claim 22, further miniaturization can be contrived.

According to the invention of claim 23, thickness of the third group can be suppressed as small as possible and at the same time, abaxial aberration such as astigmatism can be corrected excellently.

According to the invention of claims 25 to 29, miniaturization and high performance of the camera unit can be realized.

Also, according to the invention of claim 30, since the zoom lens that is high-performance and sufficiently small and of which lens diameter (maximum light effective diameter) of the first group is small can be provided, a camera (portable information terminal unit) with high image quality and small size can be realized.

According to the invention of claim 31, since processing and inspection of the lens parts constructing the zoom lens according to claim 30 can be simplified, manufacturing cost thereof can be decreased to contribute to lowering cost of the camera (portable information terminal unit).

According to the invention of claim 32, since the zoom lens of which lens diameter (maximum light effective diameter) is smaller can be provided, a smaller camera (portable information terminal unit) can be realized.

According to the invention of claim 33, since the high-performance zoom lens suitable for large angle of view can be provided, a small-size camera (portable information terminal unit) capable of image-sensing large range can be realized.

According to the invention of claim 34, since even when the eccentricity error sensitivity in the first group becomes high by proceeding miniaturization, the zoom lens having a control means for making obtain stable performance can be provided, the higher-image-quality and small-size camera (portable information terminal unit) can be realized.

According to the invention of claim 35, since even when the eccentricity error sensitivity in the first group becomes high, stable performance can be made to obtain and at the same time, a simpler control means can be provided by means of controlling the lens on an object side in the first group from the object side of the zoom lens, a more small-size and low-cost camera (portable information terminal unit) can be realized.

According to the invention of claim 36, since the negative lens of the first group can be controlled with respect to the fixed positive lens, the control can be performed with ease and high accuracy.

According to the invention of claim 37, since using the high-performance and sufficiently small-size zoom lens as an optical system for image sensing, a camera with small size and high image quality can be provided, a user can sense high-quality image with a camera of which portability is excellent.

According to the invention of claim 38, since using the high-performance and sufficiently small-size zoom lens as an optical system for image sensing in the camera function section, a portable information terminal unit with small size and high image quality can be provided, a user can sense high-quality image with a camera of which portability is excellent and can transmit the image to externals.

What is claimed is:

1. A variable magnification group m a zoom lens comprising:
a first group having a negative focal length;
a second group having a positive focal length in turn from an object side; and
an iris disposed in the object side of the second group for moving integrally with the second group,
wherein at the time of variation of magnification from a short focus end to a long focus end, at least one of said first and second groups is moved so that a space between the first and second groups is reduced, and
wherein the second group substantially varies magnification and includes three elements of a positive lens of which a surface having a large curvature faces an object, a negative lens of which a surface having a large curvature faces an image, and a positive lens arranged in turn from the object side, a surface on the most image side of the second group has a convex shape, and a surface on the most object side and a surface on the most image side are aspherical surfaces, so that when a thickness of the second group in a direction of optical axis is $L_{G2}$ and a maximum height of image is Y', the following relationship is satisfied;

$$1.0 < (L_{G2}/Y') < 2.5.$$

2. The variable magnification group according to claim 1, wherein when each radius of curvature of surfaces on the object side and on the image side in the positive lens closest to image in the second group is $R_{31}$ and $R_{32}$, respectively, the following relationship is satisfied:

$$-0.4 < (R_{31}+R_{32})/(R_{31}-R_{32}) < 0.0.$$

3. The variable magnification group according to claim 1, wherein the second group comprises a cemented lens in which the positive lens on the most object side and the negative lens next to the positive lens are cemented.

4. The variable magnification group according to claim 1, wherein three elements of lenses are separate lenses from each other.

5. The variable magnification group according to claim 1, wherein when each radius of curvature of surfaces on the object side and the image side in the positive lens closest to the image in the second group is $R_{31}$ and $R_{32}$, respectively, the following relationship is satisfied:

$$-0.4 < (R_{31}+R_{32})/(R_{31}-R_{32}) < 0.0$$

and the second group comprises a cemented lens in which the positive lens on the most object side and the negative lens next to the positive lens are cemented.

6. A variable magnification group m a zoom lens comprising:
a first group having a negative focal length;
a second group having a positive focal length in turn from an object side; and
an iris disposed in the object side of the second group for moving integrally with the second group,
wherein the first group is arranged in the most object side of the zoom lens,
wherein at the time of variation of magnification from a short focus end to a long focus end, at least one of said first and second groups is moved so that a space between the first and second groups is reduced, and wherein the second group substantially varies magnification, and consists of four elements of a positive lens of which a surface having a large curvature faces an object, a negative lens of which a surface having a large curvature faces an image, a positive lens and a positive lens in turn from the object side, a surface on the most object side and a surface on the most image side are aspherical surfaces, so that when a thickness of the second group in a direction of optical axis is $L_{G2}$ and a maximum height of images is Y', the following relationship is satisfied:

$1.0<(L_{G2}/Y')<2.5.$

7. The variable magnification group according to claim 6, wherein the second group is integrally constructed by joining the positive lens on the most object side and the negative lens next to the positive lens.

* * * * *